United States Patent
Kessler et al.

(10) Patent No.: US 11,409,690 B2
(45) Date of Patent: Aug. 9, 2022

(54) COMMUNICATION SYSTEMS WITH SERIAL PERIPHERAL INTERFACE FUNCTIONALITY

(71) Applicant: Analog Devices, Inc., Wilmington, MA (US)

(72) Inventors: Martin Kessler, Salem, MA (US); Lewis F. Lahr, Dover, MA (US); William Hooper, Newton, MA (US)

(73) Assignee: ANALOG DEVICES, INC., Wilmington, MA (US)

(*) Notice: Subject to any disclaimer, the term of this patent is extended or adjusted under 35 U.S.C. 154(b) by 0 days.

(21) Appl. No.: 17/110,126

(22) Filed: Dec. 2, 2020

(65) Prior Publication Data

US 2021/0157766 A1    May 27, 2021

Related U.S. Application Data

(63) Continuation of application No. 16/406,329, filed on May 8, 2019, now Pat. No. 10,884,972.

(51) Int. Cl.
    *G06F 13/42*    (2006.01)

(52) U.S. Cl.
    CPC ...... *G06F 13/4291* (2013.01); *G06F 13/4295* (2013.01); *G06F 2213/0002* (2013.01); *G06F 2213/0016* (2013.01)

(58) Field of Classification Search
    CPC ............ G06F 13/4291; G06F 13/4295; G06F 13/4068; G06F 13/4072; G06F 2213/0002; G06F 2213/0016
    See application file for complete search history.

(56) References Cited

U.S. PATENT DOCUMENTS

| 10,884,972 | B2* | 1/2021 | Kessler | G06F 13/4295 |
| 2019/0138490 | A1* | 5/2019 | Srivastava | G06F 13/4291 |
| 2019/0197007 | A1* | 6/2019 | Suarez | G06F 13/385 |
| 2020/0221362 | A1* | 7/2020 | Kessler | H04W 36/305 |

* cited by examiner

*Primary Examiner* — Glenn A. Auve

(57) ABSTRACT

Disclosed herein are systems and techniques for serial peripheral interface (SPI) functionality for node transceivers in a two-wire communication bus. For example, in some embodiments, a node transceiver may include SPI circuitry and upstream or downstream transceiver circuitry. SPI commands received via the SPI circuitry may be executed by the node transceiver, or transmitted upstream or downstream along the two-wire bus for execution by another node transceiver or a slave device coupled to another node transceiver.

20 Claims, 37 Drawing Sheets

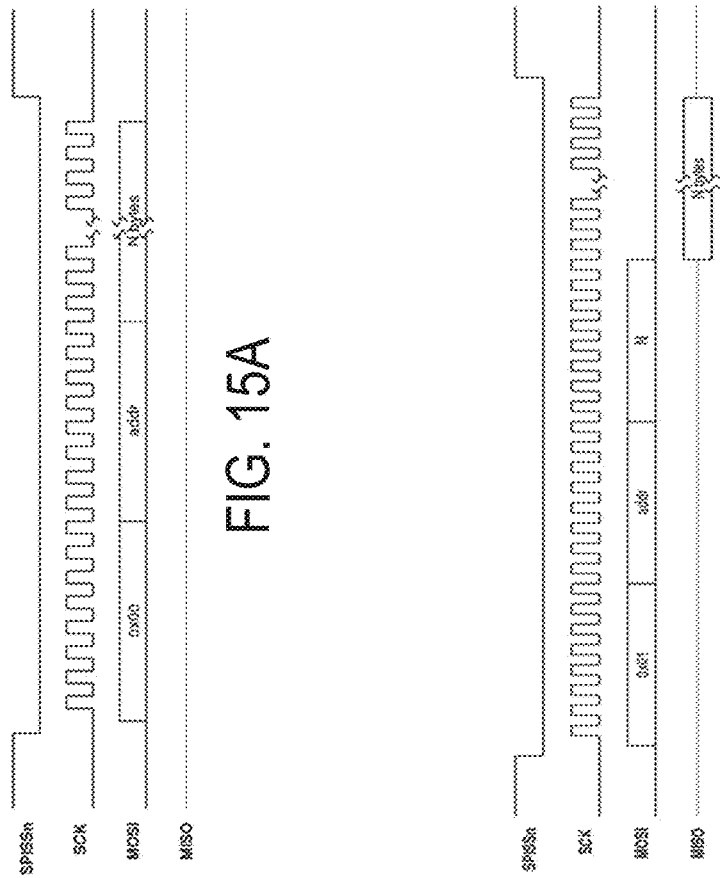
FIG. 15A
FIG. 15B
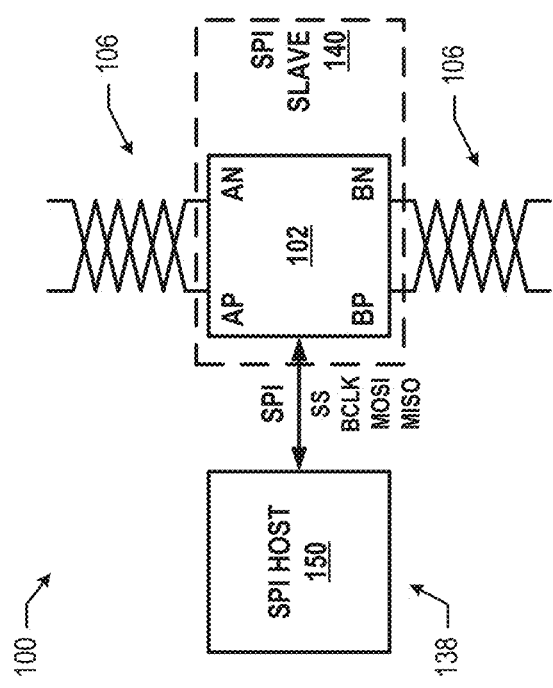
FIG. 14

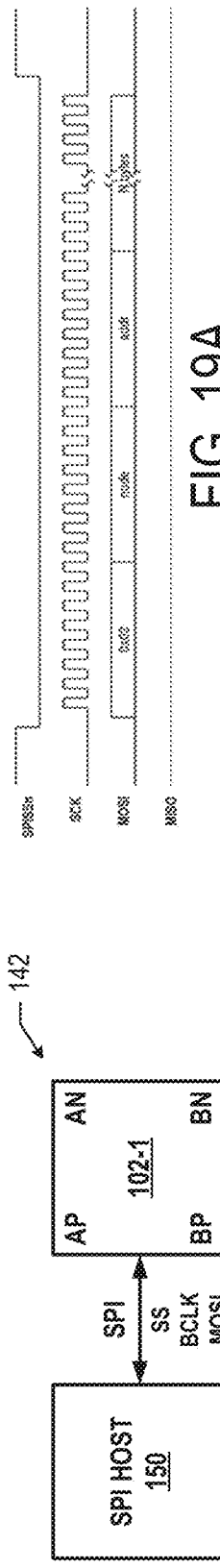 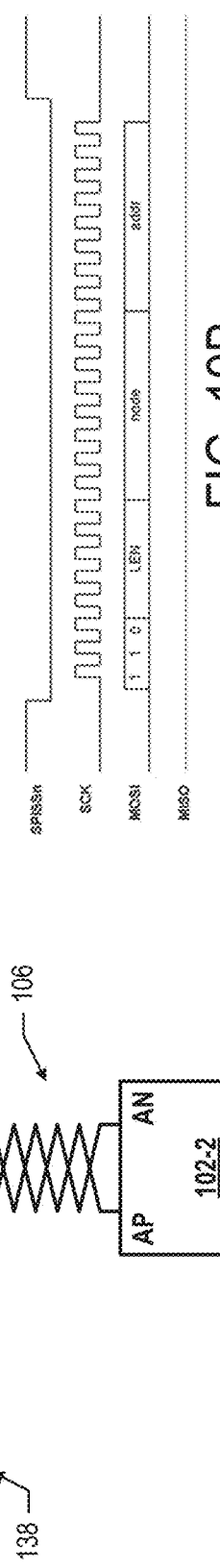 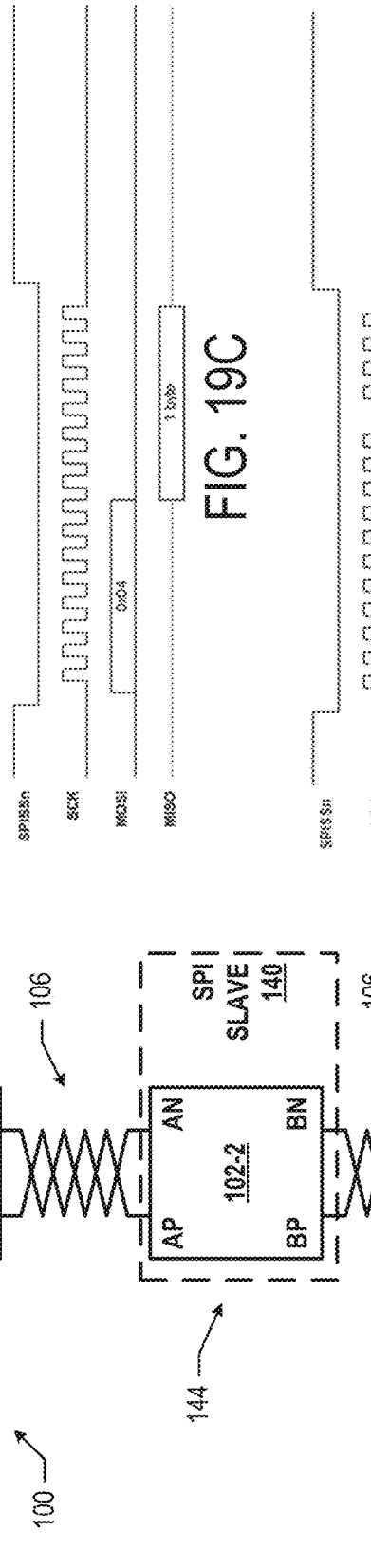 

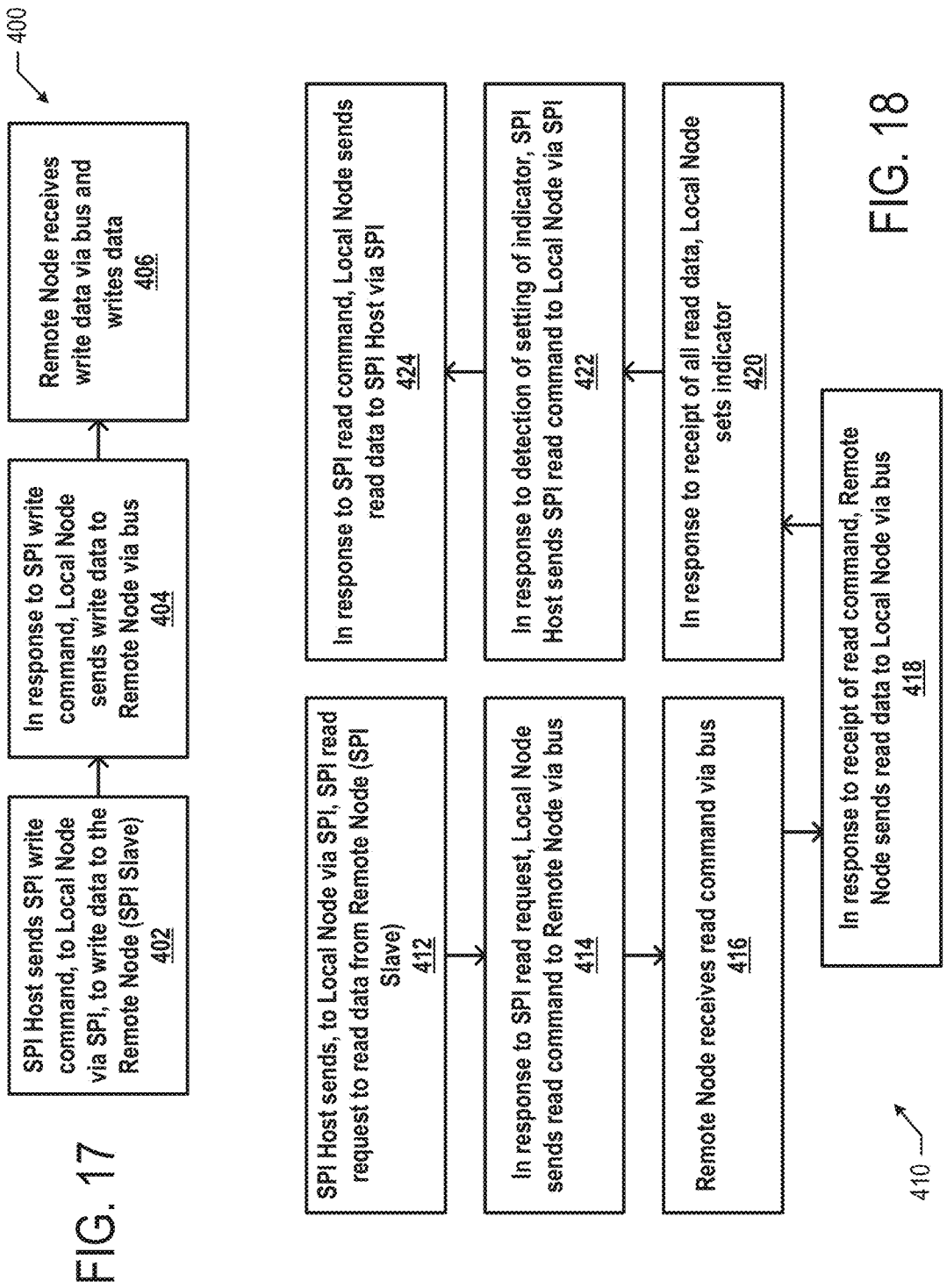

Atomic Write

| Byte | Local Node (SPI Host to Tunnel Owner) | | Byte | Remote Node (Tunnel Responder to SPI Slave) | |
|---|---|---|---|---|---|
| | MOSI | MISO | | MOSI | MISO |
| 0 | Atomic Write | 0 | | Tunnel Delay - Wait for entire write command to be sent to Remote Node | |
| 1 | Node/SS | 0 | | | |
| 2 | WR Byte<0> | 0 | | | |
| 3 | WR Byte<1> | 0 | | | |
| ... | ... | ... | | | |
| L+1 | WR Byte<L-1> | 0 | | | |
| | Tunnel Delay - Wait for SPI write transaction to occur on Remote Node | | 0 | WR Byte<0> | ignored |
| | | | 1 | WR Byte<1> | ignored |
| | | | 2 | ... | ignored |
| | | | C-1 | WR Byte<L-1> | ignored |

FIG. 22

Atomic Read

| | Local Node (SPI Host to Tunnel Owner) | | | Remote Node (Tunnel Responder to SPI Slave) | |
|---|---|---|---|---|---|
| Byte | MOSI | MISO | Byte | MOSI | MISO |
| 0 | Atomic Read Req | 0 | | | |
| 1 | LEN | 0 | | Tunnel Delay - Wait for entire read command to be sent to Remote Node | |
| 2 | Node/SS | 0 | | | |
| 3 | WR Byte<0> | 0 | | | |
| 4 | WR Byte<1> | 0 | | | |
| ... | ... | ... | | | |
| C+2 | WR Byte<C-1> | 0 | 0 | WR Byte<0> | Ignored |
| | | | 1 | WR Byte<1> | Ignored |
| | Tunnel Delay - Wait for SPI read transaction to occur on Remote Node and for read data transport to Local Node | | 2 | ... | Ignored |
| | | | C-1 | WR Byte<C-1> | Ignored |
| | | | 4 | 0 | RD Byte<0> |
| | | | 5 | 0 | RD Byte<1> |
| | | | ... | 0 | ... |
| | | | C+L-1 | 0 | RD Byte<LEN-1> |
| 0 | Data FIFO Read | 0 | | | |
| 1 | Ignored | RD Byte<0> | | | |
| 2 | Ignored | RD Byte<1> | | | |
| ... | Ignored | ... | | | |
| L | Ignored | RD Byte<LEN-1> | | | |

FIG. 24

| Full Duplex SPI Transaction | | | | |
|---|---|---|---|---|
| Local Node (SPI Host to Tunnel Owner) | | | Remote Node (Tunnel Responder to SPI Slave) | |
| Byte | MOSI | MISO | Byte | MOSI | MISO |
| 0 | Full Duplex | 0 | | Tunnel Delay | |
| 1 | Node/SS | 0 | | Remote transfer starts when first bytes are received at Tunnel Responder | |
| 2 | Length | 0 | | | |
| 3 | WR2 Byte[0] | RD1 Byte[0] | | | |
| 4 | WR2 Byte[1] | RD1 Byte[1] | 0 | WR2 Byte[0] | RD2 Byte[0] |
| ... | ... | ... | 1 | WR2 Byte[1] | RD2 Byte[1] |
| L+2 | WR2 Byte[L-1] | RD1 Byte[L-1] | 2 | WR2 Byte[2] | RD2 Byte[2] |
| | | | ... | ... | ... |
| | | | LEN-1 | WR2 Byte[L-1] | RD2 Byte[L-1] |

FIG. 26

FIG. 30

FIG. 31

| 7 | 6 | 5 | 4 | 3 | 2 | 1 | 0 |
|---|---|---|---|---|---|---|---|
| 1 | 0 | 0 | R/W | | PType0 | | |

PType0:  0: No content
  1: Start of atomic transaction
  2: Continuation of any transaction
  3: Last frame of any transaction
  4: Abort transaction
  5: Start of full duplex transaction
  6: Start of bulk write transaction R/W:  0: Write-only transaction
  1: Write-then-read transaction

FIG. 36

| 7 | 6 | 5 | 4 | 3 | 2 | 1 | 0 |
|---|---|---|---|---|---|---|---|
| SSel | M/S | 0 | | NodeID | | | |

SSel:  Slave Select field to target
M/S:  High if target is master node
NodeID:  Slave Node ID of target if M/S is low

| Atomic SPI Write | | | | | |
|---|---|---|---|---|---|
| Tunnel Owner Packet | Owner State | SPIBUSY | Tunnel Responder Packet | Responder State | Comments |
| Atomic Write Start₁ | Start | 1 | Acknowledge | Busy | |
| Continue | Continue | 1 | Acknowledge | Busy | |
| Continue | Continue | 1 | Acknowledge | Busy | |
| Last | Wait | 0 | Acknowledge | Busy | TO ready for new transaction |
| No Content | Wait | 0 | Acknowledge | Busy | |
| No Content | Wait | 0 | Acknowledge | Busy | |
| No Content | Wait | 0 | Write Complete | Idle | TR ready for new transaction |
| No Content | Idle | 0 | No Content | Idle | |

| Atomic SPI Read | | | | | |
|---|---|---|---|---|---|
| Tunnel Owner Packet | Owner State | SPIBUSY | Tunnel Responder Packet | Responder State | Comments |
| Atomic Read Start₁ | Start | 1 | Acknowledge | Busy | |
| Continue | Continue | 1 | Acknowledge | Busy | |
| Continue | Continue | 1 | Acknowledge | Busy | |
| Last | Wait | 1 | Read Return | Busy | |
| No Content | Wait | 1 | Read Return | Busy | |
| No Content | Wait | 1 | Read Return | Idle | TR ready for new transaction |
| No Content | Idle | 0 | No Content | Idle | |
| No Content | Idle | 0 | | Idle | |
| No Content | Idle | 0 | | Idle | SPI RD of data from TO |
| No Content | Idle | 0 | | Idle | TO ready for new transaction |

| Bulk Write | | | | | |
|---|---|---|---|---|---|
| Tunnel Owner Packet | Owner State | SPIBUSY | Tunnel Responder Packet | Responder State | Comments |
| Bulk Write Start₂ | Start | 1 | Acknowledge | Busy | |
| Full Duplex WR | Continue | 1 | Acknowledge | Busy | |
| Full Duplex WR | Continue | 1 | Acknowledge | Busy | |
| Last | Wait | 0 | Acknowledge | Busy | TO ready for new transaction |
| No Content | Wait | 0 | Acknowledge | Busy | |
| No Content | Wait | 0 | Write Complete | Idle | TR ready for new transaction |
| No Content | Idle | 0 | | Idle | |

| Full Duplex | | | | | |
|---|---|---|---|---|---|
| Tunnel Owner Packet | Owner State | SPIBUSY | Tunnel Responder Packet | Responder State | Comments |
| Full Duplex Start₁ | Start | 1 | Acknowledge | Busy | |
| Continue | Continue | 1 | Acknowledge/Read Return | Busy | |
| Continue | Continue | 1 | Read Return | Busy | |
| Last | Wait | 1 | Read Return | Busy | |
| No Content | Wait | 1 | Read Return | Idle | |
| No Content | Idle | 0 | No Content | Idle | TO/TR Ready for new transaction |
| No Content | Idle | 0 | No Content | Idle | |

Footnotes
1. Start packets which contain all bytes necessary to complete a transaction are treated as both the start and end packet of a transaction.

FIG. 44

COMMUNICATION SYSTEMS WITH SERIAL PERIPHERAL INTERFACE FUNCTIONALITY

PRIORITY DATA

This continuation application claims the benefit of and priority from U.S. patent application Ser. No. 16/406,329 filed May 8, 2019 entitled, "COMMUNICATION SYSTEMS WITH SERIAL PERIPHERAL INTERFACE FUNCTIONALITY", incorporated herein as reference in its entirety.

BACKGROUND

As electronic components decrease in size, and as performance expectations increase, more components are included in previously un-instrumented or less-instrumented devices. In some settings, the communication infrastructure used to exchange signals between these components (e.g., in a vehicle) has required thick and heavy bundles of cables.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIG. 14 is a block diagram of a portion of an illustrative two-wire communication system including local node Serial Peripheral Interface (SPI) functionality, in accordance with various embodiments.

FIGS. 15A-15B are timing diagrams of commands that may be used in an implementation of local node SPI functionality, in accordance with various embodiments.

FIG. 16 is a block diagram of a portion of an illustrative two-wire communication system including remote node SPI functionality, in accordance with various embodiments.

FIG. 17 is a flow diagram of an example remote node SPI write procedure, in accordance with various embodiments.

FIG. 18 is a flow diagram of an example remote node SPI read procedure, in accordance with various embodiments.

FIGS. 19A-19D are timing diagrams of commands that may be used in an implementation of remote node SPI functionality, in accordance with various embodiments.

FIG. 22 is a table of operations that may be performed in an embodiment of the remote peripheral SPI write procedure of FIG. 21.

FIG. 24 is a table of operations that may be performed in an embodiment of the remote peripheral SPI read procedure of FIG. 23.

FIG. 26 is a table of operations that may be performed in an embodiment of the remote peripheral SPI full duplex procedure of FIG. 25.

FIG. 30 illustrates examples of configurations of data tunnel slots at a last slave node, in accordance with various embodiments.

FIG. 31 illustrates examples of configurations of data tunnel slots at a tunnel owner that is a non-last slave node, in accordance with various embodiments.

FIG. 35 illustrates an example of the number of bytes in a data tunnel as a function of data slot size and the number of slots, in accordance with various embodiments.

FIG. 36 illustrates an example SPI packet command byte for a data tunnel owner, in accordance with various embodiments.

FIG. 37 illustrates an example SPI slave select/node byte for a data tunnel owner, in accordance with various embodiments.

FIG. 38 illustrates an example tunnel owner packet structure, in accordance with various embodiments.

FIGS. 39 and 40 illustrate example tunnel owner packets, in accordance with various embodiments.

FIG. 43 illustrates example tunnel responder packets, in accordance with various embodiments.

FIG. 44 illustrates example tunnel packet flows, in accordance with various embodiments.

DETAILED DESCRIPTION

Figure 1:
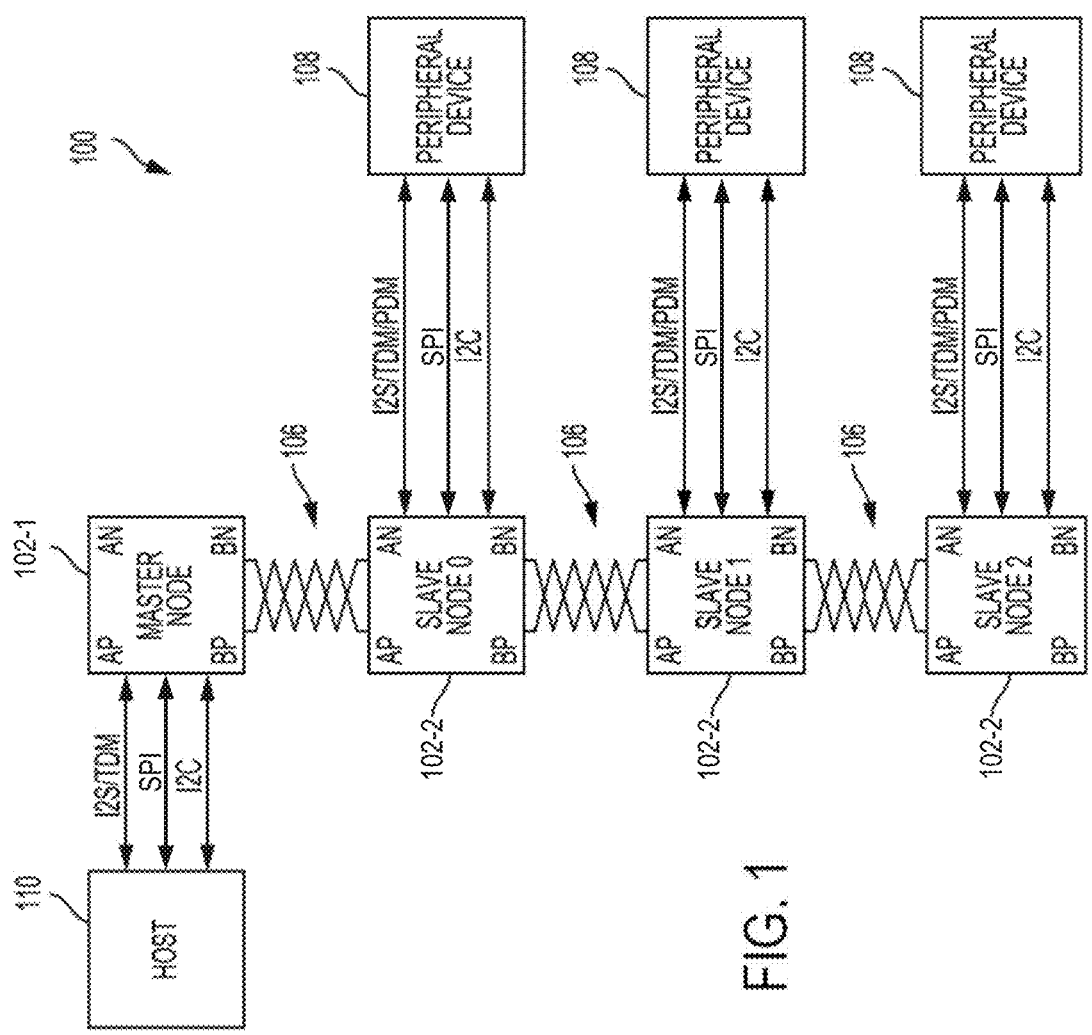
FIG. 1 is a block diagram of an illustrative two-wire communication system, in accordance with various embodiments.

Disclosed herein are systems and techniques for serial peripheral interface (SPI) functionality for node transceivers in a two-wire communication bus. For example, in some embodiments, a node transceiver may include SPI circuitry and upstream or downstream transceiver circuitry. SPI commands received via the SPI circuitry may be executed by the node transceiver, or transmitted upstream or downstream along the two-wire bus for execution by another node transceiver or a slave device coupled to another node transceiver.

In the following detailed description, reference is made to the accompanying drawings which form a part hereof wherein like numerals designate like parts throughout, and in which is shown by way of illustration embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). For ease of discussion, the collection of drawings of FIGS. 15A-15B may be referred to herein as "FIG. 15," the collection of drawings of FIGS. 19A-19D may be referred to herein as "FIG. 19," etc.

Various components may be referred to or illustrated herein in the singular (e.g., a "processor," a "peripheral device," etc.), but this is simply for ease of discussion, and any element referred to in the singular may include multiple such elements in accordance with the teachings herein.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. As used herein, the term "circuitry" may refer to, be part of, or include an application-specific integrated circuit (ASIC), an electronic circuit, and optical circuit, a processor (shared, dedicated, or group), and/or memory (shared, dedicated, or group) that execute one or more software or firmware programs, a combinational logic circuit, and/or other suitable hardware that provide the described functionality.

FIG. 1 is a block diagram of an illustrative half-duplex two-wire communication system 100, in accordance with various embodiments. The system 100 includes a host 110, a master node 102-1 and at least one slave node 102-2. In FIG. 1, three slave nodes (0, 1, and 2) are illustrated. The depiction of three slave nodes 102-2 in FIG. 1 is simply illustrative, and the system 100 may include one, two, or more slave nodes 102-2, as desired.

The master node 102-1 may communicate with the slave nodes 102-2 over a two-wire bus 106. The bus 106 may include different two-wire bus links between adjacent nodes along the bus 106 to connect the nodes along the bus 106 in a daisy-chain fashion. For example, as illustrated in FIG. 1, the bus 106 may include a link coupling the master node 102-1 to the slave node 0, a link coupling the slave node 0 to the slave node 1, and a link coupling the slave node 1 to the slave node 2. In some embodiments, the links of the bus 106 may each be formed of a single twisted wire pair (e.g., an unshielded twisted pair). In some embodiments, the links of the bus 106 may each be formed of a coax cable (e.g., with the core providing the "positive" line and the shield providing the "negative" line, or vice versa). The two-wire bus links together provide a complete electrical path (e.g., a forward and a return current path) so that no additional ground or voltage source lines need be used.

The host 110 may include a processor that programs the master node 102-1, and acts as the originator and recipient of various payloads transmitted along the bus 106. In some embodiments, the host 110 may be or may include a microcontroller, for example. In particular, the host 110 may be the master of Inter-Integrated Circuit Sound (I2S) communications that happen along the bus 106. The host 110 may communicate with the master node 102-1 via an I2S/Time Division Multiplex (TDM) protocol, a SPI protocol, and/or an Inter-Integrated Circuit (I2C) protocol. In some embodiments, the master node 102-1 may be a transceiver (e.g., the node transceiver 120 discussed below with reference to FIG. 2) located within a same housing as the host 110. The master node 102-1 may be programmable by the host 110 over the I2C bus for configuration and read-back, and may be configured to generate clock, synchronization, and framing for all of the slave nodes 102-2. In some embodiments, an extension of the I2C control bus between the host 110 and the master node 102-1 may be embedded in the data streams transmitted over the bus 106, allowing the host 110 direct access to registers and status information for the one or more slave nodes 102-2, as well as enabling I2C-to-I2C communication over distance to allow the host 110 to control the peripheral devices 108. As discussed in detail below with reference to FIGS. 14-48, an extension of the SPI control bus between the host 110 and the master node 102-1 may be embedded in the data streams transmitted over the bus 106, allowing the host 110 direct access to registers and status information for the one or more slave nodes 102-2, as well as enabling SPI-to-SPI or SPI-to-I2C communication over distance to allow the host 110 to control the peripheral devices 108. In embodiments in which the system 100 is included in a vehicle, the host 110 and/or the master node 102-1 may be included in a headend of the vehicle.

The master node 102-1 may generate "downstream" signals (e.g., data signals, power signals, etc., transmitted away from the master node 102-1 along the bus 106) and receive "upstream" signals (e.g., transmitted toward the master node 102-1 along the bus 106). The master node 102-1 may provide a clock signal for synchronous data transmission over the bus 106. As used herein, "synchronous data" may include data streamed continuously (e.g., audio signals) with a fixed time interval between two successive transmissions to/from the same node along the bus 106. In some embodiments, the clock signal provided by the master node 102-1 may be derived from an I2S input provided to the master node 102-1 by the host 110. A slave node 102-2 may be an addressable network connection point that represents a possible destination for data frames transmitted downstream on the bus 106 or upstream on the bus 106. A slave node 102-2 may also represent a possible source of downstream or upstream data frames. The system 100 may allow for control information and other data to be transmitted in both directions over the bus 106 from one node to the next. One or more of the slave nodes 102-2 may also be powered by signals transmitted over the bus 106.

In particular, each of the master node 102-1 and the slave nodes 102-2 may include a positive upstream terminal (denoted as "AP"), a negative upstream terminal (denoted as "AN"), a positive downstream terminal (denoted as "BP"), and a negative downstream terminal (denoted as "BN"). The positive and negative downstream terminals of a node may be coupled to the positive and negative upstream terminals of the adjacent downstream node, respectively. As shown in FIG. 1, the master node 102-1 may include positive and negative upstream terminals, but these terminals may not be used; in other embodiments, the master node 102-1 may not include positive and negative upstream terminals. The last slave node 102-2 along the bus 106 (the slave node 2 in FIG. 1) may include positive and negative downstream terminals, but these terminals may not be used; in other embodiments, the last slave node 102-2 along the bus may not include positive and negative downstream terminals.

As discussed in detail below, the master node 102-1 may periodically send a synchronization control frame downstream, optionally along with data intended for one or more of the slave nodes 102-2. For example, the master node 102-1 may transmit a synchronization control frame every 1024 bits (representing a superframe) at a frequency of 48 kHz, resulting in an effective bit rate on the bus 106 of 49.152 Mbps. Other rates may be supported, including, for example, 44.1 kHz. The synchronization control frame may allow the slave nodes 102-2 to identify the beginning of each superframe and also, in combination with physical layer encoding/signaling, may allow each slave node 102-2 to derive its internal operational clock from the bus 106. The synchronization control frame may include a preamble for signaling the start of synchronization, as well as control fields that allow for various addressing modes (e.g., normal, broadcast, discovery), configuration information (e.g., writing to registers of the slave nodes 102-2), conveyance of I2C information, conveyance of SPI information, remote control of certain general-purpose input/output (GPIO) pins at the slave nodes 102-2, and other services. A portion of the synchronization control frame following the preamble and the payload data may be scrambled in order to reduce the likelihood that information in the synchronization control frame will be mistaken for a new preamble, and to flatten the spectrum of related electromagnetic emissions.

The synchronization control frame may get passed between slave node 102-2 (optionally along with other data, which may come from the master node 102-1 but additionally or alternatively may come from one or more upstream slave nodes 102-2 or from a slave node 102-2 itself) until it reaches the last slave node 102-2 (i.e., the slave node 2 in FIG. 1), which has been configured by the master node 102-1 as the last slave node 102-2 or has self-identified itself as the last slave node 102-2. Upon receiving the synchronization control frame, the last slave node 102-2 may transmit a synchronization response frame followed by any data that it is permitted to transmit (e.g., a 24-bit audio sample in a designated time slot). The synchronization response frame may be passed upstream between slave nodes 102-2 (optionally along with data from downstream slave nodes 102-2), and based on the synchronization response frame, each slave node 102-2 may be able to identify a time slot, if any, in which the slave node 102-2 is permitted to transmit.

In some embodiments, one or more of the slave nodes 102-2 in the system 100 may be coupled to and communicate with a peripheral device 108. For example, a slave node 102-2 may be configured to read data from and/or write data to the associated peripheral device 108 using I2S, pulse density modulation (PDM), TDM, SPI, and/or I2C protocols, as discussed below. Although the "peripheral device 108" may be referred to in the singular herein, this is simply for ease of discussion, and a single slave node 102-2 may be coupled with zero, one, or more peripheral devices. Examples of peripheral devices that may be included in the peripheral device 108 may include a digital signal processor (DSP), a field programmable gate array (FPGA), an ASIC, an analog to digital converter (ADC), a digital to analog converter (DAC), a codec, a microphone, a microphone array, a speaker, an audio amplifier, a protocol analyzer, an accelerometer or other motion sensor, an environmental condition sensor (e.g., a temperature, humidity, and/or gas sensor), a wired or wireless communication transceiver, a display device (e.g., a touchscreen display), a user interface component (e.g., a button, a dial, or other control), a camera (e.g., a video camera), a memory device, or any other suitable device that transmits and/or receives data. A number of examples of different peripheral device configurations are discussed in detail herein.

In some embodiments, the peripheral device 108 may include any device configured for I2S communication; the peripheral device 108 may communicate with the associated slave node 102-2 via the I2S protocol. In some embodiments, the peripheral device 108 may include any device configured for I2C communication; the peripheral device 108 may communicate with the associated slave node 102-2 via the I2C protocol. In some embodiments, the peripheral device 108 may include any device configured for SPI communication; the peripheral device 108 may communicate with the associated slave node 102-2 via the SPI protocol. In some embodiments, a slave node 102-2 may not be coupled to any peripheral device 108.

A slave node 102-2 and its associated peripheral device 108 may be contained in separate housings and coupled through a wired or wireless communication connection or may be contained in a common housing. For example, a speaker connected as a peripheral device 108 may be packaged with the hardware for an associated slave node 102-2 (e.g., the node transceiver 120 discussed below with reference to FIG. 2), such that the hardware for the associated slave node 102-2 is contained within a housing that includes other speaker components. The same may be true for any type of peripheral device 108.

As discussed above, the host 110 may communicate with and control the master node 102-1 using multi-channel I2S, SPI, and/or I2C communication protocols. For example, the host 110 may transmit data via I2S to a frame buffer (not illustrated) in the master node 102-1, and the master node 102-1 may read data from the frame buffer and transmit the data along the bus 106. Analogously, the master node 102-1 may store data received via the bus 106 in the frame buffer, and then may transmit the data to the host 110 via I2S.

Each slave node 102-2 may have internal control registers that may be configured by communications from the master node 102-1. A number of such registers are discussed in detail below. Each slave node 102-2 may receive downstream data and may retransmit the data further downstream. Each slave node 102-2 may receive and/or generate upstream data and/or retransmit data upstream and/or add data to and upstream transaction.

Communications along the bus 106 may occur in periodic superframes. Each superframe may begin with a downstream synchronization control frame; be divided into periods of downstream transmission (also called "downstream portions"), upstream transmission (also called "upstream portions"), and no transmission (where the bus 106 is not driven); and end just prior to transmission of another downstream synchronization control frame. The master node 102-1 may be programmed (by the host 110) with a number of downstream portions to transmit to one or more of the slave nodes 102-2 and a number of upstream portions to receive from one or more of the slave nodes 102-2. Each slave node 102-2 may be programmed (by the master node 102-1) with a number of downstream portions to retransmit down the bus 106, a number of downstream portions to consume, a number of upstream portions to retransmit up the bus 106, and a number of upstream portions in which the slave node 102-2 may transmit data received from the slave node 102-2 from the associated peripheral device 108. Communication along the bus 106 is discussed in further detail below with reference to FIGS. 2-12.

Embodiments of the communication systems 100 disclosed herein are unique among conventional communication systems in that all slave nodes 102-2 may receive output data over the bus 106 within the same superframe (e.g., all slave nodes 102-2 may receive the same audio sample without sample delays between the nodes 102). In conventional communication systems, data is buffered and processed in each node before being passed downstream in the next frame to the next node. Consequently, in these conventional communication systems, the latency of data transmission depends on the number of nodes (with each node adding a delay of one audio sample). In the communication systems 100 disclosed herein, the bus 106 may only add 1 cycle of latency, no matter if the first or last slave node 102-2 receives the data. The same is true for upstream communication; data may be available at an upstream node 102 in the next superframe, no matter which slave node 102-2 provided the data.

Further, in embodiments of the communication systems 100 disclosed herein, downstream data (e.g., downstream audio data) may be put on the bus 106 by the master node 102-1 or by any of the slave nodes 102-2 that are upstream of the receiving slave node 102-2; similarly, upstream data (e.g., upstream audio data) may be put on the bus 106 by any of the slave nodes 102-2 that are downstream of the receiving node 102 (i.e., the master node 102-1 or a slave node 102-2). Such capability allows a slave node 102-2 to provide both upstream and downstream data at a specific time (e.g., a specific audio sample time). For audio data, this data can be received in the next audio sample at any downstream or upstream node 102 without further delays (besides minor processing delays that fall within the superframe boundary). As discussed further herein, control messages (e.g., in a synchronization control frame (SCF)) may travel to the last node 102 (addressing a specific node 102 or broadcast) and an upstream response (e.g., in a synchronization response frame (SRF)) may be created by the last downstream node 102 within the same superframe. Nodes 102 that have been addressed by the SCF change the content of the upstream SRF with their own response. Consequently, within the same audio sample, a control and a response may be fully executed over multiple nodes 102. This is also in contrast to conventional communication systems, in which sample latencies would be incurred between nodes (for relaying messages from one node to the other).

Figure 2:
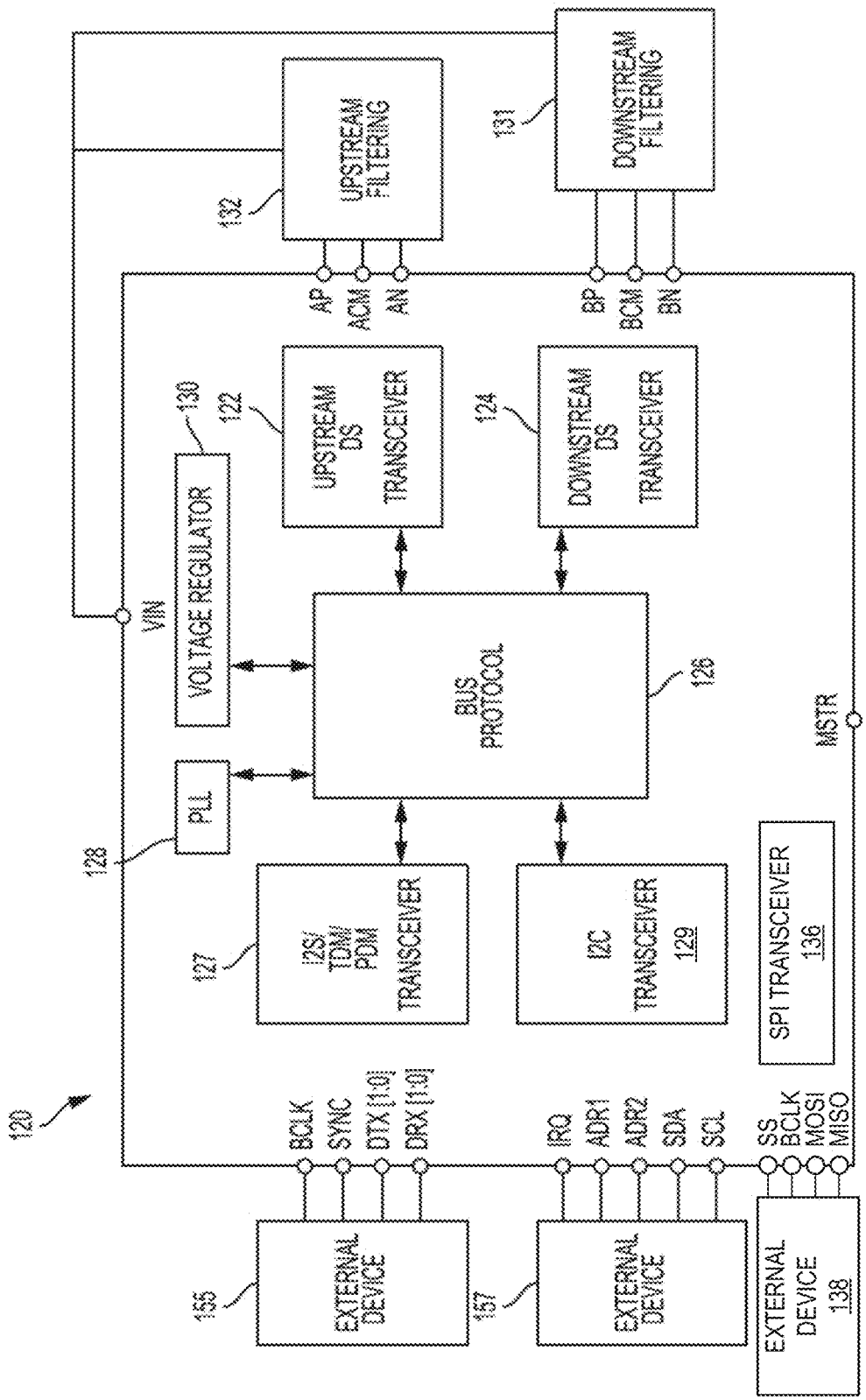
FIG. 2 is a block diagram of a node transceiver that may be included in a node of the system of FIG. 1, in accordance with various embodiments.

Each of the master node 102-1 and the slave nodes 102-2 may include a transceiver to manage communication between components of the system 100. FIG. 2 is a block diagram of a node transceiver 120 that may be included in a node (e.g., the master node 102-1 or a slave node 102-2) of the system 100 of FIG. 1, in accordance with various embodiments. In some embodiments, a node transceiver 120 may be included in each of the nodes of the system 100, and a control signal may be provided to the node transceiver 120 via a master (MSTR) pin to indicate whether the node transceiver 120 is to act as a master (e.g., when the MSTR pin is high) or a slave (e.g., when the MSTR pin is low).

The node transceiver 120 may include an upstream differential signaling (DS) transceiver 122 and a downstream DS transceiver 124. The upstream DS transceiver 122 may be coupled to the positive and negative upstream terminals discussed above with reference to FIG. 1, and the downstream DS transceiver 124 may be coupled to the positive and negative downstream terminals discussed above with reference to FIG. 1. In some embodiments, the upstream DS transceiver 122 may be a low voltage DS (LVDS) transceiver, and the downstream DS transceiver 124 may be an LVDS transceiver. Each node in the system 100 may be AC-coupled to the bus 106, and data signals may be conveyed along the bus 106 (e.g., via the upstream DS transceiver 122 and/or the downstream DS transceiver 124) using a predetermined form of DS (e.g., LVDS or Multipoint LVDS (MLVDS) or similar signaling) with appropriate encoding to provide timing information over the bus 106 (e.g., differential Manchester coding, biphase mark coding, Manchester coding, Non-Return-to-Zero, Inverted (NRZI) coding with run-length limiting, or any other suitable encoding).

The upstream DS transceiver 122 and the downstream DS transceiver 124 may communicate with bus protocol circuitry 126, and the bus protocol circuitry 126 may communicate with a phased locked loop (PLL) 128 and voltage regulator circuitry 130, among other components. When the node transceiver 120 is powered up, the voltage regulator circuitry 130 may raise a "power good" signal that is used by the PLL 128 as a power-on reset.

As noted above, one or more of the slave nodes 102-2 in the system 100 may receive power transmitted over the bus 106 concurrently with data. For power distribution (which is optional, as some of the slave nodes 102-2 may be configured to have exclusively local power provided to them), the master node 102-1 may place a DC bias on the bus link between the master node 102-1 and the slave node 0 (e.g., by connecting, through a low-pass filter, one of the downstream terminals to a voltage source provided by a voltage regulator and the other downstream terminal to ground). The DC bias may be a predetermined voltage, such as 5 volts, 8 volts, the voltage of a car battery, or a higher voltage. Each successive slave node 102-2 can selectively tap its upstream bus link to recover power (e.g., using the voltage regulator circuitry 130). This power may be used to power the slave node 102-2 itself (and optionally one or more peripheral device 108 coupled to the slave node 102-2). A slave node 102-2 may also selectively bias the bus link downstream for the next-in-line slave node 102-2 with either the recovered power from the upstream bus link or from a local power supply. For example, the slave node 0 may use the DC bias on the upstream bus link 106 to recover power for the slave node 0 itself and/or for one or more associated peripheral device 108, and/or the slave node 0 may recover power from its upstream bus link 106 to bias its downstream bus link 106.

Thus, in some embodiments, each node in the system 100 may provide power to the following downstream node over a downstream bus link. The powering of nodes may be performed in a sequenced manner. For example, after discovering and configuring the slave node 0 via the bus 106, the master node 102-1 may instruct the slave node 0 to provide power to its downstream bus link 106 in order to provide power to the slave node 1; after the slave node 1 is discovered and configured, the master node 102-1 may instruct the slave node 1 to provide power to its downstream bus link 106 in order to provide power to the slave node 2 (and so on for additional slave nodes 102-2 coupled to the bus 106). In some embodiments, one or more of the slave nodes 102-2 may be locally powered, instead of or in addition to being powered from its upstream bus link. In some such embodiments, the local power source for a given slave node 102-2 may be used to provide power to one or more downstream slave nodes.

In some embodiments, upstream bus interface circuitry 132 may be disposed between the upstream DS transceiver 122 and the voltage regulator circuitry 130, and downstream bus interface circuitry 131 may be disposed between the downstream DS transceiver 124 and the voltage regulator circuitry 130. Since each link of the bus 106 may carry AC (signal) and DC (power) components, the upstream bus interface circuitry 132 and the downstream bus interface circuitry 131 may separate the AC and DC components, providing the AC components to the upstream DS transceiver 122 and the downstream DS transceiver 124, and providing the DC components to the voltage regulator circuitry 130. AC couplings on the line side of the upstream DS transceiver 122 and downstream DS transceiver 124 substantially isolate the transceivers 122 and 124 from the DC component on the line to allow for high-speed bi-directional communications. As discussed above, the DC component may be tapped for power, and the upstream bus interface circuitry 132 and the downstream bus interface circuitry 131 may include a ferrite, a common mode choke, or an inductor, for example, to reduce the AC component provided to the voltage regulator circuitry 130. In some embodiments, the upstream bus interface circuitry 132 may be included in the upstream DS transceiver 122, and/or the downstream bus interface circuitry 131 may be included in the downstream DS transceiver 124; in other embodiments, the filtering circuitry may be external to the transceivers 122 and 124.

The node transceiver 120 may include a transceiver 127 for I2S, TDM, and PDM communication between the node transceiver 120 and an external device 155. Although the "external device 155" may be referred to in the singular herein, this is simply for ease of illustration, and multiple external devices may communicate with the node transceiver 120 via the I2S/TDM/PDM transceiver 127. As known in the art, the I2S protocol is for carrying pulse code modulated (PCM) information (e.g., between audio chips on a printed circuit board (PCB)). As used herein, "I2S/TDM" may refer to an extension of the I2S stereo (2-channel) content to multiple channels using TDM. As known in the art, PDM may be used in sigma delta converters, and in particular, PDM format may represent an over-sampled 1-bit sigma delta ADC signal before decimation. PDM format is often used as the output format for digital microphones. The I2S/TDM/PDM transceiver 127 may be in communication with the bus protocol circuitry 126 and pins for communication with the external device 155. Six pins, BCLK, SYNC, DTX[1:0], and DRX[1:0], are illustrated in FIG. 2; the BCLK pin may be used for an I2S bit clock, the SYNC pin may be used for an I2S frame synchronization signal, and the DTX[1:0] and DRX[1:0] pins are used for transmit and receive data channels, respectively. Although two transmit pins (DTX[1:0]) and two receive pins (DRX[1:0]) are illustrated in FIG. 2, any desired number of receive and/or transmit pins may be used.

When the node transceiver 120 is included in the master node 102-1, the external device 155 may include the host 110, and the I2S/TDM/PDM transceiver 127 may provide an I2S slave (regarding BCLK and SYNC) that can receive data from the host 110 and send data to the host 110 synchronously with an I2S interface clock of the host 110. In particular, an I2S frame synchronization signal may be received at the SYNC pin as an input from the host 110, and the PLL 128 may use that signal to generate clocks. When the node transceiver 120 is included in a slave node 102-2, the external device 155 may include one or more peripheral devices 108, and the I2S/TDM/PDM transceiver 127 may provide an I2S clock master (for BCLK and SYNC) that can control I2S communication with the peripheral device 108. In particular, the I2S/TDM/PDM transceiver 127 may provide an I2S frame synchronization signal at the SYNC pin as an output. Registers in the node transceiver 120 may determine which and how many I2S/TDM channels are being transmitted as data slots over the bus 106. A TDM mode (TDM MODE) register in the node transceiver 120 may store a value of how many TDM channels fit between consecutive SYNC pulses on a TDM transmit or receive pin. Together with knowledge of the channel size, the node transceiver 120 may automatically set the BCLK rate to match the number of bits within the sampling time (e.g., 48 kHz).

The node transceiver 120 may include a transceiver 129 for I2C communication between the node transceiver 120 and an external device 157. Although the "external device 157" may be referred to in the singular herein, this is simply for ease of illustration, and multiple external devices may communicate with the node transceiver 120 via the I2C transceiver 129. As known in the art, the I2C protocol uses clock (SCL) and data (SDA) lines to provide data transfer. The I2C transceiver 129 may be in communication with the bus protocol circuitry 126 and pins for communication with the external device 157. Four pins, ADR1, ADR2, SDA, and SCL are illustrated in FIG. 2; ADR1 and ADR2 may be used to modify the I2C addresses used by the node transceiver 120 when the node transceiver 120 acts as an I2C slave (e.g., when it is included in the master node 102-1), and SDA and SCL are used for the I2C serial data and serial clock signals, respectively. When the node transceiver 120 is included in the master node 102-1, the external device 157 may include the host 110, and the I2C transceiver 129 may provide an I2C slave that can receive programming instructions from the host 110. In particular, an I2C serial clock signal may be received at the SCL pin as an input from the host 110 for register accesses. When the node transceiver 120 is included in a slave node 102-2, the external device 157 may include a peripheral device 108 and the I2C transceiver 129 may provide an I2C master to allow the I2C transceiver to program one or more peripheral devices in accordance with instructions provided by the host 110 and transmitted to the node transceiver 120 via the bus 106. In particular, the I2C transceiver 129 may provide the I2C serial clock signal at the SCL pin as an output.

The node transceiver 120 may include a transceiver 136 for SPI communication between the node transceiver 120 and an external device 138. Although the "external device 138" may be referred to in the singular herein, this is simply for ease of illustration, and multiple external devices may communicate with the node transceiver 120 via the SPI transceiver 136. As known in the art, the SPI protocol uses slave select (SS), clock (BCLK), master-out-slave-in (MOSI), and master-in-slave-out (MISO) data lines to provide data transfer, and pins corresponding to these four lines are illustrated in FIG. 2. The SPI transceiver 136 may be in communication with the bus protocol circuitry 126 and pins for communication with the external device 138. When the node transceiver 120 is included in the master node 102-1, the external device 138 may include the host 110 or another external device, and the SPI transceiver 136 may provide an SPI slave that can receive and respond to commands from the host 110 or other external device. When the node transceiver 120 is included in a slave node 102-2, the external device 138 may include a peripheral device 108 and the SPI transceiver 136 may provide an SPI host to allow the SPI transceiver 136 to send commands to one or more peripheral devices 108. The SPI transceiver 136 may include a read data first-in-first-out (FIFO) buffer and a write data FIFO buffer. The read data FIFO buffer may be used to collect data read from other nodes 102, and may be read by an external device 138 when the external device 138 transmits an appropriate read command. The write data FIFO buffer may be used to collect write data from the external device 138 before the write data is transmitted to another device. Various examples of SPI functionality that may be implemented singly, together, or in any combination, are discussed below with reference to FIGS. 14-48.

The node transceiver 120 may include an interrupt request (IRQ) pin in communication with the bus protocol circuitry 126. When the node transceiver 120 is included in the master node 102-1, the bus protocol circuitry 126 may provide event-driven interrupt requests toward the host 110 via the IRQ pin. When the node transceiver 120 is included in a slave node 102-2 (e.g., when the MSTR pin is low), the IRQ pin may serve as a GPIO pin with interrupt request capability. The node transceiver 120 may include other pins in addition to those shown in FIG. 2 (e.g., as discussed below).

The system 100 may operate in any of a number of different operational modes. The nodes on the bus 106 may each have a register indicating which operational mode is currently enabled. Descriptions follow of examples of various operational modes that may be implemented. In a standby operational mode, bus activity is reduced to enable global power savings; the only traffic required is a minimal downstream preamble to keep the Pas of each node (e.g., the PLL 128) synchronized. In standby operational mode, reads and writes across the bus 106 are not supported. In a discovery operational mode, the master node 102-1 may send predetermined signals out along the bus 106 and wait for suitable responses to map out the topology of slave nodes 102-2 distributed along the bus 106. In a normal operational mode, full register access may be available to and from the slave nodes 102-2 as well as access to and from peripheral devices 108 over the bus 106. Normal mode may be globally configured by the host 110 with or without synchronous upstream data and with or without synchronous downstream data.

Figure 3:
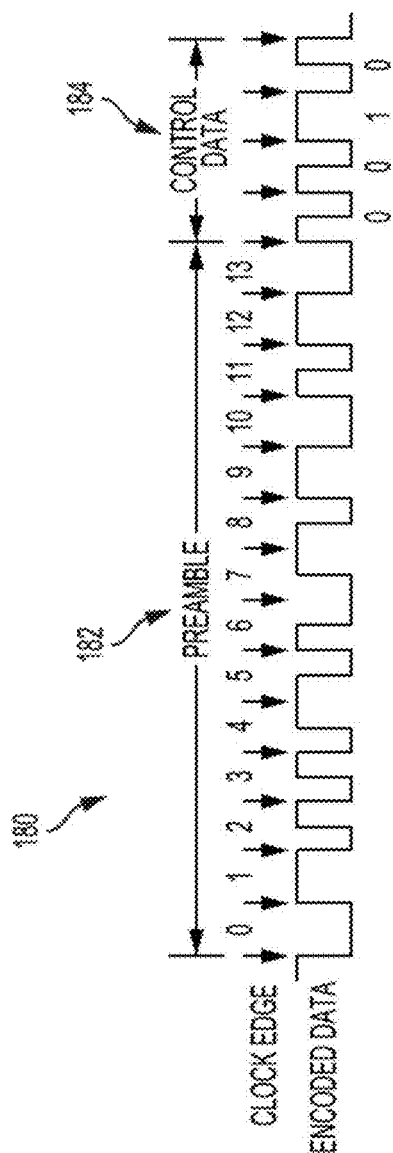
FIG. 3 is a diagram of a portion of a synchronization control frame used for communication in the system of FIG. 1, in accordance with various embodiments.

FIG. 3 is a diagram of a portion of a synchronization control frame 180 used for communication in the system 100, in accordance with various embodiments. In particular, the synchronization control frame 180 may be used for data clock recovery and PLL synchronization, as discussed below. As noted above, because communications over the bus 106 may occur in both directions, communications may be time-multiplexed into downstream portions and upstream portions. In a downstream portion, a synchronization control frame and downstream data may be transmitted from the master node 102-1, while in an upstream portion, a synchronization response frame, and upstream data may be transmitted to the master node 102-1 from each of the slave nodes 102-2. The synchronization control frame 180 may include a preamble 182 and control data 184. Each slave node 102-2 may be configured to use the preamble 182 of the received synchronization control frame 180 as a time base for feeding the PLL 128. To facilitate this, a preamble 182 does not follow the "rules" of valid control data 184, and thus can be readily distinguished from the control data 184.

Figure 5:
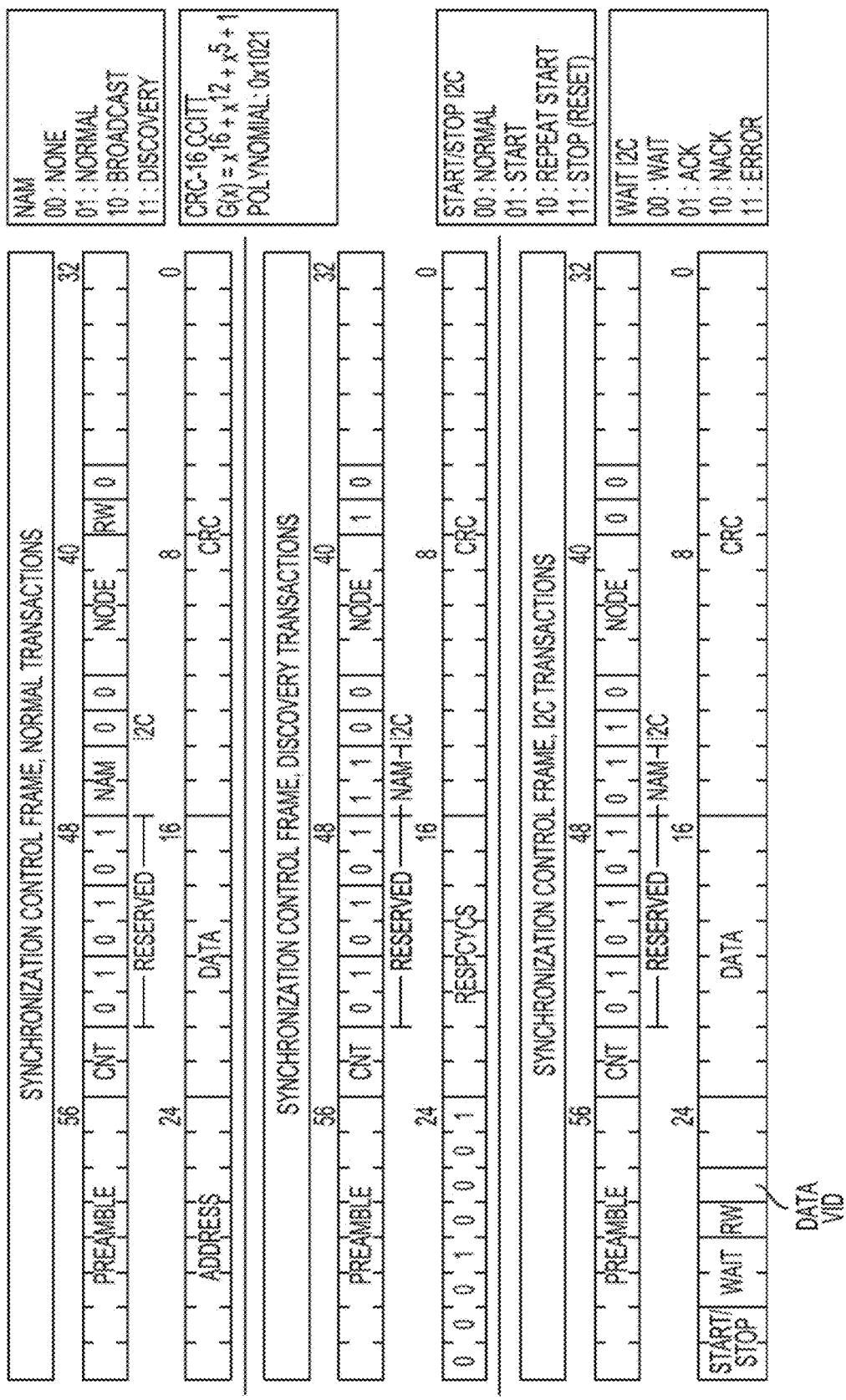
FIG. 5 illustrates example formats for a synchronization control frame in different modes of operation of the system of FIG. 1, in accordance with various embodiments.

For example, in some embodiments, communication along the bus 106 may be encoded using a clock first, transition on zero differential Manchester coding scheme. According to such an encoding scheme, each bit time begins with a clock transition. If the data value is zero, the encoded signal transitions again in the middle of the bit time. If the data value is one, the encoded signal does not transition again. The preamble 182 illustrated in FIG. 5 may violate the encoding protocol (e.g., by having clock transitions that do not occur at the beginning of bit times 5, 7, and 8), which means that the preamble 182 may not match any legal (e.g., correctly encoded) pattern for the control data 184. In addition, the preamble 182 cannot be reproduced by taking a legal pattern for the control data 184 and forcing the bus 106 high or low for a single bit time or for a multiple bit time period. The preamble 182 illustrated in FIG. 5 is simply illustrative, and the synchronization control frame 180 may include different preambles 182 that may violate the encoding used by the control data 184 in any suitable manner.

The bus protocol circuitry 126 may include differential Manchester decoder circuitry that runs on a clock recovered from the bus 106 and that detects the synchronization control frame 180 to send a frame sync indicator to the PLL 128. In this manner, the synchronization control frame 180 may be detected without using a system clock or a higher-speed oversampling clock. Consequently, the slave nodes 102-2 can receive a PLL synchronization signal from the bus 106 without requiring a crystal clock source at the slave nodes 102-2.

Figure 4:
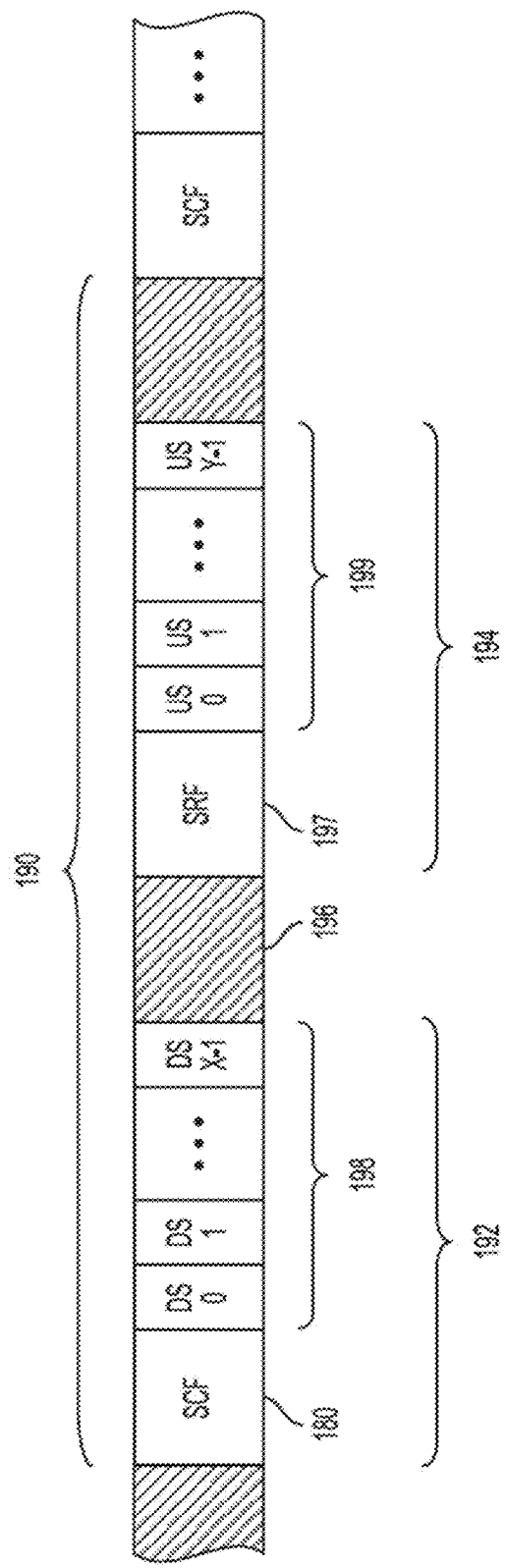
FIG. 4 is a diagram of a superframe used for communication in the system of FIG. 1, in accordance with various embodiments.
Figure 6:
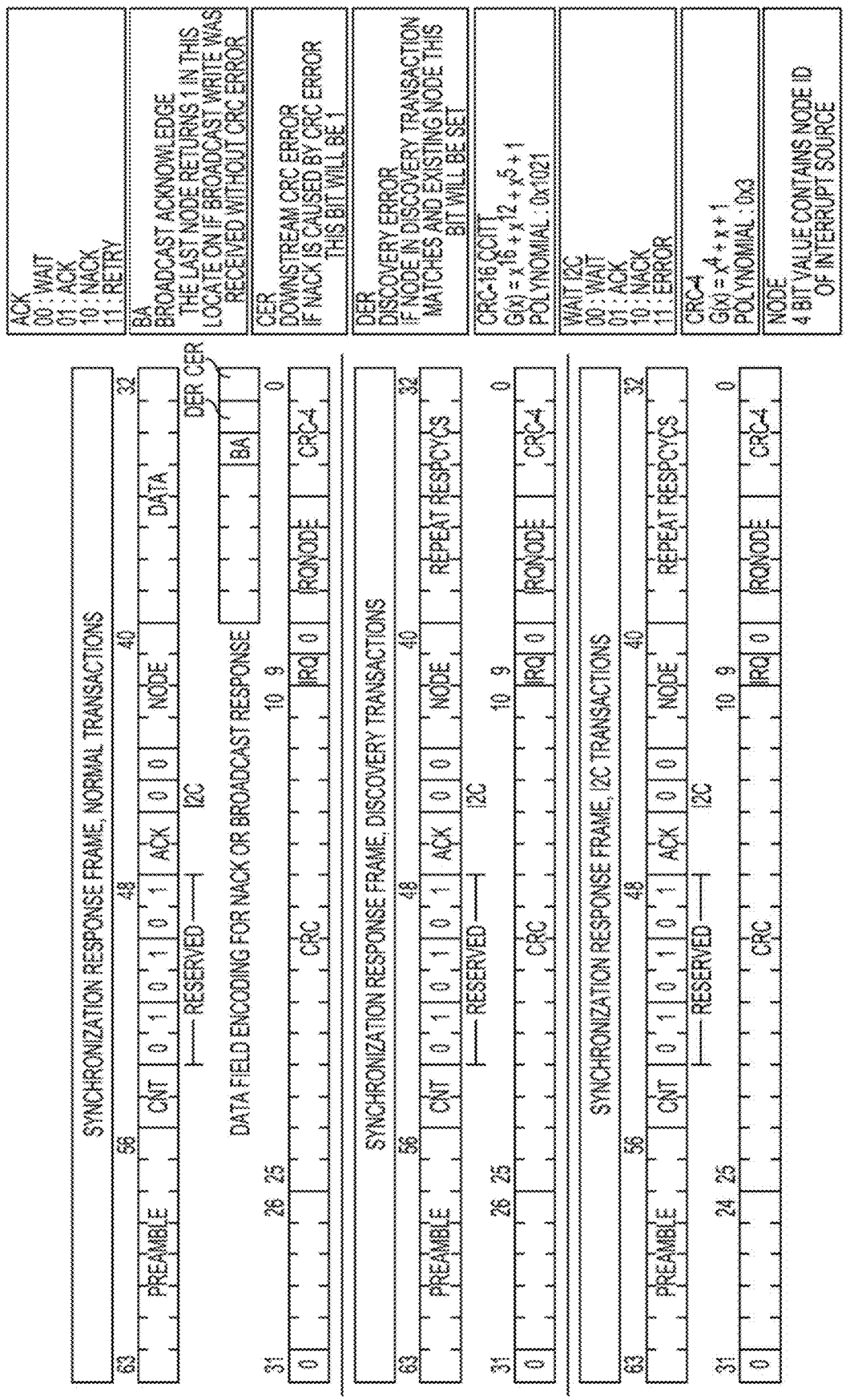
FIG. 6 illustrates example formats for a synchronization response frame at different modes of operation of the system of FIG. 1, in accordance with various embodiments.

As noted above, communications along the bus 106 may occur in periodic superframes. FIG. 4 is a diagram of a superframe 190, in accordance with various embodiments. As shown in FIG. 6, a superframe may begin with a synchronization control frame 180. When the synchronization control frame 180 is used as a timing source for the PLL 128, the frequency at which superframes are communicated ("the superframe frequency") may be the same as the synchronization signal frequency. In some embodiments in which audio data is transmitted along the bus 106, the superframe frequency may be the same as the audio sampling frequency used in the system 100 (e.g., either 48 kHz or 44.1 kHz), but any suitable superframe frequency may be used. Each superframe 190 may be divided into periods of downstream transmission 192, periods of upstream transmission 194, and periods of no transmission 196 (e.g., when the bus 106 is not driven).

In FIG. 4, the superframe 190 is shown with an initial period of downstream transmission 192 and a later period of upstream transmission 194. The period of downstream transmission 192 may include a synchronization control frame 180 and X downstream data slots 198, where X can be zero. Substantially all signals on the bus 106 may be line-coded and a synchronization signal forwarded downstream from the master node 102-1 to the last slave node 102-2 (e.g., the slave node 102-2C) in the form of the synchronization preamble 182 in the synchronization control frame 180, as discussed above. Downstream, TDM, synchronous data may be included in the X downstream data slots 198 after the synchronization control frame 180. The downstream data slots 198 may have equal width. As discussed above, the PLL 128 may provide the clock that a node uses to time communications over the bus 106. In some embodiments in which the bus 106 is used to transmit audio data, the PLL 128 may operate at a multiple of the audio sampling frequency (e.g., 1024 times the audio sampling frequency, resulting in 1024-bit clocks in each superframe).

The period of upstream transmission 194 may include a synchronization response frame 197 and Y upstream data slots 199, where Y can be zero. In some embodiments, each slave node 102-2 may consume a portion of the downstream data slots 198. The last slave node (e.g., slave node 2 in FIG. 1) may respond (after a predetermined response time stored in a register of the last slave node) with a synchronization response frame 197. Upstream, TDM, synchronous data may be added by each slave node 102-2 in the upstream data slots 199 directly after the synchronization response frame 197. The upstream data slots 199 may have equal width. A slave node 102-2 that is not the last slave node (e.g., the slave nodes 0 and 1 in FIG. 1) may replace the received synchronization response frame 197 with its own upstream response if a read of one of its registers was requested in the synchronization control frame 180 of the superframe 190 or if a remote I2C read was requested in the synchronization control frame 180 of the superframe 190.

As discussed above, the synchronization control frame 180 may begin each downstream transmission. In some embodiments, the synchronization control frame 180 may be 64 bits in length, but any other suitable length may be used. The synchronization control frame 180 may begin with the preamble 182, as noted above. In some embodiments, when the synchronization control frame 180 is retransmitted by a slave node 102-2 to a downstream slave node 102-2, the preamble 182 may be generated by the transmitting slave node 102-2, rather than being retransmitted.

The control data 184 of the synchronization control frame 180 may include fields that contain data used to control transactions over the bus 106. Examples of these fields are discussed below, and some embodiments are illustrated in FIG. 5. In particular, FIG. 5 illustrates example formats for the synchronization control frame 180 in normal mode, I2C mode, and discovery mode, in accordance with various embodiments. In some embodiments, a different preamble 182 or synchronization control frame 180 entirely may be used in standby mode so that the slave nodes 102-2 do not need to receive all of the synchronization control frame 180 until a transition to normal mode is sent.

In some embodiments, the synchronization control frame 180 may include a count (CNT) field. The CNT field may have any suitable length (e.g., 2 bits) and may be incremented (modulo the length of the field) from the value used in the previous superframe. A slave node 102-2 that receives a CNT value that is unexpected may be programmed to return an interrupt.

In some embodiments, the synchronization control frame 180 may include a node addressing mode (NAM) field. The NAM field may have any suitable length (e.g., 2 bits) and may be used to control access to registers of a slave node 102-2 over the bus 106. In normal mode, registers of a slave node 102-2 may be read from and/or written to based on the ID of the slave node 102-2 and the address of the register. Broadcast transactions are writes which should be taken by every slave node 102-2. In some embodiments, the NAM field may provide for four node addressing modes, including "none" (e.g., data not addressed to any particular slave node 102-2), "normal" (e.g., data unicast to a specific slave node 102-2 specified in the address field discussed below), "broadcast" (e.g., addressed to all slave nodes 102-2), and "discovery."

In some embodiments, the synchronization control frame 180 may include an I2C field. The I2C field may have any suitable length (e.g., 1 bit) and may be used to indicate that the period of downstream transmission 192 includes an I2C transaction. The I2C field may indicate that the host 110 has provided instructions to remotely access a peripheral device 108 that acts as an I2C slave with respect to an associated slave node 102-2.

In some embodiments, the synchronization control frame 180 may include a node field. The node field may have any suitable length (e.g., 4 bits) and may be used to indicate which slave node is being addressed for normal and I2C accesses. In discovery mode, this field may be used to program an identifier for a newly discovered slave node 102-2 in a node ID register of the slave node 102-2. Each slave node 102-2 in the system 100 may be assigned a unique ID when the slave node 102-2 is discovered by the master node 102-1, as discussed below. In some embodiments, the master node 102-1 does not have a node ID, while in other embodiments, the master node 102-1 may have a node ID. In some embodiments, the slave node 102-2 attached to the master node 102-1 on the bus 106 (e.g., the slave node 0 in FIG. 1) will be slave node 0, and each successive slave node 102-2 will have a number that is 1 higher than the previous slave node. However, this is simply illustrative, and any suitable slave node identification system may be used.

In some embodiments, the synchronization control frame 180 may include a read/write (RW) field. The RW field may have any suitable length (e.g., 1 bit) and may be used to control whether normal accesses are reads (e.g., RW=1) or writes (e.g., RW=0).

In some embodiments, the synchronization control frame 180 may include an address field. The address field may have any suitable length (e.g., 8 bits) and may be used to address specific registers of a slave node 102-2 through the bus 106. For I2C transactions, the address field may be replaced with I2C control values, such as START/STOP, WAIT, RW, and DATA VLD. For discovery transactions, the address field may have a predetermined value (e.g., as illustrated in FIG. 5).

In some embodiments, the synchronization control frame 180 may include a data field. The data field may have any suitable length (e.g., 8 bits) and may be used for normal, I2C, and broadcast writes. The RESPCYCS value, multiplied by 4, may be used to determine how many cycles a newly discovered node should allow to elapse between the start of the synchronization control frame 180 being received and the start of the synchronization response frame 197 being transmitted. When the NAM field indicates discovery mode, the node address and data fields discussed below may be encoded as a RESPCYCS value that, when multiplied by a suitable optional multiplier (e.g., 4), indicates the time, in bits, from the end of the synchronization control frame 180 to the start of the synchronization response frame 197. This allows a newly discovered slave node 102-2 to determine the appropriate time slot for upstream transmission.

In some embodiments, the synchronization control frame 180 may include a cyclic redundancy check (CRC) field. The CRC field may have any suitable length (e.g., 16 bits) and may be used to transmit a CRC value for the control data 184 of the synchronization control frame 180 following the preamble 182. In some embodiments, the CRC may be calculated in accordance with the CCITT-CRC error detection scheme.

In some embodiments, at least a portion of the synchronization control frame 180 between the preamble 182 and the CRC field may be scrambled in order to reduce the likelihood that a sequence of bits in this interval will periodically match the preamble 182 (and thus may be misinterpreted by the slave node 102-2 as the start of a new superframe 190), as well as to reduce electromagnetic emissions as noted above. In some such embodiments, the CNT field of the synchronization control frame 180 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 102-2 or to reduce the likelihood that the preamble 182 shows up elsewhere in the synchronization control frame 180, in addition to or in lieu of techniques such as scrambling and/or error encoding as discussed above. For example, a longer synchronization sequence may be used so as to reduce the likelihood that a particular encoding of the remainder of the synchronization control frame 180 will match it. Additionally or alternatively, the remainder of the synchronization control frame may be structured so that the synchronization sequence cannot occur, such as by placing fixed "0" or "1" values at appropriate bits.

The master node 102-1 may send read and write requests to the slave nodes 102-2, including both requests specific to communication on the bus 106 and I2C requests. For example, the master node 102-1 may send read and write requests (indicated using the RW field) to one or more designated slave nodes 102-2 (using the NAM and node fields) and can indicate whether the request is a request for the slave node 102-2 specific to the bus 106, an I2C request for the slave node 102-2, or an I2C request to be passed along to an I2C-compatible peripheral device 108 coupled to the slave node 102-2 at one or more I2C ports of the slave node 102-2.

Turning to upstream communication, the synchronization response frame 197 may begin each upstream transmission. In some embodiments, the synchronization response frame 197 may be 64 bits in length, but any other suitable length may be used. The synchronization response frame 197 may also include a preamble, as discussed above with reference to the preamble 182 of the synchronization control frame 180, followed by data portion. At the end of a downstream transmission, the last slave node 102-2 on the bus 106 may wait until the RESPCYCS counter has expired and then begin transmitting a synchronization response frame 197 upstream. If an upstream slave node 102-2 has been targeted by a normal read or write transaction, a slave node 102-2 may generate its own synchronization response frame 197 and replace the one received from downstream. If any slave node 102-2 does not see a synchronization response frame 197 from a downstream slave node 102-2 at the expected time, the slave node 102-2 will generate its own synchronization response frame 197 and begin transmitting it upstream.

The data portion of the synchronization response frame 197 may include fields that contain data used to communicate response information back to the master node 102-1. Examples of these fields are discussed below, and some embodiments are illustrated in FIG. 6. In particular, FIG. 6 illustrates example formats for the synchronization response frame 197 in normal mode, I2C mode, and discovery mode, in accordance with various embodiments.

In some embodiments, the synchronization response frame 197 may include a count (CNT) field. The CNT field may have any suitable length (e.g., 2 bits) and may be used to transmit the value of the CNT field in the previously received synchronization control frame 180.

In some embodiments, the synchronization response frame 197 may include an acknowledge (ACK) field. The ACK field may have any suitable length (e.g., 2 bits), and may be inserted by a slave node 102-2 to acknowledge a command received in the previous synchronization control frame 180 when that slave node 102-2 generates the synchronization response frame 197. Example indicators that may be communicated in the ACK field include wait, acknowledge, not acknowledge (NACK), and retry. In some embodiments, the ACK field may be sized to transmit an acknowledgment by a slave node 102-2 that it has received and processed a broadcast message (e.g., by transmitting a broadcast acknowledgment to the master node 102-1). In some such embodiments, a slave node 102-2 also may indicate whether the slave node 102-2 has data to transmit (which could be used, for example, for demand-based upstream transmissions, such as non-TDM inputs from a keypad or touchscreen, or for prioritized upstream transmission, such as when the slave node 102-2 wishes to report an error or emergency condition).

In some embodiments, the synchronization response frame 197 may include an I2C field. The I2C field may have any suitable length (e.g., 1 bit) and may be used to transmit the value of the I2C field in the previously received synchronization control frame 180.

In some embodiments, the synchronization response frame 197 may include a node field. The node field may have any suitable length (e.g., 4 bits) and may be used to transmit the ID of the slave node 102-2 that generates the synchronization response frame 197.

In some embodiments, the synchronization response frame 197 may include a data field. The data field may have any suitable length (e.g., 8 bits), and its value may depend on the type of transaction and the ACK response of the slave node 102-2 that generates the synchronization response frame 197. For discovery transactions, the data field may include the value of the RESPCYCS field in the previously received synchronization control frame 180. When the ACK field indicates a NACK, or when the synchronization response frame 197 is responding to a broadcast transaction, the data field may include a broadcast acknowledge (BA) indicator (in which the last slave node 102-2 may indicate if the broadcast write was received without error), a discovery error (DER) indicator (indicating whether a newly discovered slave node 102-2 in a discovery transaction matches an existing slave node 102-2), and a CRC error (CER) indicator (indicating whether a NACK was caused by a CRC error).

In some embodiments, the synchronization response frame 197 may include a CRC field. The CRC field may have any suitable length (e.g., 16 bits) and may be used to transmit a CRC value for the portion of the synchronization response frame 197 between the preamble and the CRC field.

In some embodiments, the synchronization response frame 197 may include an interrupt request (IRQ) field. The IRQ field may have any suitable length (e.g., 1 bit) and may be used to indicate that an interrupt has been signaled from a slave node 102-2.

In some embodiments, the synchronization response frame 197 may include an IRQ node (IRQNODE) field. The IRQNODE field may have any suitable length (e.g., 4 bits) and may be used to transmit the ID of the slave node 102-2 that has signaled the interrupt presented by the IRQ field. In some embodiments, the slave node 102-2 for generating the IRQ field will insert its own ID into the IRQNODE field.

In some embodiments, the synchronization response frame 197 may include a second CRC (CRC-4) field. The CRC-4 field may have any suitable length (e.g., 4 bits) and may be used to transmit a CRC value for the IRQ and IRQNODE fields.

In some embodiments, the synchronization response frame 197 may include an IRQ field, an IRQNODE field, and a CRC-4 field as the last bits of the synchronization response frame 197 (e.g., the last 10 bits). As discussed above, these interrupt-related fields may have their own CRC protection in the form of CRC-4 (and thus not protected by the preceding CRC field). Any slave node 102-2 that needs to signal an interrupt to the master node 102-1 will insert its interrupt information into these fields. In some embodiments, a slave node 102-2 with an interrupt pending may have higher priority than any slave node 102-2 further downstream that also has an interrupt pending. The last slave node 102-2 along the bus 106 (e.g., the slave node 2 in FIG. 1) may always populate these interrupt fields. If the last slave node 102-2 has no interrupt pending, the last slave node 102-2 may set the IRQ bit to 0, the IRQNODE field to its node ID, and provide the correct CRC-4 value. For convenience, a synchronization response frame 197 that conveys an interrupt may be referred to herein as an "interrupt frame."

In some embodiments, at least a portion of the synchronization response frame 197 between the preamble 182 and the CRC field may be scrambled in order to reduce emissions. In some such embodiments, the CNT field of the synchronization response frame 197 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 102-2 or to reduce the likelihood that the preamble 182 shows up elsewhere in the synchronization response frame 197, in addition to or in lieu of techniques such as scrambling and/or error encoding as discussed above. For example, a longer synchronization sequence may be used so as to reduce the likelihood that a particular encoding of the remainder of the synchronization response frame 197 will match it. Additionally or alternatively, the remainder of the synchronization response frame may be structured so that the synchronization sequence cannot occur, such as by placing fixed "0" or "1" values at appropriate bits.

Figure 7:
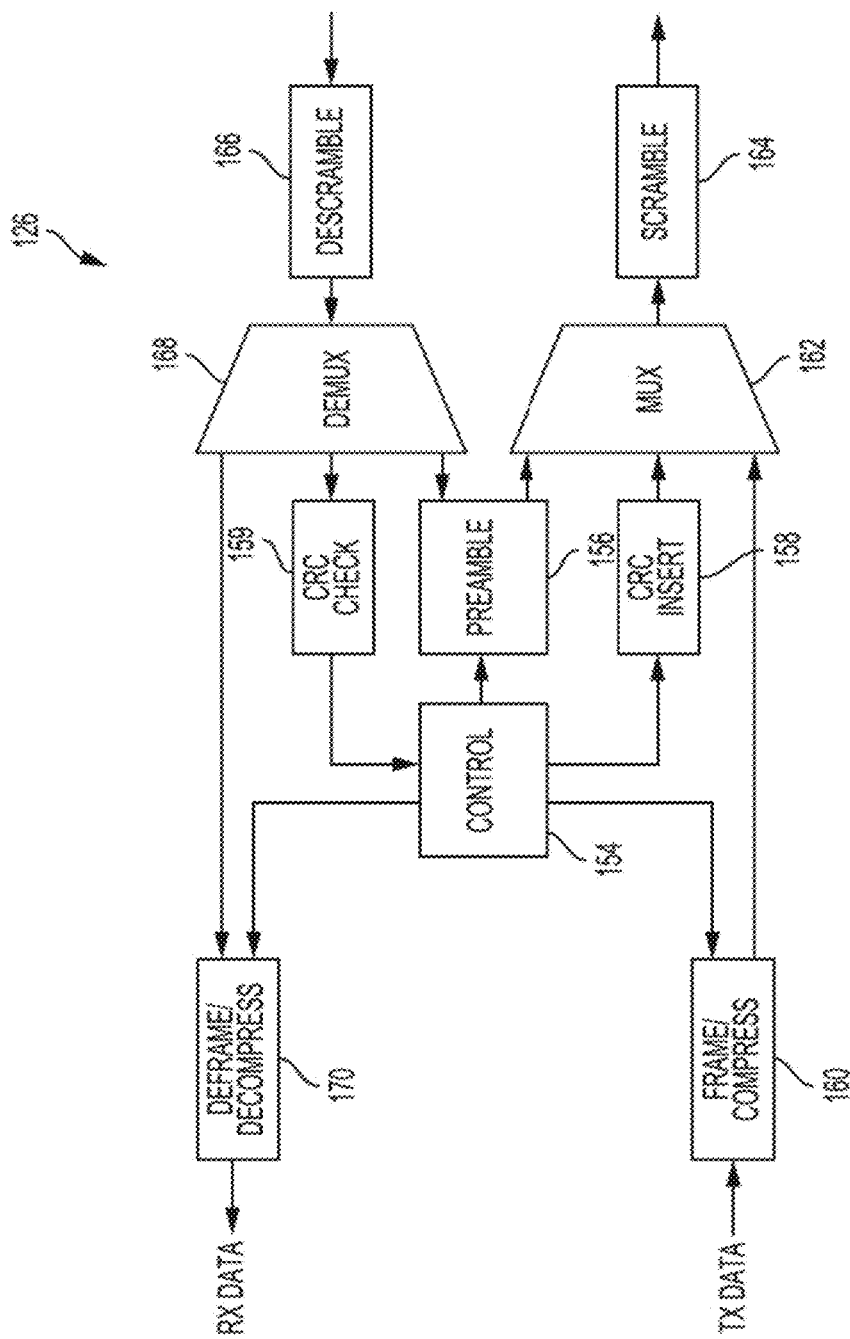
FIG. 7 is a block diagram of various components of the bus protocol circuitry of FIG. 2, in accordance with various embodiments.

FIG. 7 is a block diagram of the bus protocol circuitry 126 of FIG. 2, in accordance with various embodiments. The bus protocol circuitry 126 may include control circuitry 154 to control the operation of the node transceiver 120 in accordance with the protocol for the bus 106 described herein. In particular, the control circuitry 154 may control the generation of synchronization frames for transmission (e.g., synchronization control frames or synchronization response frames, as discussed above), the processing of received synchronization frames, and the performance of control operations specified in received synchronization control frames. The control circuitry 154 may include programmable registers, as discussed below. The control circuitry 154 may create and receive synchronization control frames, react appropriately to received messages (e.g., associated with a synchronization control frame when the bus protocol circuitry 126 is included in a slave node 102-2 or from an I2C device when the bus protocol circuitry 126 is included in a master node 102-1), and adjust the framing to the different operational modes (e.g., normal, discovery, standby, etc.).

When the node transceiver 120 is preparing data for transmission along the bus 106, preamble circuitry 156 may be configured to generate preambles for synchronization frames for transmission, and to receive preambles from received synchronization frames. In some embodiments, a downstream synchronization control frame preamble may be sent by the master node 102-1 every 1024 bits. As discussed above, one or more slave nodes 102-2 may synchronize to the downstream synchronization control frame preamble and generate local, phase-aligned master clocks from the preamble.

CRC insert circuitry 158 may be configured to generate one or more CRCs for synchronization frames for transmission. Frame/compress circuitry 160 may be configured to take incoming data from the I2S/TDM/PDM transceiver 127 (e.g., from a frame buffer associated with the transceiver 127), the I2C transceiver 129, and/or the SPI transceiver 136, optionally compress the data, and optionally generate parity check bits or error correction codes (ECC) for the data. A multiplexer (MUX) 162 may multiplex a preamble from the preamble circuitry 156, synchronization frames, and data into a stream for transmission. In some embodiments, the transmit stream may be scrambled by scrambling circuitry 164 before transmission.

For example, in some embodiments, the frame/compress circuitry 160 may apply a floating point compression scheme. In such an embodiment, the control circuitry 154 may transmit 3 bits to indicate how many repeated sign bits are in the number, followed by a sign bit and N-4 bits of data, where N is the size of the data to be transmitted over the bus 106. The use of data compression may be configured by the master node 102-1 when desired.

In some embodiments, the receive stream entering the node transceiver 120 may be descrambled by the descrambling circuitry 166. A demultiplexer (DEMUX) 168 may demultiplex the preamble, synchronization frames, and data from the receive stream. CRC check circuitry 159 on the receive side may check received synchronization frames for the correct CRC. When the CRC check circuitry 159 identifies a CRC failure in an incoming synchronization control frame 180, the control circuitry 154 may be notified of the failure and will not perform any control commands in the control data 184 of the synchronization control frame 180. When the CRC check circuitry 159 identifies a CRC failure in an incoming synchronization response frame 197, the control circuitry 154 may be notified of the failure and may generate an interrupt for transmission to the host 110 in an interrupt frame. Deframe/decompress circuitry 170 may accept receive data, optionally check its parity, optionally perform error detection and correction (e.g., single error correction—double error detection (SECDED)), optionally decompress the data, and may write the receive data to the I2S/TDM/PDM transceiver 127 (e.g., a frame buffer associated with the transceiver 127), the I2C transceiver 129, and/or the SPI transceiver 136.

As discussed above, upstream and downstream data may be transmitted along the bus 106 in TDM data slots within a superframe 190. The control circuitry 154 may include registers dedicated to managing these data slots on the bus 106, a number of examples of which are discussed below. When the control circuitry 154 is included in a master node 102-1, the values in these registers may be programmed into the control circuitry 154 by the host 110. When the control circuitry 154 is included in a slave node 102-2, the values in these registers may be programmed into the control circuitry 154 by the master node 102-1.

In some embodiments, the control circuitry 154 may include a downstream slots (DNSLOTS) register. When the node transceiver 120 is included in the master node 102-1, this register may hold the value of the total number of downstream data slots. This register may also define the number of data slots that will be used for combined I2S/TDM/PDM receive by the I2S/TDM/PDM transceiver 127 in the master node 102-1. In a slave node 102-2, this register may define the number of data slots that are passed downstream to the next slave node 102-2 before or after the addition of locally generated downstream slots, as discussed in further detail below with reference to LDNSLOTS.

In some embodiments, the control circuitry 154 may include a local downstream slots (LDNSLOTS) register. This register may be unused in the master node 102-1. In a slave node 102-2, this register may define the number of data slots that the slave node 102-2 will use and not retransmit. Alternatively, this register may define the number of slots that the slave node 102-2 may contribute to the downstream bus link 106.

In some embodiments, the control circuitry 154 may include an upstream slots (UPSLOTS) register. In the master node 102-1, this register may hold the value of the total number of upstream data slots. This register may also define the number of slots that will be used for I2S/TDM transmit by the I2S/TDM/PDM transceiver 127 in the master node 102-1. In a slave node 102-2, this register may define the number of data slots that are passed upstream before the slave node 102-2 begins to add its own data.

In some embodiments, the control circuitry 154 may include a local upstream slots (LUPSLOTS) register. This register may be unused in the master node 102-1. In a slave node 102-2, this register may define the number of data slots that the slave node 102-2 will add to the data received from downstream before it is sent upstream. This register may also define the number of data slots that will be used for combined I2S/TDM/PDM receive by the I2S/TDM/PDM transceiver 127 in the slave node 102-2.

In some embodiments, the control circuitry 154 may include a broadcast downstream slots (BCDNSLOTS) register. This register may be unused in the master node 102-1. In a slave node 102-2, this register may define the number of broadcast data slots. In some embodiments, broadcast data slots may always come at the beginning of the data field. The data in the broadcast data slots may be used by multiple slave nodes 102-2 and may be passed downstream by all slave nodes 102-2 whether or not they are used.

In some embodiments, the control circuitry 154 may include a slot format (SLOTFMT) register. This register may define the format of data for upstream and downstream transmissions. The data size for the I2S/TDM/PDM transceiver 127 may also be determined by this register. In some embodiments, valid data sizes include 8, 12, 16, 20, 24, 28, and 32 bits. This register may also include bits to enable floating point compression for downstream and upstream traffic. When floating point compression is enabled, the I2S/TDM data size may be 4 bits larger than the data size over the bus 106. All nodes in the system 100 may have the same values for SLOTFMT when data slots are enabled, and the nodes may be programmed by a broadcast write so that all nodes will be updated with the same value.

FIGS. 8-11 illustrate examples of information exchange along the bus 106, in accordance with various embodiments of the bus protocols described herein. In particular, FIGS. 8-11 illustrate embodiments in which each slave node 102-2 is coupled to one or more speakers and/or one or more microphones as the peripheral device 108. This is simply illustrative, as any desired arrangement of peripheral device 108 may be coupled to any particular slave node 102-2 in accordance with the techniques described herein.

Figure 8:
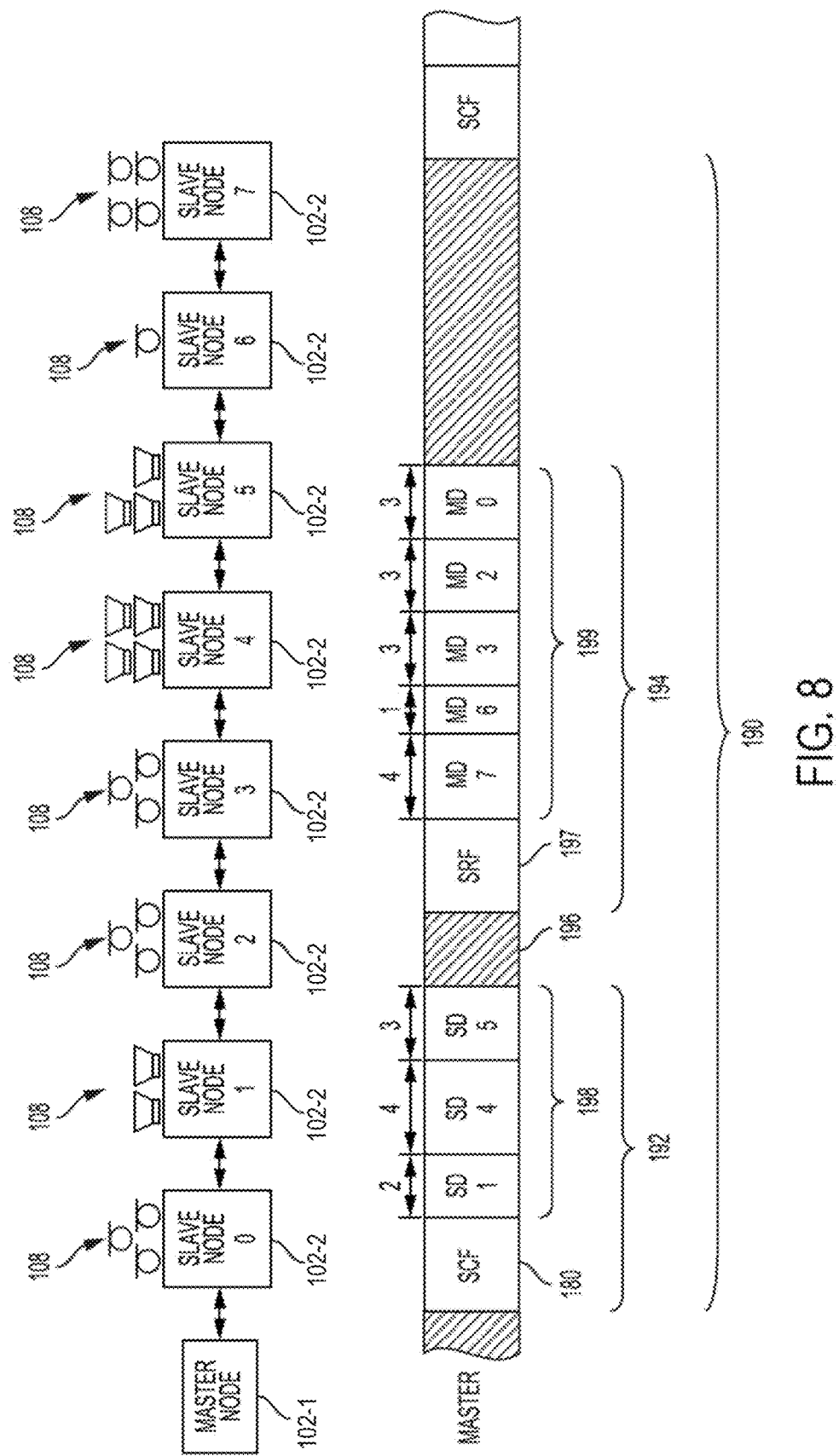
FIGS. 8-11 illustrate examples of information exchange along a two-wire bus, in accordance with various embodiments of the bus protocols described herein.

To begin, FIG. 8 illustrates signaling and timing considerations for bi-directional communication on the bus 106, in accordance with various embodiments. The slave nodes 102-2 depicted in FIG. 8 have various numbers of sensor/actuator elements, and so different amounts of data may be sent to, or received from, the various slave nodes 102-2. Specifically, slave node 1 has two elements, slave node 4 has four elements, and slave node 5 has three elements, so the data transmitted by the master node 102-1 includes two time slots for slave node 1, four time slots for slave node 4, and three time slots for slave node 5. Similarly, slave node 0 has three elements, slave node 2 has three elements, slave node 3 has three elements, slave node 6 has one element, and slave node 7 has four elements, so the data transmitted upstream by those slave nodes 102-2 includes the corresponding number of time slots. It should be noted that there need not have to be a one-to-one correlation between elements and time slots. For example, a microphone array, included in the peripheral device 108, having three microphones may include a DSP that combines signals from the three microphones (and possibly also information received from the master node 102-1 or from other slave nodes 102-2) to produce a single data sample, which, depending on the type of processing, could correspond to a single time slot or multiple time slots.

In FIG. 8, the master node 102-1 transmits a synchronization control frame (SCF) followed by data for speakers coupled to specific slave nodes 102-2 (SD). Each successive slave node 102-2 forwards the SCF and also forwards at least any data destined for downstream slave nodes 102-2. A particular slave node 102-2 may forward all data or may remove data destined for that slave node 102-2. When the last slave node 102-2 receives the SCF, that slave node 102-2 transmits the synchronization response frame (SRF) optionally followed by any data that the slave node 102-2 is permitted to transmit. Each successive slave node 102-2 forwards the SRF along with any data from downstream slave nodes 102-2 and optionally inserts data from one or more microphones coupled to the particular slave nodes 102-2 (MD). In the example of FIG. 8, the master node 102-1 sends data to slave nodes 1, 4, and 5 (depicted in FIG. 8 as active speakers) and receives data from slave nodes 7, 6, 3, 2, and 0 (depicted in FIG. 8 as microphone arrays).

Figure 9:
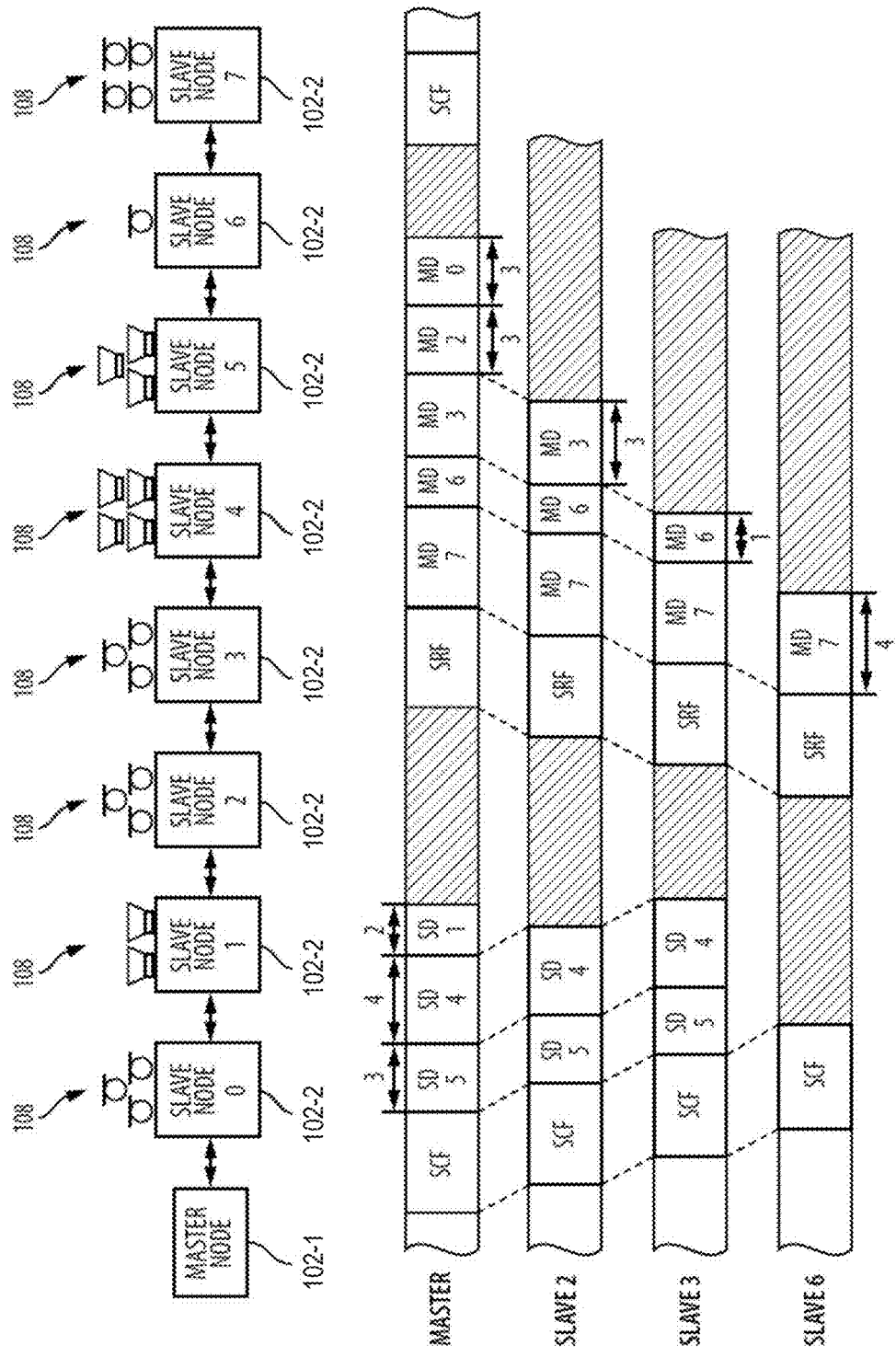

FIG. 9 schematically illustrates the dynamic removal of data from a downstream transmission and insertion of data into an upstream transmission, from the perspective of the downstream DS transceiver 124, in accordance with various embodiments. In FIG. 9, as in FIG. 8, the master node 102-1 transmits a SCF followed by data for slave nodes 1, 4, and 5 (SD) in reverse order (e.g., data for slave node 5 is followed by data for slave node 4, which is followed by data for slave node 1, etc.) (see the row labeled MASTER). When slave node 1 receives this transmission, slave node 1 removes its own data and forwards to slave node 2 only the SCF followed by the data for slave nodes 5 and 4. Slave nodes 2 and 3 forward the data unchanged (see the row labeled SLAVE 2), such that the data forwarded by slave node 1 is received by slave node 4 (see the row labeled SLAVE 3). Slave node 4 removes its own data and forwards to slave node 5 only the SCF followed by the data for slave node 5, and, similarly, slave node 5 removes its own data and forwards to slave node 6 only the SCF. Slave node 6 forwards the SCF to slave node 7 (see the row labeled SLAVE 6).

At this point, slave node 7 transmits to slave node 6 the SRF followed by its data (see the row labeled SLAVE 6). Slave node 6 forwards to slave node 5 the SRF along with the data from slave node 7 and its own data, and slave node 5 in turn forwards to slave node 4 the SRF along with the data from slave nodes 7 and 6. Slave node 4 has no data to add, so it simply forwards the data to slave node 3 (see the row labeled SLAVE 3), which forwards the data along with its own data to slave node 2 (see the row labeled SLAVE 2), which in turn forwards the data along with its own data to slave node 1. Slave node 1 has no data to add, so it forwards the data to slave node 0, which forwards the data along with its own data. As a result, the master node 102-1 receives the SRF followed by the data from slave nodes 7, 6, 3, 2, and 0 (see the row labeled MASTER).

Figure 10:
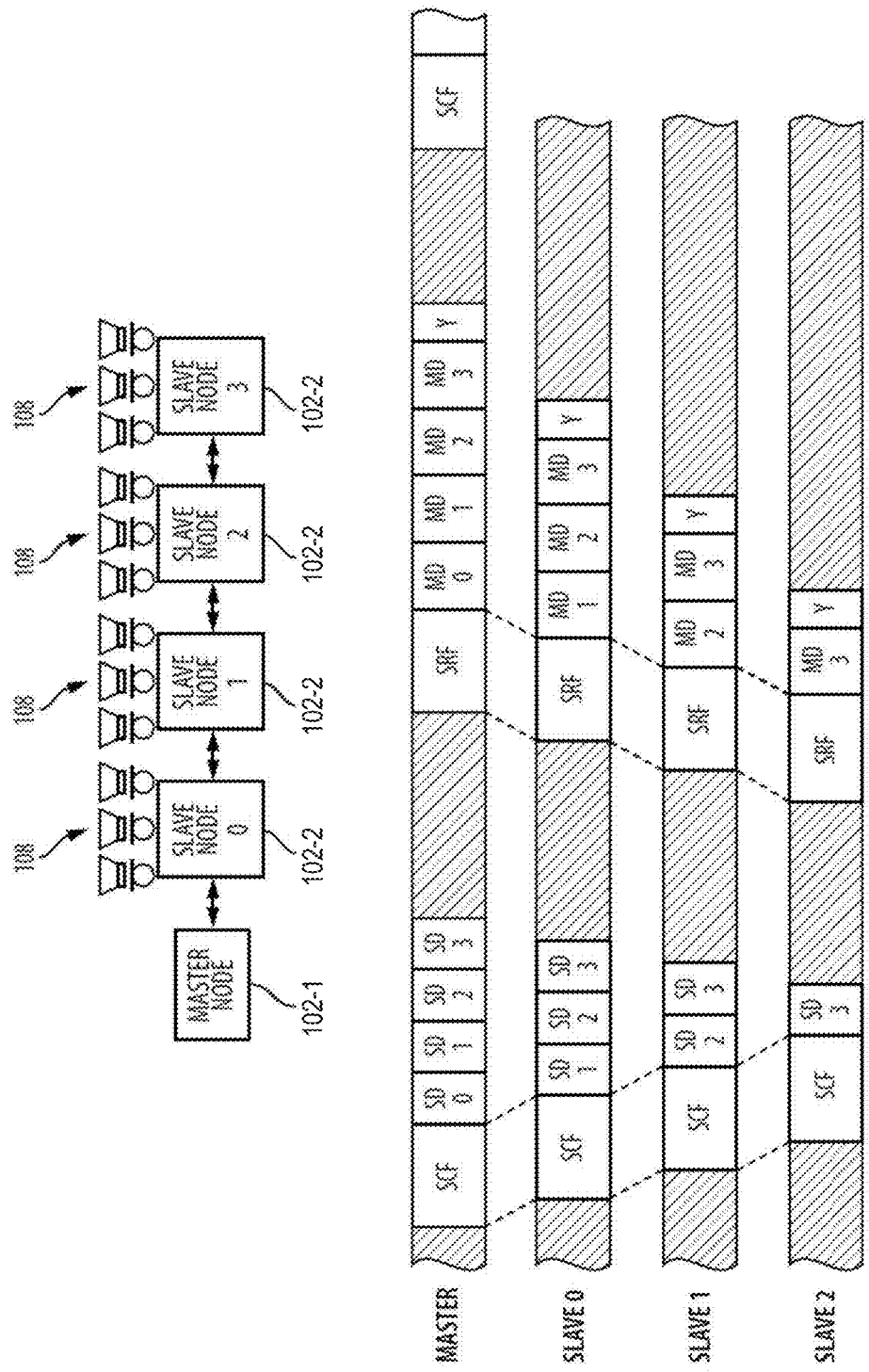

FIG. 10 illustrates another example of the dynamic removal of data from a downstream transmission and insertion of data into an upstream transmission, from the perspective of the downstream DS transceiver 124, as in FIG. 9, although in FIG. 10, the slave nodes 102-2 are coupled with both sensors and actuators as the peripheral device 108 such that the master node 102-1 sends data downstream to all of the slave nodes 102-2 and receives data back from all of the slave nodes 102-2. Also, in FIG. 10, the data is ordered based on the node address to which it is destined or from which it originates. The data slot labeled "V" may be used for a data integrity check or data correction.

Figure 11:
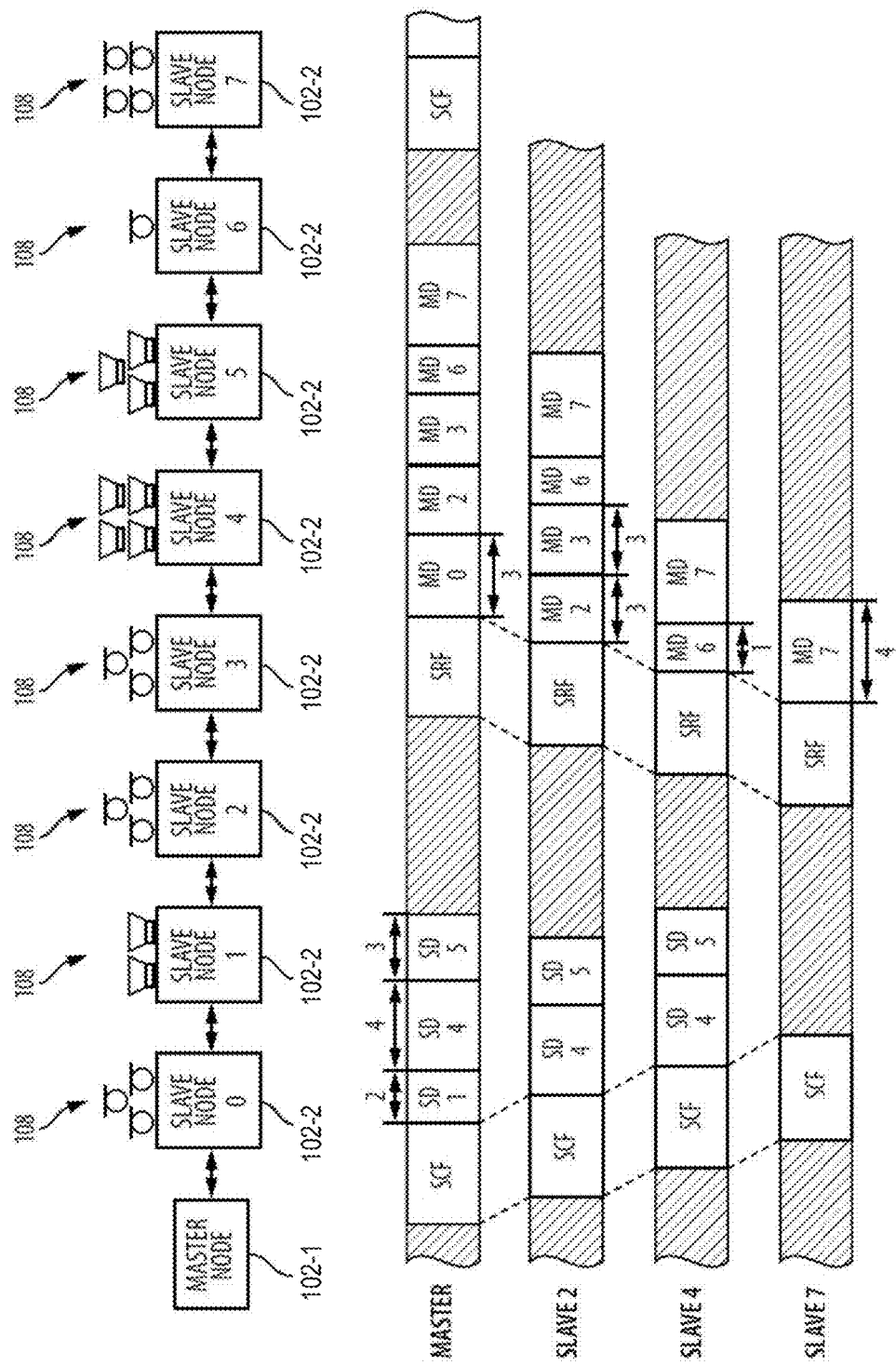

FIG. 11 illustrates another example of the dynamic removal of data from a downstream transmission and insertion of data into an upstream transmission, from the perspective of the downstream DS transceiver 124, as in FIG. 9, although in FIG. 11, the data is conveyed downstream and upstream in sequential order rather than reverse order. Buffering at each slave node 102-2 allows for selectively adding, removing, and/or forwarding data.

As discussed above, each slave node 102-2 may remove data from downstream or upstream transmissions and/or may add data to downstream or upstream transmissions. Thus, for example, the master node 102-1 may transmit a separate sample of data to each of a number of slave nodes 102-2, and each such slave node 102-2 may remove its data sample and forward only data intended for downstream slaves. On the other hand, a slave node 102-2 may receive data from a downstream slave node 102-2 and forward the data along with additional data. One advantage of transmitting as little information as needed is to reduce the amount of power consumed collectively by the system 100.

The system 100 may also support broadcast transmissions (and multicast transmissions) from the master node 102-1 to the slave nodes 102-2, specifically through configuration of the downstream slot usage of the slave nodes 102-2. Each slave node 102-2 may process the broadcast transmission and pass it along to the next slave node 102-2, although a particular slave node 102-2 may "consume" the broadcast message, (i.e., not pass the broadcast transmission along to the next slave node 102-2).

The system 100 may also support upstream transmissions (e.g., from a particular slave node 102-2 to one or more other slave nodes 102-2). Such upstream transmissions can include unicast, multicast, and/or broadcast upstream transmissions. With upstream addressing, as discussed above with reference to downstream transmissions, a slave node 102-2 may determine whether or not to remove data from an upstream transmission and/or whether or not to pass an upstream transmission along to the next upstream slave node 102-2 based on configuration of the upstream slot usage of the slave nodes 102-2. Thus, for example, data may be passed by a particular slave node 102-2 to one or more other slave nodes 102-2 in addition to, or in lieu of, passing the data to the master node 102-1. Such slave-slave relationships may be configured, for example, via the master node 102-1.

Thus, in various embodiments, the slave nodes 102-2 may operate as active/intelligent repeater nodes, with the ability to selectively forward, drop, and add information. The slave nodes 102-2 may generally perform such functions without necessarily decoding/examining all of the data, since each slave node 102-2 knows the relevant time slot(s) within which it will receive/transmit data, and hence can remove data from or add data into a time slot. Notwithstanding that the slave nodes 102-2 may not need to decode/examine all data, the slave nodes 102-2 may typically re-clock the data that it transmits/forwards. This may improve the robustness of the system 100.

Figure 12:
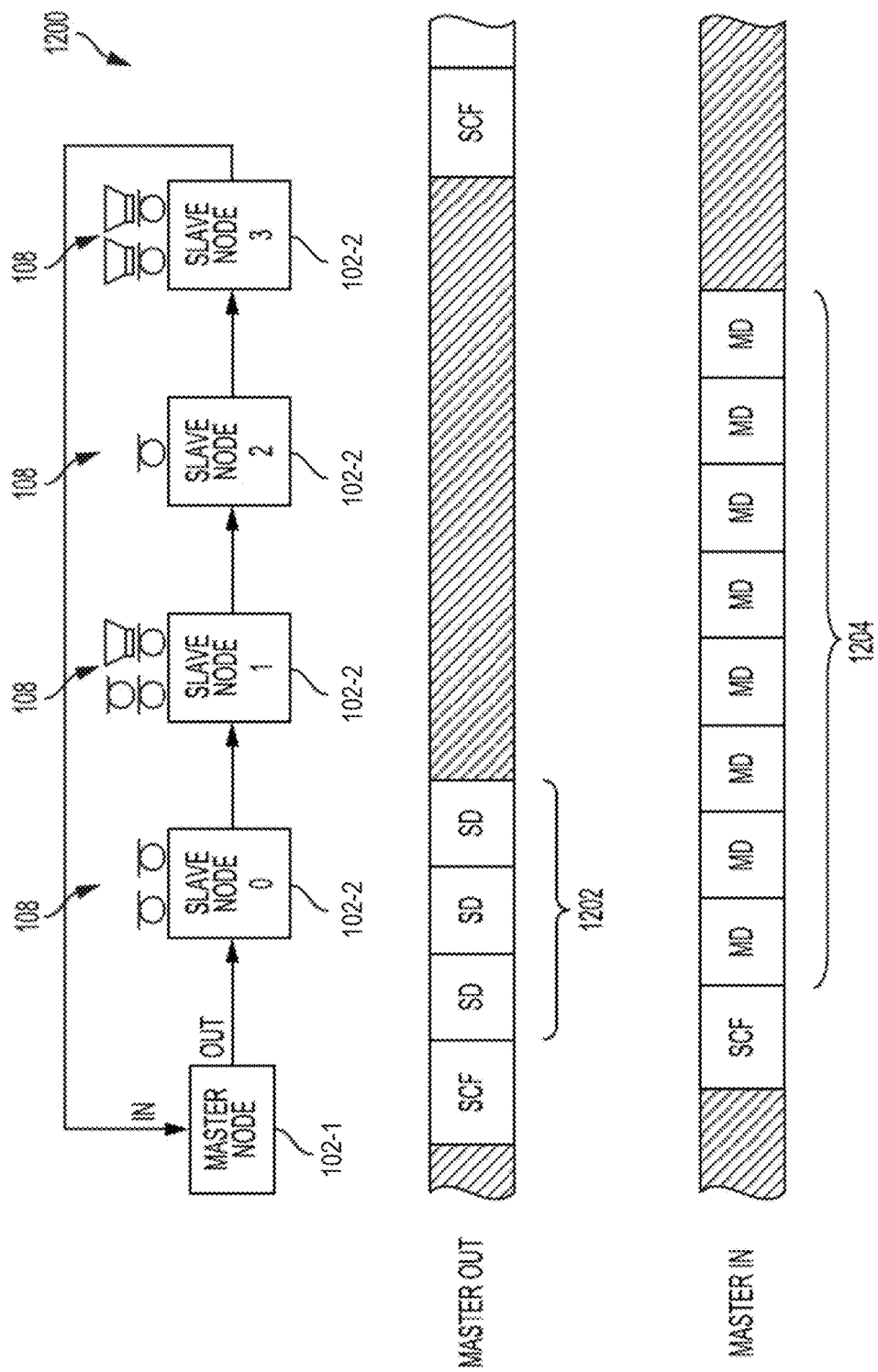
FIG. 12 illustrates a ring topology for the two-wire bus and a unidirectional communication scheme thereon, in accordance with various embodiments.

In some embodiments, the bus 106 may be configured for unidirectional communications in a ring topology. For example, FIG. 12 illustrates an arrangement 1200 of the master node 102-1 and four slave nodes 102-2 in a ring topology, and illustrates signaling and timing considerations for unidirectional communication in the arrangement 1200, in accordance with various embodiments. In such embodiments, the node transceivers 120 in the nodes may include a receive-only transceiver (MASTER IN) and a transmit-only transceiver (MASTER OUT), rather than two bi-directional transceivers for upstream and downstream communication. In the link-layer synchronization scheme illustrated in FIG. 12, the master node 102-1 transmits a SCF 180, optionally followed by "downstream" data 1202 for the three speakers coupled to various slave nodes 102-2 (the data for the different speakers may be arranged in any suitable order, as discussed above with reference to FIGS. 8-11), and each successive slave node 102-2 forwards the synchronization control frame 180 along with any "upstream" data from prior slave nodes 102-2 and "upstream" data of its own to provide "upstream" data 1204 (e.g., the data from the eight different microphones may be arranged in any suitable order, as discussed above with reference to FIGS. 8-11).

As described herein, data may be communicated between elements of the system 100 in any of a number of ways. In some embodiments, data may be sent as part of a set of synchronous data slots upstream (e.g., using the data slots 199) by a slave node 102-2 or downstream (e.g., using the data slots 198) by a slave node 102-2 or a master node 102-1. The volume of such data may be adjusted by changing the number of bits in a data slot, or including extra data slots. Data may also be communicated in the system 100 by inclusion in a synchronization control frame 180 or a synchronization response frame 197. Data communicated this way may include I2C control data from the host 110 (with a response from a peripheral device 108 associated with a slave node 102-2); accesses to registers of the slave nodes 102-2 (e.g., for discovery and configuration of slots and interfaces) that may include write access from the host 110/master node 102-1 to a slave node 102-2 and read access from a slave node 102-2 to the host 110/master node 102-1; and event signaling via interrupts from a peripheral device 108 to the host 110. In some embodiments, GPIO pins may be used to convey information from a slave node 102-2 to the master node 102-1 (e.g., by having the master node 102-1 poll the GPIO pins over I2C, or by having a node transceiver 120 of a slave node 102-2 generate an interrupt at an interrupt request pin). For example, in some such embodiments, a host 110 may send information to the master node 102-1 via I2C, and then the master node 102-1 may send that information to the slave via the GPIO pins. Any of the types of data discussed herein as transmitted over the bus 106 may be transmitted using any one or more of these communication pathways. Other types of data and data communication techniques within the system 100 may be disclosed herein.

Figure 13:
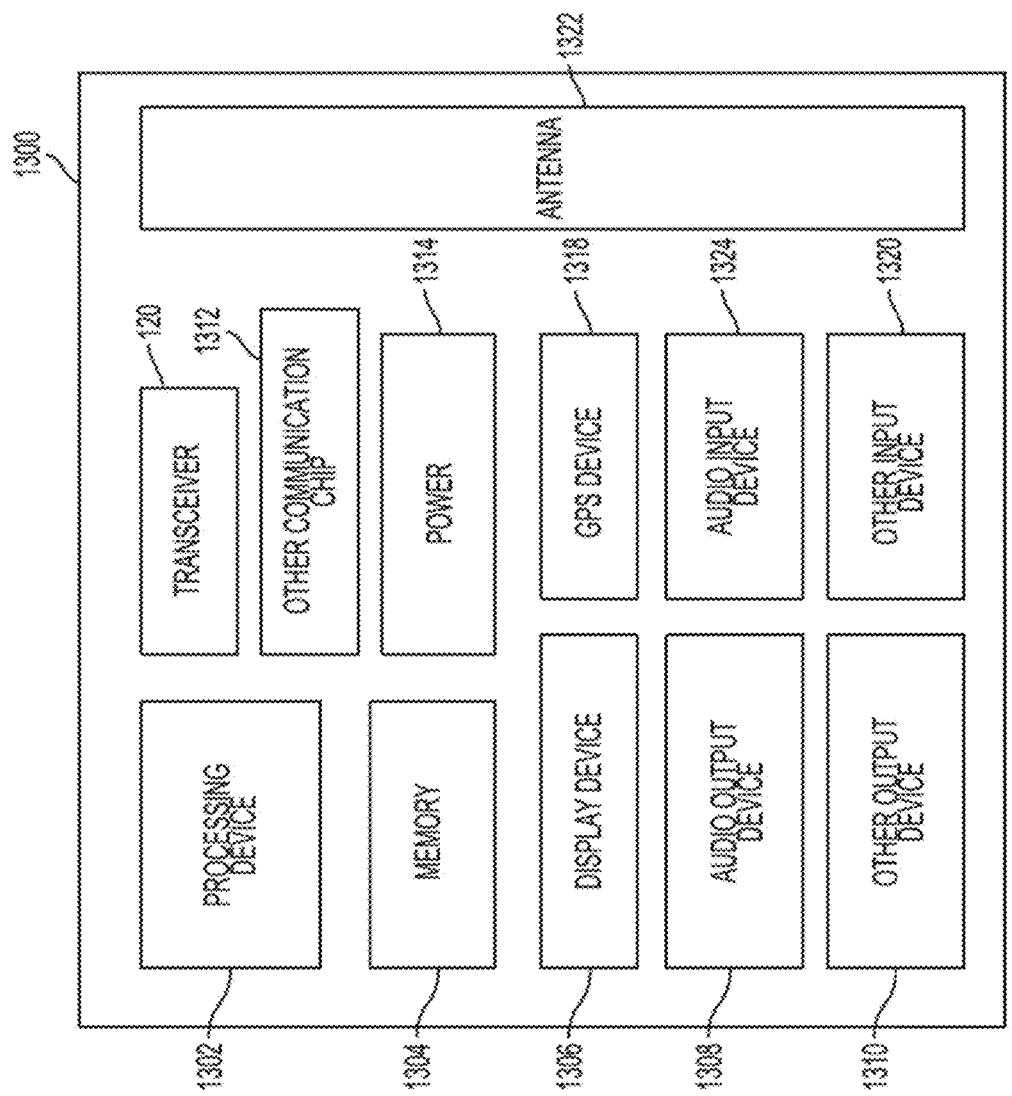
FIG. 13 is a block diagram of a device that may serve as a node or host in the system of FIG. 1, in accordance with various embodiments.

Embodiments of the present disclosure may be implemented into a system using any suitable hardware and/or software to configure as desired. FIG. 13 schematically illustrates a device 1300 that may serve as a host or a node (e.g., a host 110, a master node 102-1, or a slave node 102-2) in the system 100, in accordance with various embodiments. A number of components are illustrated in FIG. 13 as included in the device 1300, but any one or more of these components may be omitted or duplicated, as suitable for the application.

Additionally, in various embodiments, the device 1300 may not include one or more of the components illustrated in FIG. 13, but the device 1300 may include interface circuitry for coupling to the one or more components. For example, the device 1300 may not include a display device 1306, but may include display device interface circuitry (e.g., a connector and driver circuitry) to which a display device 1306 may be coupled. In another set of examples, the device 1300 may not include an audio input device 1324 or an audio output device 1308, but may include audio input or output device interface circuitry (e.g., connectors and supporting circuitry) to which an audio input device 1324 or audio output device 1308 may be coupled.

The device 1300 may include the node transceiver 120, in accordance with any of the embodiments disclosed herein, for managing communication along the bus 106 when the device 1300 is coupled to the bus 106. The device 1300 may include a processing device 1302 (e.g., one or more processing devices), which may be included in the node transceiver 120 or separate from the node transceiver 120. As used herein, the term "processing device" may refer to any device or portion of a device that processes electronic data from registers and/or memory to transform that electronic data into other electronic data that may be stored in registers and/or memory. The processing device 1302 may include one or more DSPs, ASICs, central processing units (CPUs), graphics processing units (GPUs), cryptoprocessors, or any other suitable processing devices. The device 1300 may include a memory 1304, which may itself include one or more memory devices such as volatile memory (e.g., dynamic random access memory (DRAM)), non-volatile memory (e.g., read-only memory (ROM)), flash memory, solid state memory, and/or a hard drive.

In some embodiments, the memory 1304 may be employed to store a working copy and a permanent copy of programming instructions to cause the device 1300 to perform any suitable ones of the techniques disclosed herein. In some embodiments, machine-accessible media (including non-transitory computer-readable storage media), methods, systems, and devices for performing the above-described techniques are illustrative examples of embodiments disclosed herein for communication over a two-wire bus. For example, a computer-readable media (e.g., the memory 1304) may have stored thereon instructions that, when executed by one or more of the processing devices included in the processing device 1302, cause the device 1300 to perform any of the techniques disclosed herein.

In some embodiments, the device 1300 may include another communication chip 1312 (e.g., one or more other communication chips). For example, the communication chip 1312 may be configured for managing wireless communications for the transfer of data to and from the device 1300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

The communication chip 1312 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The one or more communication chips 1312 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The one or more communication chips 1312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The one or more communication chips 1312 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1312 may operate in accordance with other wireless protocols in other embodiments. The device 1300 may include an antenna 1322 to facilitate wireless communications and/or to receive other wireless communications (such as AM or FM radio transmissions).

In some embodiments, the communication chip 1312 may manage wired communications using a protocol other than the protocol for the bus 106 described herein. Wired communications may include electrical, optical, or any other suitable communication protocols. Examples of wired communication protocols that may be enabled by the communication chip 1312 include Ethernet, controller area network (CAN), I2C, media-oriented systems transport (MOST), or any other suitable wired communication protocol.

As noted above, the communication chip 1312 may include multiple communication chips. For instance, a first communication chip 1312 may be dedicated to shorter-range wireless communications such as Wi-Fi or Bluetooth, and a second communication chip 1312 may be dedicated to longer-range wireless communications such as global positioning system (GPS), EDGE, GPRS, CDMA, WiMAX, LTE, EV-DO, or others. In some embodiments, a first communication chip 1312 may be dedicated to wireless communications, and a second communication chip 1312 may be dedicated to wired communications.

The device 1300 may include battery/power circuitry 1314. The battery/power circuitry 1314 may include one or more energy storage devices (e.g., batteries or capacitors) and/or circuitry for coupling components of the device 1300 to an energy source separate from the device 1300 (e.g., AC line power, voltage provided by a car battery, etc.). For example, the battery/power circuitry 1314 may include the upstream bus interface circuitry 132 and the downstream bus interface circuitry 131 discussed above with reference to FIG. 2 and could be charged by the bias on the bus 106.

The device 1300 may include a display device 1306 (or corresponding interface circuitry, as discussed above). The display device 1306 may include any visual indicators, such as a heads-up display, a computer monitor, a projector, a touchscreen display, a liquid crystal display (LCD), a light-emitting diode display, or a flat panel display, for example.

The device 1300 may include an audio output device 1308 (or corresponding interface circuitry, as discussed above). The audio output device 1308 may include any device that generates an audible indicator, such as speakers, headsets, or earbuds, for example.

The device 1300 may include an audio input device 1324 (or corresponding interface circuitry, as discussed above). The audio input device 1324 may include any device that generates a signal representative of a sound, such as microphones, microphone arrays, or digital instruments (e.g., instruments having a musical instrument digital interface (MIDI) output).

The device 1300 may include a GPS device 1318 (or corresponding interface circuitry, as discussed above). The GPS device 1318 may be in communication with a satellite-based system and may receive a location of the device 1300, as known in the art.

The device 1300 may include another output device 1310 (or corresponding interface circuitry, as discussed above). Examples of the other output device 1310 may include an audio codec, a video codec, a printer, a wired or wireless transmitter for providing information to other devices, or an additional storage device. Additionally, any suitable ones of the peripheral devices 108 discussed herein may be included in the other output device 1310.

The device 1300 may include another input device 1320 (or corresponding interface circuitry, as discussed above). Examples of the other input device 1320 may include an accelerometer, a gyroscope, an image capture device, a keyboard, a cursor control device such as a mouse, a stylus, a touchpad, a bar code reader, a Quick Response (QR) code reader, or a radio frequency identification (RFID) reader. Additionally, any suitable ones of the sensors or peripheral devices 108 discussed herein may be included in the other input device 1320.

Any suitable ones of the display, input, output, communication, or memory devices described above with reference to the device 1300 may serve as the peripheral device 108 in the system 100. Alternatively or additionally, suitable ones of the display, input, output, communication, or memory devices described above with reference to the device 1300 may be included in a host (e.g., the host 110) or a node (e.g., a master node 102-1 or a slave node 102-2).

As noted above, in some embodiments, a node 102 may communicate with an SPI device via the SPI transceiver 136 included in the node transceiver 120. In some embodiments, the SPI device may be coupled to the SPI transceiver 136 via the pins of the node transceiver 120. In such embodiments, the SPI device may act as the SPI host while the node 102 acts as the SPI slave; such a mode of operation is referred to herein as "local node SPI functionality," and examples of such functionality are discussed in detail below with reference to FIGS. 14-15.

In some embodiments, an SPI device may be coupled to the SPI transceiver 136 of a first node 102, and the first node 102 may be coupled to a second node 102 via the bus 106. In such embodiments, the SPI device may act as the SPI host while the second node 102 acts as the SPI slave; such a mode of operation may be referred to herein as "remote node SPI functionality," and examples of such functionality are discussed in detail below with reference to FIGS. 16-19.

In some embodiments, a first SPI device may be coupled to the SPI transceiver 136 of a first node 102, the first node 102 may be coupled to a second node 102 via the bus 106, and the SPI transceiver 136 of the second node 102 may be coupled to a second SPI device. In such embodiments, the first SPI device may act as the SPI host while the second SPI device acts as the SPI slave; such a mode of operation may be referred to herein as "remote peripheral SPI functionality," and examples of such functionality are discussed in detail below with reference to FIGS. 20-44.

In some embodiments, an SPI device may be coupled to the SPI transceiver 136 of a first node 102, the first node 102 may be coupled to a second node 102 via the bus 106, and the I2C transceiver 129 of the second node 102 may be coupled to an I2C. In such embodiments, the first SPI device may act as the SPI host, the second node may act as the SPI slave and as an I2C host, and the I2C device acts as the I2C slave; such a mode of operation may be referred to herein as "SPI-to-I2C functionality," and examples of such functionality are discussed in detail below with reference to FIGS. 45-48.

FIG. 14 is a block diagram of a portion of an illustrative two-wire communication system 100 including local node SPI functionality, in accordance with various embodiments. FIG. 14 includes an external device 138 acting as an SPI host 150 and a node 102; the SPI host 150 may communicate with the node 102 via the SPI transceiver 136 included in the node transceiver 120 of the node 102 (not shown). In the embodiment of FIG. 14, the node 102 may act as the SPI slave 140. The node 102 may be a master node 102-1 or a slave node 102-2, and may be coupled to upstream and/or downstream sections of the bus 106 as suitable. During operation of a system 100 including local node SPI functionality, the SPI host 150 may transmit commands to the node 102 (the SPI slave 140) via the SPI interface between the two, and the node 102 may respond via the SPI interface. Although only a single SPI host 150 and a single node 102 (acting as the SPI slave 140) are illustrated in FIG. 14, any of the communication systems 100 disclosed herein may include multiple nodes 102 with local node SPI functionality (e.g., multiple nodes 102 communicating directly via SPI with SPI hosts 150). In some embodiments, SPI transactions performed in accordance with local node SPI functionality may access registers in the node 102 in parallel with access to those registers via the I2C transceiver 129.

In a local node SPI embodiment like the one illustrated in FIG. 14, the SPI host 150 may transmit an SPI write command to the node 102 (the SPI slave 140) to write data to local registers of the node 102, and may transmit an SPI read command to the node 102 to read data from local registers of the node 102; the local node 102 may respond in accordance with the SPI protocol. FIGS. 15A-15B are timing diagrams of commands that may be used in an implementation of local node SPI functionality, in accordance with various embodiments. In particular, FIG. 15A is a timing diagram for a local node SPI register write, while FIG. 15B is a timing diagram for a local node SPI register read. In FIG. 15A, the first byte (0x00 in FIG. 15A) indicates the command type (i.e., a local node SPI register write); although the particular byte 0x00 is illustrated in the figure as indicating a local node SPI register write, any suitable byte code may be defined to indicate a local node SPI register write. More generally, although various ones of the accompanying figures depict particular byte codes associated with particular command types, these are simply illustrative, and any suitable byte codes may be defined to indicate associated command types. In FIG. 15A, the second byte (addr in FIG. 15A) indicates the address to be written to in the local registers of the node 102, and the last bytes (N bytes in FIG. 15A) represent the data to be written. In some embodiments, burst writes of up to 256 bytes (N=256) may be supported. In some embodiments, local register writes may be guaranteed to complete without generating an interrupt.

In FIG. 15B, the first byte (0x01 in FIG. 15B) indicates the command type (i.e., a local node SPI register read), the second byte (addr in FIG. 15B) indicates the address to be read from in the local registers of the node 102, and the last byte indicates the number of bytes to be read. In some embodiments, burst reads of up to 256 bytes (N=256) may be supported. As shown in FIG. 15B, the node 102 may respond to receipt of the local node SPI register read command by placing the requested read data (N bytes in FIG. 15B) on the MISO line. In some embodiments, local register reads may be guaranteed to complete without generating an interrupt.

FIG. 16 is a block diagram of a portion of an illustrative two-wire communication system 100 including remote node SPI functionality, in accordance with various embodiments. FIG. 16 includes an external device 138 acting as an SPI host 150, as well as a master node 102-1 in communication with one or more slave nodes 102-2 via the bus 106. One of the slave nodes 102-2 may act as the SPI slave 140, as shown. Although a particular number of slave nodes 102-2 is depicted in FIG. 16, this is simply illustrative, and more or fewer slave nodes 102-2 may be included. The SPI host 150 may communicate with the master node 102-1 via the SPI transceiver 136 included in the node transceiver 120 of the master node 102-1 (not shown), and the master node 102-1 may communicate with the SPI slave 140 via the bus 106 (including any slave nodes 102-2 in between, if present). As used herein, the node 102 directly coupled via an SPI interface to the SPI host 150 may be referred to as the "local node 142," while the node 102 serving as the SPI slave 140 in a remote node SPI configuration may be referred to herein as the "remote node 144." Although FIG. 16 illustrates the local node 142 as being a master node 102-1, in other embodiments of remote node SPI functionality, the local node 142 may be a slave node 102-2. Further, although FIG. 16 illustrates the SPI slave 140 as being downstream of the local node 142, in other embodiments of remote node SPI functionality, the SPI slave 140 may be upstream of the local node 142. In some such embodiments, for example, the SPI slave 140 may be a master node 102-1.

During operation of a system 100 including remote node SPI functionality, the SPI host 150 may transmit commands to the local node 142 via the SPI interface between the two, and the local node 142 may relay these commands to the SPI slave 140 via the bus 106. The SPI slave 140 may respond to the local node 142 via the bus 106, and the local node 142 may relay this response to the SPI host 150 via the SPI interface. Although only a single SPI host 150 and a single SPI slave 140 are illustrated in FIG. 16, any of the communication systems 100 disclosed herein may include multiple nodes 102 with remote node SPI functionality (e.g., multiple nodes 102 communicating with SPI hosts 150 at least partially along the bus 106). In some embodiments, SPI transactions performed in accordance with remote node SPI functionality may access registers in the SPI slave 140 in parallel with access to those registers via the I2C transceiver 129.

FIG. 17 is a flow diagram of an example remote node SPI write procedure 400, in accordance with various embodiments. Although the operations of the remote node SPI write procedure 400 may be illustrated with reference to the system 100 of FIG. 16, any suitable system 100 may perform the remote node SPI write procedure 400.

At 402, an SPI host may send an SPI write command, to a local node via SPI, to write data to a remote node serving as the SPI slave. For example, the SPI host 150 may send an SPI write command (e.g., the remote node SPI register write command discussed below with reference to FIG. 19A) to the local node 142 (e.g., a master node 102-1) via SPI (e.g., via the SPI transceiver 136 included in the local node 142). The SPI write command may include an indicator of the remote node 144 (e.g., a slave node 102-2) as the destination of the write command, a register address to be written, and the data to be written.

At 404, in response to the SPI write command of 402, the local node may send the write data to the remote node via the bus. For example, the local node 142 may send the write data to the remote node 144 via the bus 106.

At 406, the remote node may receive the write data via the bus and may write the data. For example, the remote node 144 may receive the write data via the bus 106 and may write the data to the specified address in the registers of the remote node 144.

FIG. 18 is a flow diagram of an example remote node SPI read procedure 410, in accordance with various embodiments. Although the operations of the remote node SPI read procedure 410 may be illustrated with reference to the system 100 of FIG. 16, any suitable system 100 may perform the remote node SPI read procedure 410.

At 412, an SPI host may send an SPI read request, to a local node via SPI, to read data from a remote node serving as the SPI slave. For example, the SPI host 150 may send an SPI read request command (e.g., the remote node SPI read request command discussed below with reference to FIG. 19B) to the local node 142 (e.g., a master node 102-1) via SPI (e.g., via the SPI transceiver 136 included in the local node 142). The SPI read request may include an indicator of the remote node 144 (e.g., a slave node 102-2) as the destination of the read command, and a register address to be read.

At 414, in response to the SPI read request command of 412, the local node may send a read command to the remote node via the bus. For example, the local node 142 may send a read command to the remote node 144 via the bus 106.

At 416, the remote node may receive the read command via the bus. For example, the remote node 144 may receive the read command via the bus 106.

At 418, in response to receipt of the read command, the remote node may send the read data to the local node via the bus. For example, the remote node 144 may retrieve the data stored at the specified address in the registers of the remote node 144, and may transmit this read data to the local node 142 via the bus 106.

At 420, in response to receipt of all of the read data, the local node may set an indicator (e.g., a bit in a local register or a GPIO pin on the transceiver 120 that may serve as the indicator output). For example, the local node 142 may set an indicator bit in a register local to the local node 142 when all of the read data has been received from the remote node 144.

At 422, in response to detection of the setting of the indicator, the SPI host may send an SPI read command to the local node via SPI. For example, the SPI host 150 may send a SPI status read command (e.g., the SPI status read command discussed below with reference to FIG. 19C) to the local node 142 via SPI, and in response, the local node 142 may transmit the current value of the indicator bit. If the indicator bit is set, the SPI host 150 may send an SPI read command (e.g., the SPI data read command discussed below with reference to FIG. 19D) to the local node 142 via SPI.

At 424, in response to the SPI read command of 422, the local node may send the read data to the SPI host via SPI. For example, the local node 142 may send the read data (received from the remote node 144) to the SPI host 150 via SPI.

FIGS. 19A-19D are timing diagrams of commands that may be used in an implementation of remote node SPI functionality, in accordance with various embodiments. In particular, FIG. 19A is a timing diagram for a remote node SPI register write, FIG. 19B is a timing diagram for a remote node SPI read request, FIG. 19C is a timing diagram for an SPI status read command, and FIG. 19D is a timing diagram for an SPI data read command.

In FIG. 19A, the first byte (0x02 in FIG. 19A) indicates the command type (i.e., a remote node SPI register write), the second byte (node in FIG. 19A) indicates the remote node 144 to be written to, the third byte (addr in FIG. 19A) indicates the address to be written to in the local registers of the remote node 144, and the last bytes (N bytes in FIG. 19A) represent the data to be written. In some embodiments, the "node" byte of the remote node SPI register write command (e.g., the second byte in the embodiment of FIG. 19A) may include a broadcast bit that, when set, indicates that all nodes 102 are to write the specified data to the specified address; when the broadcast bit is not set, the remaining bits of the node byte identify the remote node 144. In some embodiments, burst writes of up to 256 bytes (N=256) may be supported. Execution of a remote node SPI register write may require multiple super frames to complete. In some embodiments, the local node 142 (e.g., a master node 102-1) may assert a bit SPISTAT.SPIBUSY when execution of the write begins, and the bit SPISTAT.SPIBUSY may remain asserted until the write completes; examples of the SPISTAT register are discussed further below.

In FIG. 19B, the first bits of the first byte (110 in FIG. 19B) indicate the command type (i.e., a remote node SPI read request), the remaining bits of the first byte (LEN in FIG. 19B) indicate how much data is to be read, the second byte (node in FIG. 19B) indicates the remote node 144 to be read from, and the third byte (addr in FIG. 19B) indicates the address to be read from in the local registers of the remote node 144. As discussed above, the remote node SPI read request initiates the transfer of bytes from the remote node 144 to the local node 142.

In FIG. 19C, the byte (0x04 in FIG. 19C) indicates the command type (i.e., an SPI status read command). As shown in FIG. 19C, the local node 142 may respond to receipt of the SPI status read command by placing the bit stored in an SPISTAT register (1 byte in FIG. 19C) on the MISO line. The SPI host 150 may determine that the write is complete when the SPIBUSY bit of the SPISTAT register is 0, as discussed above with reference to FIG. 19A. In some embodiments, SPI status reads may be guaranteed to complete without generating an interrupt.

In FIG. 19D, the byte (0x05 in FIG. 19D) indicates the command type (i.e., an SPI data read). As shown in FIG. 19D, the local node 142 may respond to receipt of the SPI data read command by retrieving the read data received from the remote node 144 from a FIFO buffer, and placing the read data (N bytes in FIG. 19D) on the MISO line. In some embodiments, burst reads of up to 256 bytes (N=256) may be supported. In some embodiments, the local node 142 may assert a bit SPIINT.FIFOUNF (and zeros may be returned on the MISO line) if the SPI data read command attempts to read more data from the FIFO buffer than the preceding remote node SPI read request fetched, or if data is read from the FIFO buffer before it is been returned from the remote node 144.

Figure 20:
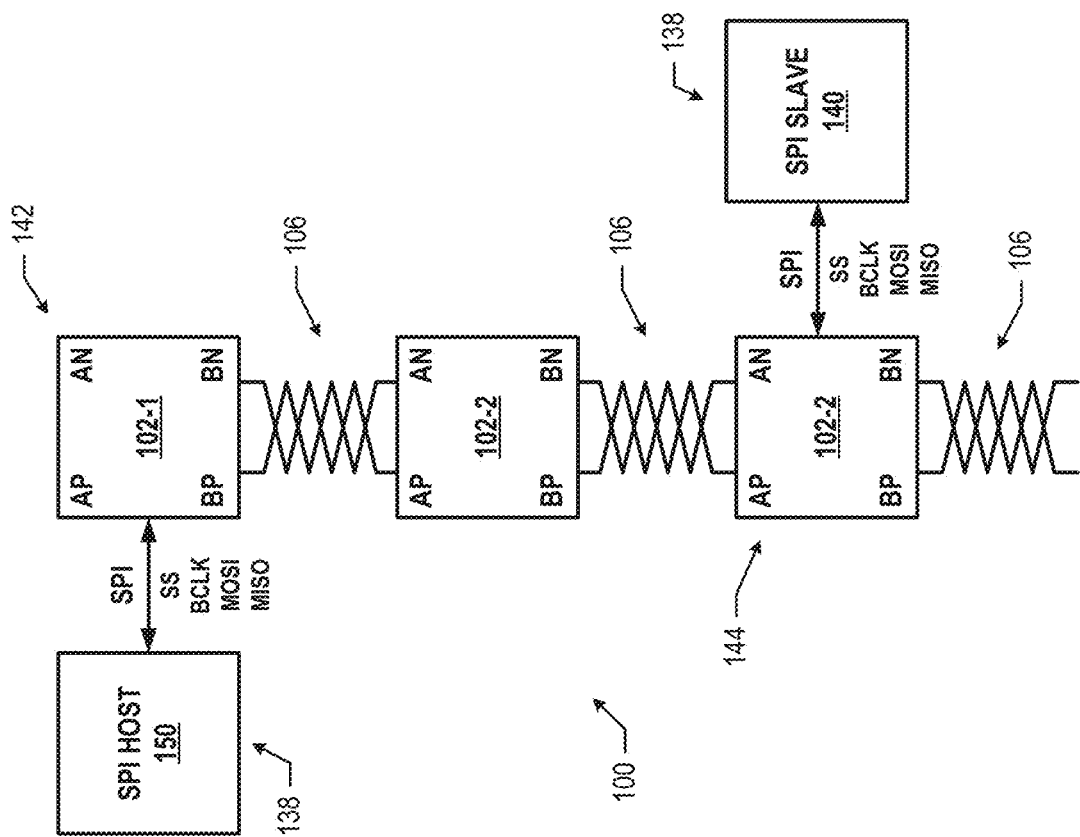
FIG. 20 is a block diagram of a portion of an illustrative two-wire communication system including remote peripheral SPI functionality, in accordance with various embodiments.

FIG. 20 is a block diagram of a portion of an illustrative two-wire communication system 100 including remote peripheral SPI functionality, in accordance with various embodiments. FIG. 20 includes an external device 138 coupled to a master node 102-1 via an SPI interface, and an external device 138 coupled to a slave node 102-2 via an SPI interface. The master node 102-1 is also in communication with one or more slave nodes 102-2 via the bus 106. The external device 138 coupled to the master node 102-1 may serve as the SPI host 150 (with the associated master node 102-1 serving as the local node 142), and the external device 138 coupled to the slave node 102-2 may serve as the SPI slave 140 (with the associated slave node 102-2 serving as the remote node 144 in a remote peripheral SPI system). Although a particular number of slave nodes 102-2 is depicted in FIG. 20, this is simply illustrative, and more or fewer slave nodes 102-2 may be included. The SPI host 150 may communicate with the local node 142 via the SPI transceiver 136 included in the node transceiver 120 (not shown) of the local node 142, the local node 142 may communicate with the remote node 144 via the bus 106 (including any slave nodes 102-2 in between, if present), and the remote node 144 may communicate with the SPI slave 140 via the SPI transceiver 136 included in the node transceiver 120 (not shown) of the remote node 144. When a system 100 is configured for remote peripheral SPI functionality, the data pathway for SPI data along the bus 106 between the local node 142 and the remote node 144 may be referred to herein as a "data tunnel" or "tunnel," the local node 142 may be referred to as the "data tunnel owner" or "tunnel owner," and the remote node 144 may be referred to as the "data tunnel responder" or "tunnel responder." Although FIG. 20 illustrates the local node 142 as being a master node 102-1, in other embodiments of remote peripheral SPI functionality, the local node 142 may be a slave node 102-2. Further, although FIG. 20 illustrates the remote node 144 as being downstream of the local node 142, in other embodiments of remote peripheral SPI functionality, the remote node 144 may be upstream of the local node 142. In some such embodiments, for example, the remote node 144 may be a master node 102-1.

During operation of a system 100 including remote peripheral SPI functionality, the SPI host 150 may transmit commands to the local node 142 via the SPI interface between the two, the local node 142 may relay these commands to the remote node 144 via the bus 106, and the remote node 144 may relay these commands to the SPI slave 140 via SPI interface between the two. The SPI slave 140 may respond to the remote node 144 via the SPI interface between the two, the remote node 144 may respond to the local node 142 via the bus 106, and the local node 142 may relay this response to the SPI host 150 via the SPI interface between the two. Although only a single SPI host 150 and a single SPI slave 140 are illustrated in FIG. 20, any of the communication systems 100 disclosed herein may include multiple nodes 102 with remote peripheral SPI functionality (e.g., multiple peripheral devices 108 serving as SPI slaves 140 and communicating with SPI hosts 150 at least partially along the bus 106).

Tunnel owner nodes 102 and tunnel responder nodes 102 may each maintain an SPISTAT register that has several status bits that may be used to monitor the status of an associated data tunnel. In some embodiments, a bit SPISTAT.DTACTIVE may be used to indicate whether the SPI port of the associated node 102 is actively using the data tunnel. In some embodiments, a bit SPISTAT.DTINVALID may be used to indicate that the data tunnel is improperly configured (e.g., there are no legal or inconsistent number of tunnel slots, there are multiple tunnel owners, the tunnel responder is not configured, etc.). In some embodiments, a bit SPISTAT.DTBADPKT may be used to indicate whether a corrupt packet has been received. In some embodiments, a bit SPISTAT.DTABORT may be used to indicate that a node 102 has a board of the tunnel transaction (e.g., due to a corrupt packet, an unexpected packet, a missing response packet etc.). In some embodiments, tunnel owner nodes 102 and tunnel responder nodes 102 may maintain a register SPIDTLCMD in which the last command processed by the associated tunnel is stored; in the event of an abort, this information may be used to identify the type of transaction that failed and what parts of it did or did not complete.

Figure 21:
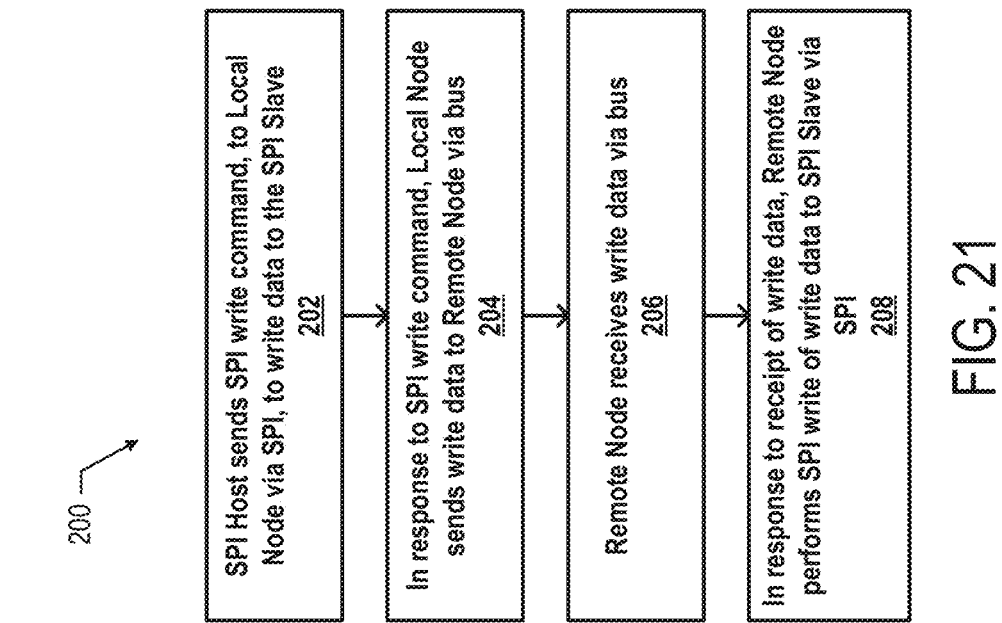
FIG. 21 is a flow diagram of an example remote peripheral SPI write procedure, in accordance with various embodiments.

FIG. 21 is a flow diagram of an example remote peripheral SPI write procedure 200, in accordance with various embodiments. Although the operations of the remote peripheral SPI write procedure 200 may be illustrated with reference to the system 100 of FIG. 20, any suitable system 100 may perform the remote peripheral SPI write procedure 200.

At 202, an SPI host may send an SPI write command, to a local node via SPI, to write data to an SPI slave. For example, the SPI host 150 may send an SPI write command (e.g., any of the atomic write commands discussed below with reference to FIGS. 39-40) to the local node 142 (e.g., a master node 102-1) via SPI (e.g., via the SPI transceiver 136 included in the local node 142). The SPI write command may include an indicator of the remote node 144 (e.g., a slave node 102-2) to which the SPI slave 140 is coupled, the address to be written, and the data to be written.

At 204, in response to the SPI write command of 202, the local node may send the write data to the remote node via the bus. For example, the local node 142 may send the write data to the remote node 144 via the bus 106.

At 206, the remote node may receive the write data via the bus. For example, the remote node 144 may receive the write data via the bus 106.

At 208, in response to receipt of the write data, the remote node may perform an SPI write of the write data to the SPI slave (via SPI). For example, the remote node 144 may use conventional SPI protocols to write the write data to the SPI slave 140 (e.g., to write the data to the specified address of the SPI slave 140).

FIG. 22 is a table of operations that may be performed in an embodiment of the remote peripheral SPI write procedure 200 of FIG. 21. The operations outlined in FIG. 22 may be referred to as an "atomic write," to contrast the operations outlined in FIG. 22 from other sets of write operations (e.g., the full duplex and bulk write operations discussed below with reference to FIGS. 26 and 28, respectively). The operations on the left side of the table of FIG. 22 correspond to data transmitted from the SPI host 150 to the local node 142 (the tunnel owner) via SPI, while the operations on the right side of the table of FIG. 22 correspond to data transmitted from the remote node 144 (the tunnel responder) to the SPI slave 140 via SPI.

The atomic write procedure of FIG. 22 may begin with the SPI host 150 sending a first byte to the local node 142, with the first byte indicating the command type (i.e., "atomic write"). The next byte sent from the SPI host to the local node 142 indicates the remote node 144 and the associated SPI slave 140, and the subsequent bytes include the data to be written. After transmitting the data to be written, the SPI connection between the SPI host 150 and the local node 142 may wait for the SPI write transaction to occur between the remote node 144 and the SPI slave 140. While the SPI host 150 is transmitting the atomic write command to the local node 142, the tunnel between the local node 142 and the remote node 144 may be quiet. Once the entire atomic write command has been transmitted to the local node 142, the local node 142 may relay the command along the bus 106 through the tunnel to the remote node 144. Upon receipt, the remote node 144 may write the write bytes to the SPI slave 140 via the SPI connection between the remote node 144 and the SPI slave 140.

Figure 23:
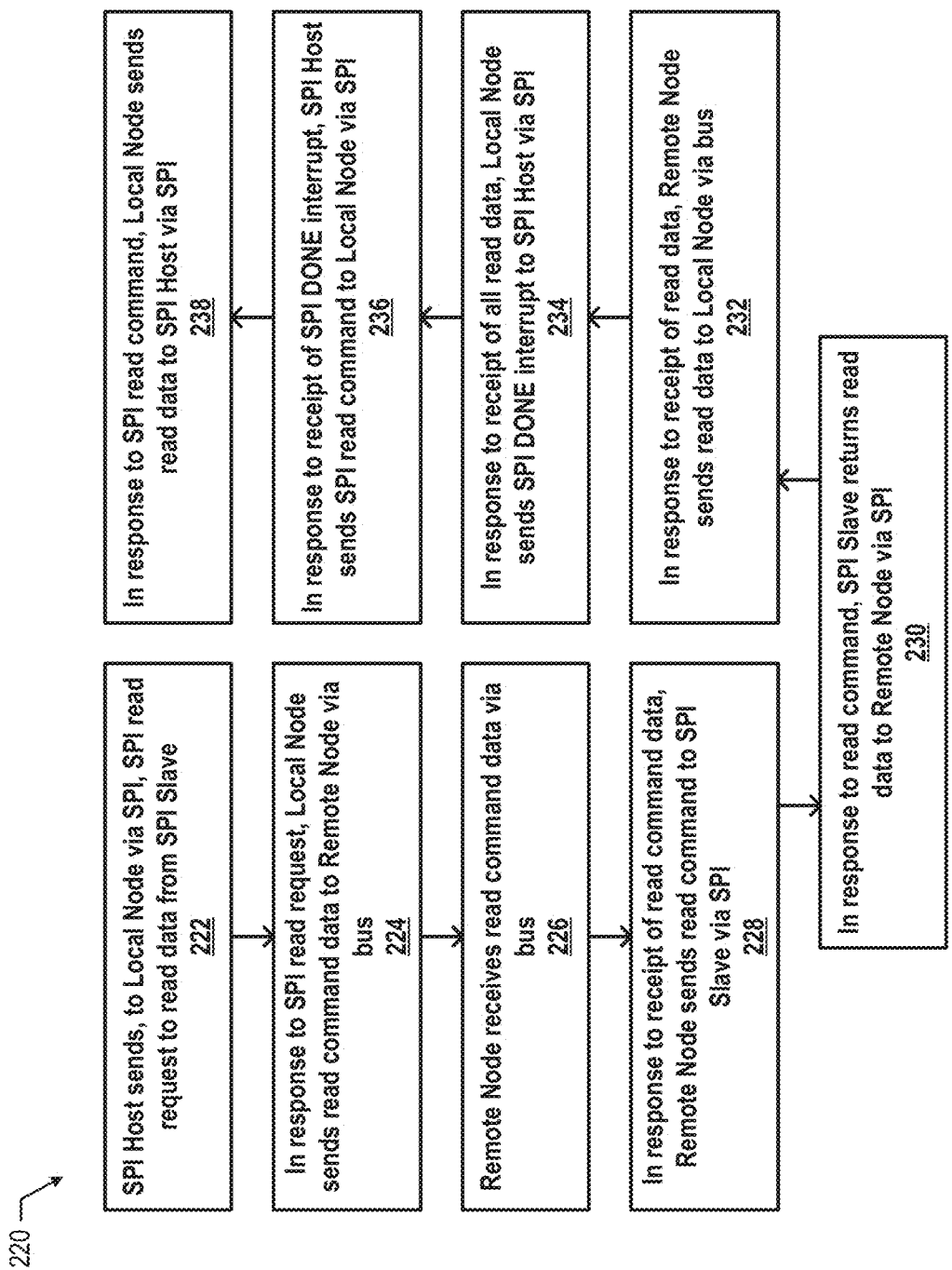
FIG. 23 is a flow diagram of an example remote peripheral SPI read procedure, in accordance with various embodiments.

FIG. 23 is a flow diagram of an example remote peripheral SPI read procedure 220, in accordance with various embodiments. Although the operations of the remote peripheral SPI read procedure 220 may be illustrated with reference to the system 100 of FIG. 20, any suitable system 100 may perform the remote peripheral SPI read procedure 220.

At 222, an SPI host may send an SPI read request, to a local node via SPI, to read data from an SPI slave coupled to a remote node. For example, the SPI host 150 may send an SPI read request command (e.g., the remote node SPI read request command discussed above with reference to FIG. 19B) to the local node 142 (e.g., a master node 102-1) via SPI (e.g., via the SPI transceiver 136 included in the local node 142). The SPI read request may include an indicator of the remote node 144 (e.g., a slave node 102-2) and a particular SPI slave 140 as the destination of the read command, and a register address to be read.

At 224, in response to the SPI read request command of 412, the local node may send a read command to the remote node via the bus. For example, the local node 142 may send a read command to the remote node 144 via the bus 106.

At 226, the remote node may receive the read command via the bus. For example, the remote node 144 may receive the read command via the bus 106.

At 228, in response to receipt of the read command, the remote node may send a read command to the SPI slave via SPI. For example, the remote node 144 may send a read command to read the specified address from the SPI slave 140 via the local SPI connection between the remote node 144 and the SPI slave 140.

At 230, in response to receipt of the read command, the SPI slave may return read data to the remote node via SPI. For example, the SPI slave 140 may access the data stored at the specified address, and may provide that data to the remote node 144 via the local SPI connection between the remote node 144 and the SPI slave 140.

At 232, in response to receipt of the read data, the remote node may send the read data to the local node via the bus. For example, the remote node 144 may transmit the read data to the local node 142 via the bus 106.

At 234, in response to receipt of all of the read data, the local node may send an SPI DONE interrupt to the SPI host via SPI. For example, the local node 142 may send an SPI DONE interrupt to the SPI host 150 (via the local SPI connection between the local node 142 and the SPI host 150) when all of the read data has been received from the remote node 144.

At 236, in response to receipt of the interrupt of 234, the SPI host may send an SPI read command to the local node via SPI. For example, the SPI host 150 may send an SPI read command (e.g., the SPI data read command discussed above with reference to FIG. 19D) to the local node 142 via SPI.

At 238, in response to the SPI read command of 236, the local node may send the read data to the SPI host via SPI. For example, the local node 142 may send the read data (received from the SPI slave 140 via the remote node 144) to the SPI host 150 via SPI.

FIG. 24 is a table of operations that may be performed in an embodiment of the remote peripheral SPI read procedure of FIG. 23. The operations outlined in FIG. 24 may be referred to as an "atomic read," to contrast the operations outlined in FIG. 24 from other sets of read operations (e.g., the full duplex operations discussed below with reference to FIG. 26). The operations on the left side of the table of FIG. 24 correspond to data transmitted from the SPI host 150 to the local node 142 (the tunnel owner) via SPI, while the operations on the right side of the table of FIG. 24 correspond to data transmitted from the remote node 144 (the tunnel responder) to the SPI slave 140 via SPI. The write operations illustrated in FIG. 24 are optional; in some embodiments, the write operations may be used for peripherals 108 that require write data on MOSI (e.g., to set an address) before read data is provided on MISO.

Figure 25:
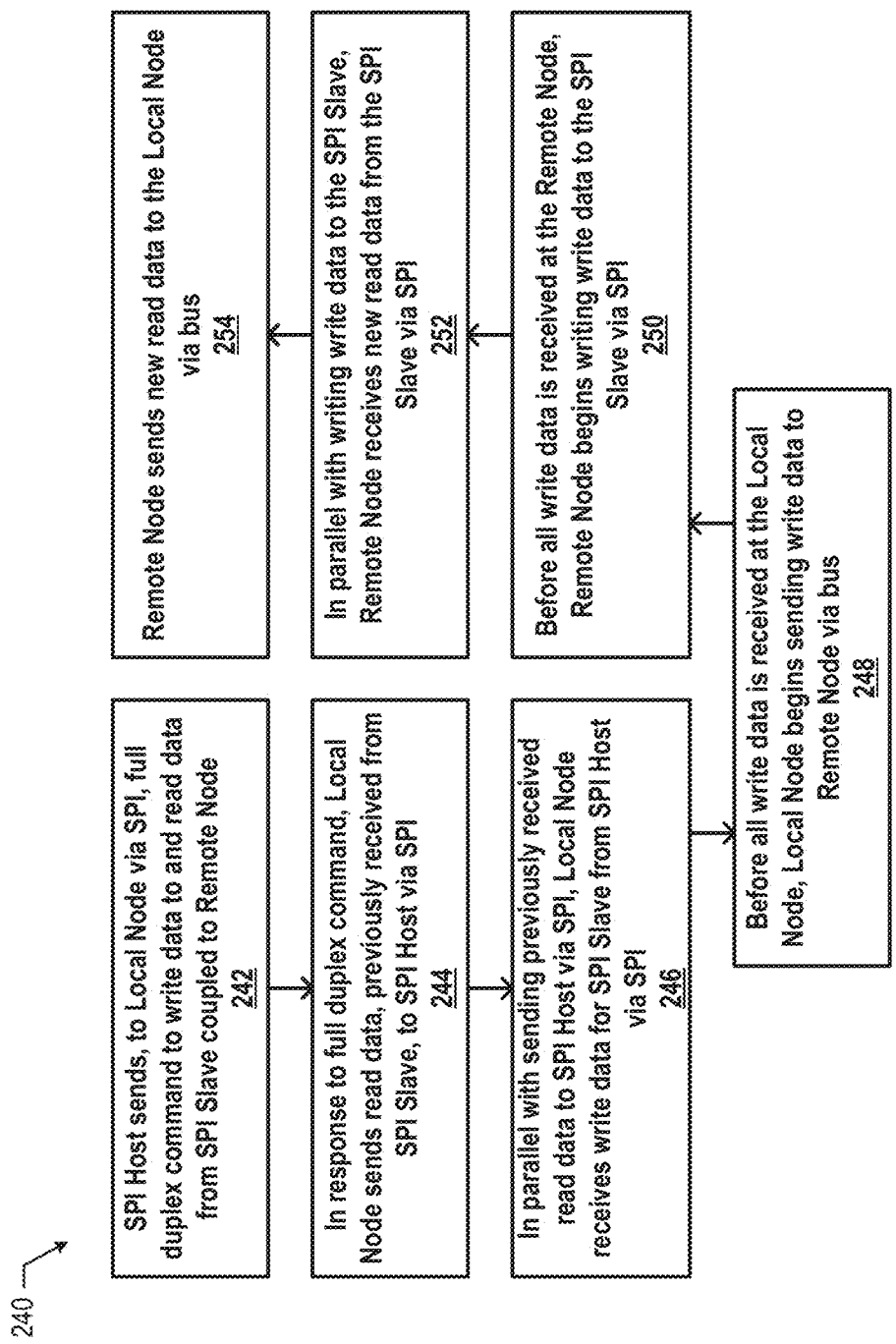
FIG. 25 is a flow diagram of an example remote peripheral SPI full duplex procedure, in accordance with various embodiments.

FIG. 25 is a flow diagram of an example remote peripheral SPI full duplex procedure 240, in accordance with various embodiments. Although the operations of the remote peripheral SPI full duplex procedure 240 may be illustrated with reference to the system 100 of FIG. 20, any suitable system 100 may perform the remote peripheral SPI full duplex procedure 240.

At 242, an SPI host may send a full duplex command, to a local node via SPI, to read data from and write data to an SPI slave coupled to a remote node. For example, the SPI host 150 may send a full duplex command to the local node 142 (e.g., a master node 102-1) via SPI (e.g., via the SPI transceiver 136 included in the local node 142). The full duplex command may include an indicator of the remote node 144 (e.g., a slave node 102-2) and a particular SPI slave 140 as the destination of the read and write commands, and register addresses to be written to and read from.

At 244, in response to the full duplex command of 242, the local node may send read data, previously received from the SPI slave, to the SPI host via SPI. For example, the local node 142 may have previously received read data from the SPI slave 140 (in response to the previous read command), and that read data may be stored in a memory of the local node 142 (e.g., in the FIFO buffer discussed above). This previously received read data may be sent to the SPI host 150 (via the local SPI connection between the local node 142 and the SPI host 150) in response to receipt of the full duplex command.

At 246, in parallel with sending the previously received read data to the SPI host at 244, the local node may receive write data for the SPI slave from the SPI host via SPI. For example, the SPI host 150 may send write data to the local node 142 via the MOSI line of the local SPI connection while the local node 142 is sending the previously received read data to the SPI host 150 via the MISO line.

At 248, before all write data has been received at the local node from the SPI host in 246, the local node may begin sending this write data to the remote node via the bus. For example, the local node 142 may send the write data to the remote node 144 via the bus 106 as the write data is received and before receiving the write data in its entirety.

At 250, before all write data has been received at the remote node from the local node, the remote node may begin writing the write data to the SPI slave via SPI. For example, the remote node 144 may write the write data to the SPI slave 140 via the local SPI connection between the remote node 144 and the SPI slave 140 before the remote node 144 has received all of the write data from the local node 142.

At 252, in parallel with writing the write data to the SPI slave, the remote node may receive new read data from the SPI slave via SPI. For example, while the remote node 144 is writing the write data to the SPI slave 140, the remote node 144 may be receiving new read data from the SPI slave 140 via the local SPI connection between the remote node 144 and the SPI slave 140.

At 254, the remote node may send the new read data to the local node via the bus. For example, the remote node 144 may transmit the new read data to the local node 142 via the bus 106. The local node 142 may store the new read data in a memory (e.g., in the FIFO buffer discussed above) until an additional read or full duplex command is received from the SPI host 150 (in response to which the local node 142 may provide the new read data to the SPI host 150 via the local SPI connection).

FIG. 26 is a table of operations that may be performed in an embodiment of the remote peripheral SPI full duplex procedure of FIG. 25. The operations outlined in FIG. 25 may be referred to as a "full duplex SPI transaction," as discussed above with reference to FIG. 25. The operations on the left side of the table of FIG. 26 correspond to data transmitted from the SPI host 150 to the local node 142 (the tunnel owner) via SPI, while the operations on the right side of the table of FIG. 26 correspond to data transmitted from the remote node 144 (the tunnel responder) to the SPI slave 140 via SPI.

The full duplex procedure of FIG. 26 may begin with the SPI host 150 sending a first byte to the local node 142, with the first byte indicating the command type (i.e., "full duplex"). The next byte sent from the SPI host to the local node 142 indicates the remote node 144 and the associated SPI slave 140, the following byte (length in FIG. 26) indicates the number of bytes to be read and written, and the subsequent bytes include the data to be written. While transmitting the data to be written (WR2) on the MOSI line, the SPI host 150 receives data previously read (RD1) from the SPI slave 140 (and stored in the local node 142) on the MISO line from the local node 142. While the SPI host 150 is transmitting the write data to the local node 142, and before transmission of the write data to the local node 142 is complete, the local node 142 may begin relaying the write data along the bus 106 through the tunnel to the remote node 144. Upon receipt, the remote node 144 may write the write bytes to the SPI slave 140 via the SPI connection between the remote node 144 and the SPI slave 140; as shown in FIG. 26, the writing of the write data to the SPI slave 140 may begin before all of the write data is transmitted to the local node 142. While the remote node 144 is writing the write data to the SPI slave 140 on the MOSI line, the SPI slave 140 may begin transmitting new read data (RD2) to the remote node 144 on the MISO line.

Figures 27, 28:
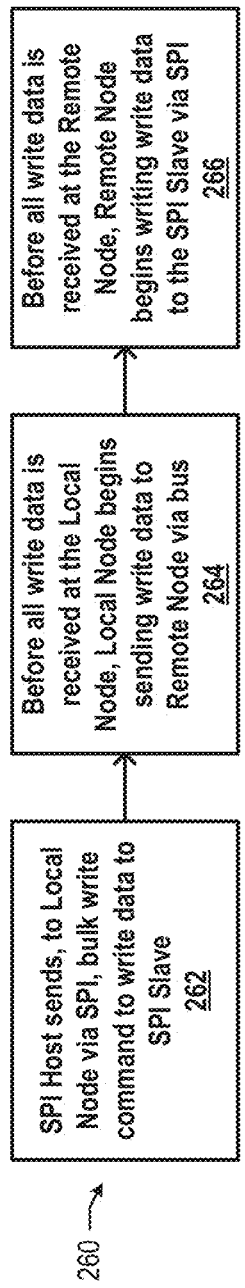
FIG. 27 is a flow diagram of an example remote peripheral SPI bulk write procedure, in accordance with various embodiments.
FIG. 28 is a table of operations that may be performed in an embodiment of the remote peripheral SPI bulk write procedure of FIG. 27.

FIG. 27 is a flow diagram of an example remote peripheral SPI bulk write procedure 260, in accordance with various embodiments. Although the operations of the remote peripheral SPI bulk write procedure 260 may be illustrated with reference to the system 100 of FIG. 20, any suitable system 100 may perform the remote peripheral SPI bulk write procedure to 60.

At 262, an SPI host may send a bulk write command, to a local node via SPI, to write data to an SPI slave. For example, the SPI host 150 may send a bulk write command to the local node 142 (e.g., a master node 102-1) via SPI (e.g., via the SPI transceiver 136 included in the local node 142). The bulk write command may include an indicator of the remote node 144 (e.g., a slave node 102-2) and the SPI slave 140, the address to be written, the length of the data to be written, and the data to be written.

At 264, in response to the SPI write command of 262 and before all of the write data is received at the local node, the local node may begin sending the write data to the remote node via the bus. For example, the local node 142 may begin sending the write data to the remote node 144 via the bus 106 before the local node 142 receives all of the write data from the SPI host 150.

At 266, in response to receipt of the write data and before all of the write data is received at the remote node, the remote node may perform an SPI write of the write data to the SPI slave (via SPI). For example, the remote node 144 may use conventional SPI protocols to write the write data to the SPI slave 140 (e.g., to write the data to the specified address of the SPI slave 140).

FIG. 28 is a table of operations that may be performed in an embodiment of the remote peripheral SPI bulk write procedure of FIG. 27. The operations outlined in FIG. 28 may be referred to as a "bulk write," as discussed above with reference to FIG. 27. The operations on the left side of the table of FIG. 28 correspond to data transmitted from the SPI host 150 to the local node 142 (the tunnel owner) via SPI, while the operations on the right side of the table of FIG. 28 correspond to data transmitted from the remote node 144 (the tunnel responder) to the SPI slave 140 via SPI.

The bulk write procedure of FIG. 28 may begin with the SPI host 150 sending a first byte to the local node 142, with the first byte indicating the command type (i.e., "bulk"). The next byte sent from the SPI host to the local node 142 indicates the remote node 144 and the associated SPI slave 140, the following byte (length in FIG. 28) indicates the number of bytes to be written, and the subsequent bytes include the data to be written. Before transmission of the write data to the local node 142 is complete, the local node 142 may begin relaying the write data along the bus 106 through the tunnel to the remote node 144. Upon receipt, the remote node 144 may write the write data to the SPI slave 140 via the SPI connection between the remote node 144 and the SPI slave 140; as shown in FIG. 28, the writing of the write data to the SPI slave 140 may begin before all of the write data is transmitted to the local node 142.

As noted above, in a remote peripheral SPI configuration, SPI data may be transmitted through a data tunnel along the bus 106. In some embodiments, a data tunnel may include dedicated upstream and downstream data slots for transmitting control information and data for remote peripheral SPI functionality. In some embodiments, titles can be dynamically added, removed or changed in size during operation of the system 100, and multiple, non-overlapping tunnels can exist in a system 100. Further, upstream and downstream tunnels may be of different sizes In some embodiments, four registers in each node 102 may be used to configure a data tunnel for that node 102: DTCFG may describe a node's location in the tunnel, and DTSLOTS, DTUPOFFSET, and DTDNOFFSET may describe which data slots are allocated to the tunnel. The names of these and other registers described herein are simply illustrative, and any suitable names may be selected.

In some embodiments, the DTCFG register contains three bits. A first bit, DTEN, may enable tunnel functionality. Two additional bits, DTFRST and DTLAST, may indicate if the node 102 is the most upstream (first) or most downstream (last) node of the tunnel. In some embodiments, if DTEN is set on a master node 102-1, DTFRST must be set. In some embodiments, if DTEN is set on the last slave node 102-2, DTLAST must be set. DTFRST may be set in the most upstream node 102 of a tunnel. DTLAST may be set in the most downstream node 102 of a tunnel. A single node 102 may not have both DTFRST and DTLAST set.

The registers DTSLOTS, DTUPOFFSET, and DTDNOFFSET may describe the size and location of the upstream and downstream tunnels. An upstream tunnel may use DTSLOTS.DTUPSLOTS slots and may start at the slot selected by DTUPOFFSET.DTUPOFFSET. A downstream tunnel may use DTSLOTS.DTDNSLOTS slots and may start at the slot selected by DTDNOFFSET.DTDNOFFSET. All nodes 102 in a tunnel segment with DTEN=1 may use the same settings for these registers. The settings in the DTxxSLOTS and DTxxOFFSET registers may be ignored if DTEN=0.

In some embodiments, data slots (DNSLOTS and UPSLOTS) may be used for audio content downstream (DN) and upstream (UP). Data tunnel slots (DTDNSLOTS and DTUPSLOTS) may be used for asynchronous data tunneling (e.g., SPI), downstream (DN) and upstream (UP). DNSLOTS may indicate the number of data slots received from an upstream node 102 (or from a host 110 when the receiving node 102 is a master node 102-1) and passed on to a downstream node 102. DNMASK may be a mask indicating which downstream data slot (from the A-side) a local node 102 uses (1 for slot 1, 2 for slot 2, 3 for slots 1 and 2, 4 for slot 3, etc.). LDNSLOTS may indicate the number data slots contributed by a node 102 to the downstream node 102. DTDNOFFS may indicate the slot offset location of downstream data tunnel slots (e.g., 2 may indicate after two downstream slots). All nodes 102 involved in a data tunnel may have the same DTDNOFFS setting. DTDNSLOTS may indicate the number of downstream slots used for the data tunnel. UPSLOTS may be used to indicate the number of data slots received from a downstream node 102 (or from a host 110 when the receiving node 102 is a master node 102-1) and passed on to an upstream node 102. UPMASK may be a mask indicating which upstream data slot (from B-side) a local node uses (1 for slot 1, 2 for slot 2, 3 for slots 1 and 2, 4 for slot 3, etc.). LUPSLOTS may indicate the number of data slots contributed by a node 102 to the upstream node 102. DTUPOFFS may indicate the slot offset location of upstream data tunnel slots (e.g., 2: after two downstream slots). All nodes 102 involved in a data tunnel may have the same DTUPOFFS setting. DTUPSLOTS may indicate the number of upstream slots used for the data tunnel.

Figure 29:
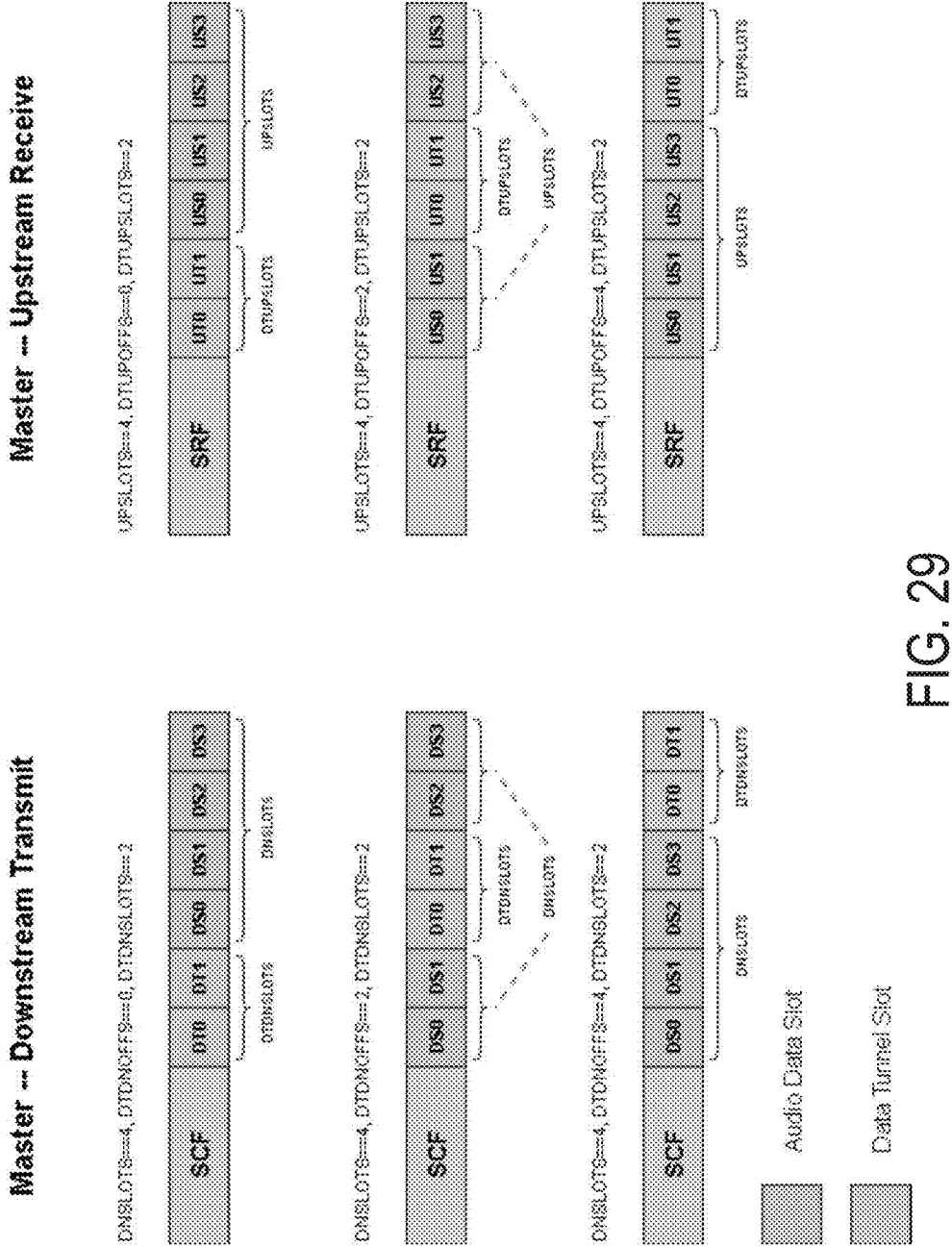
FIG. 29 illustrates examples of configurations of data tunnel slots at a master node, in accordance with various embodiments.

FIG. 29 illustrates examples of configurations of data tunnel slots at a master node 102-1, in accordance with various embodiments. In particular, FIG. 29 illustrates examples of valid data tunnel slot configurations on a master node 102-1 with the data tunnel before, within, and after audio data slots defined by DNSLOTS/UPSLOTS.

FIG. 30 illustrates examples of configurations of data tunnel slots at a last slave node 102-2, in accordance with various embodiments. In particular, FIG. 30 illustrates examples of valid data tunnel slot configurations on a last slave node 102-2 along the bus 106 with the data tunnel before, within, and after audio data slots defined by DNSLOTS/UPSLOTS.

Figure 31:
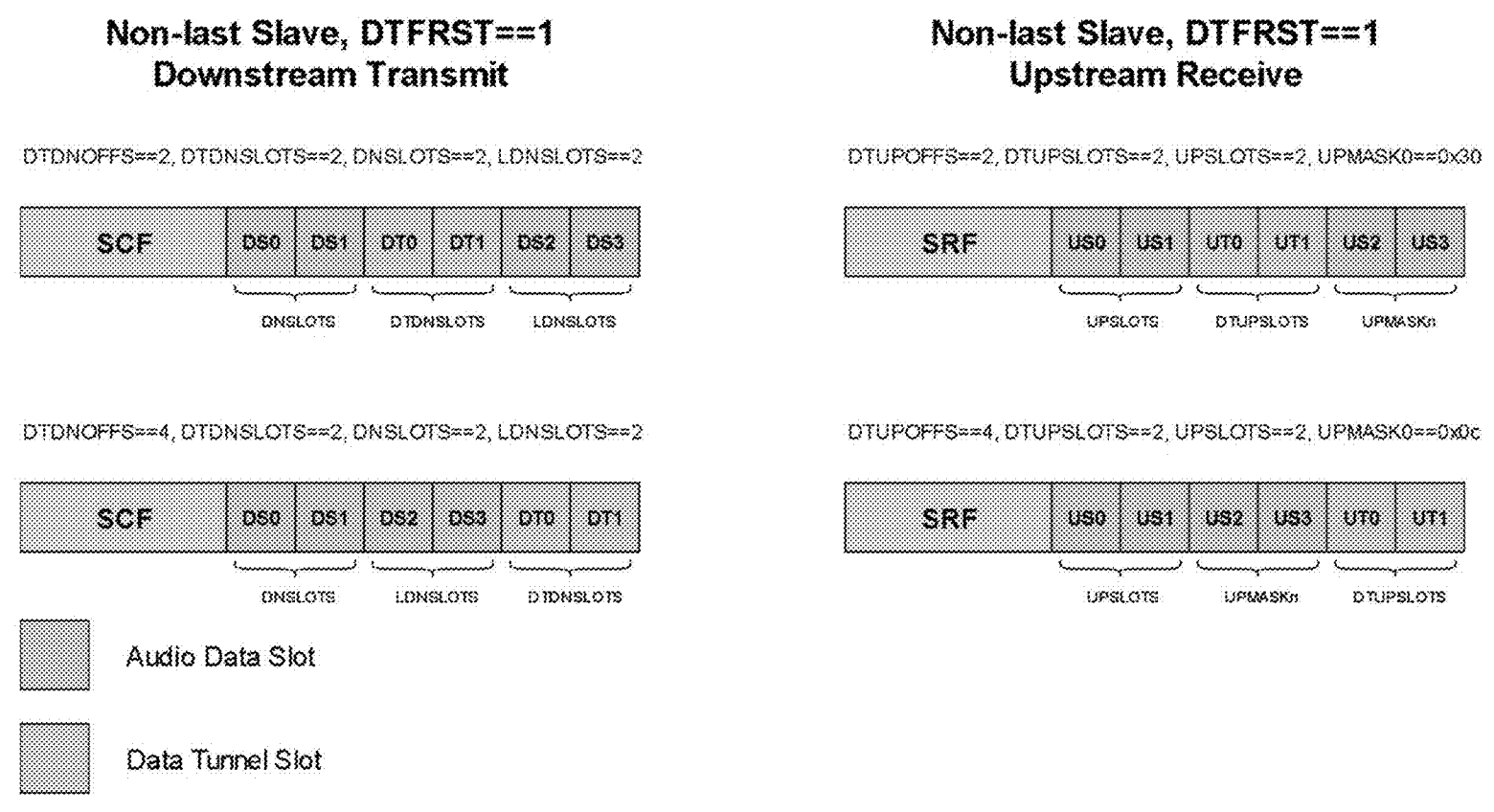

FIG. 31 illustrates examples of configurations of data tunnel slots at a tunnel owner that is a non-last slave node 102-2, in accordance with various embodiments. In particular, FIG. 31 illustrates examples of valid data tunnel slot configurations on a non-last slave node 102-2.

Figure 32:
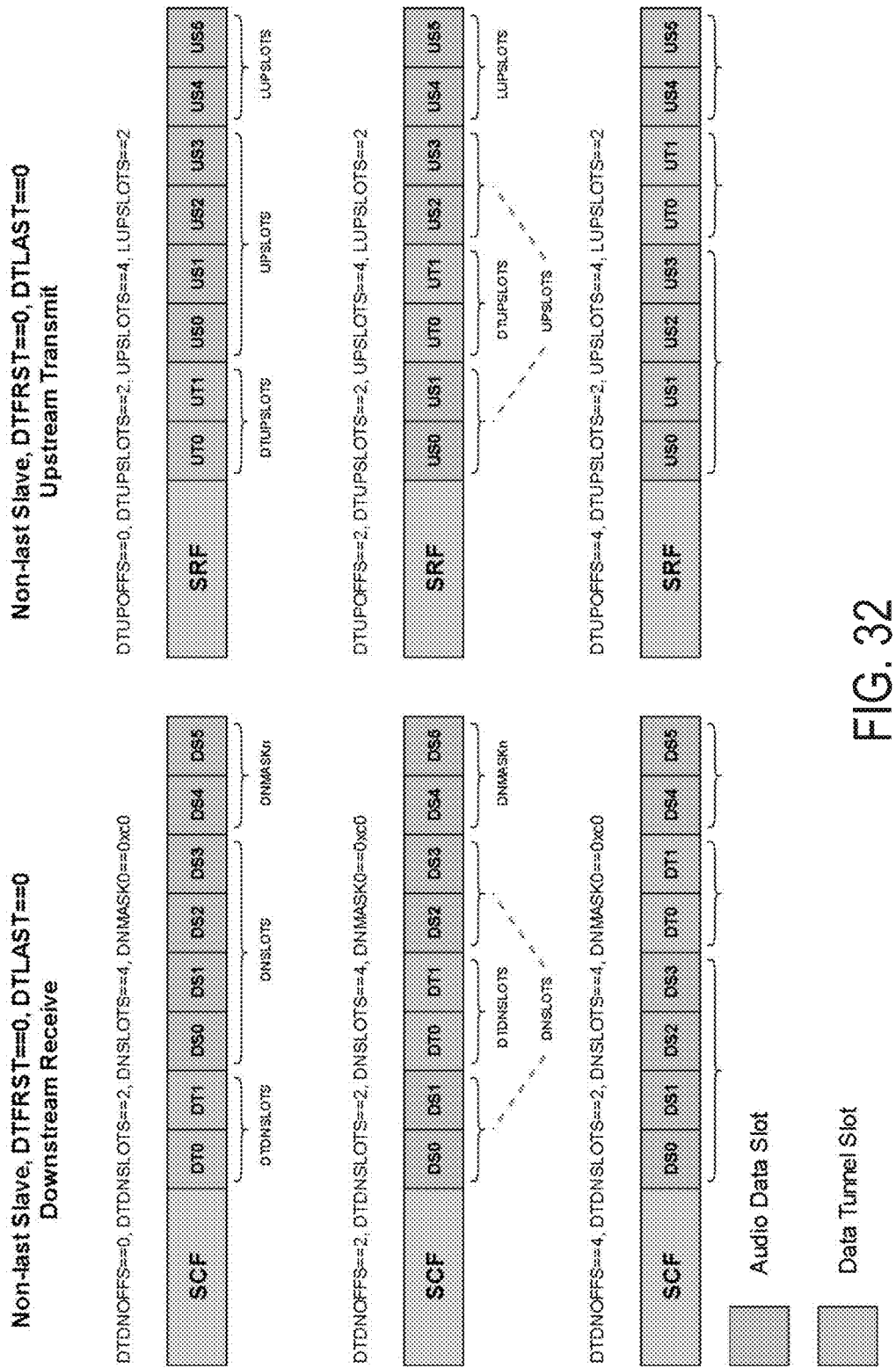
FIGS. 32-33 illustrates examples of configurations of data tunnel slots at a middle node in a tunnel, wherein the middle node is a non-last slave node, in accordance with various embodiments.
Figure 33:
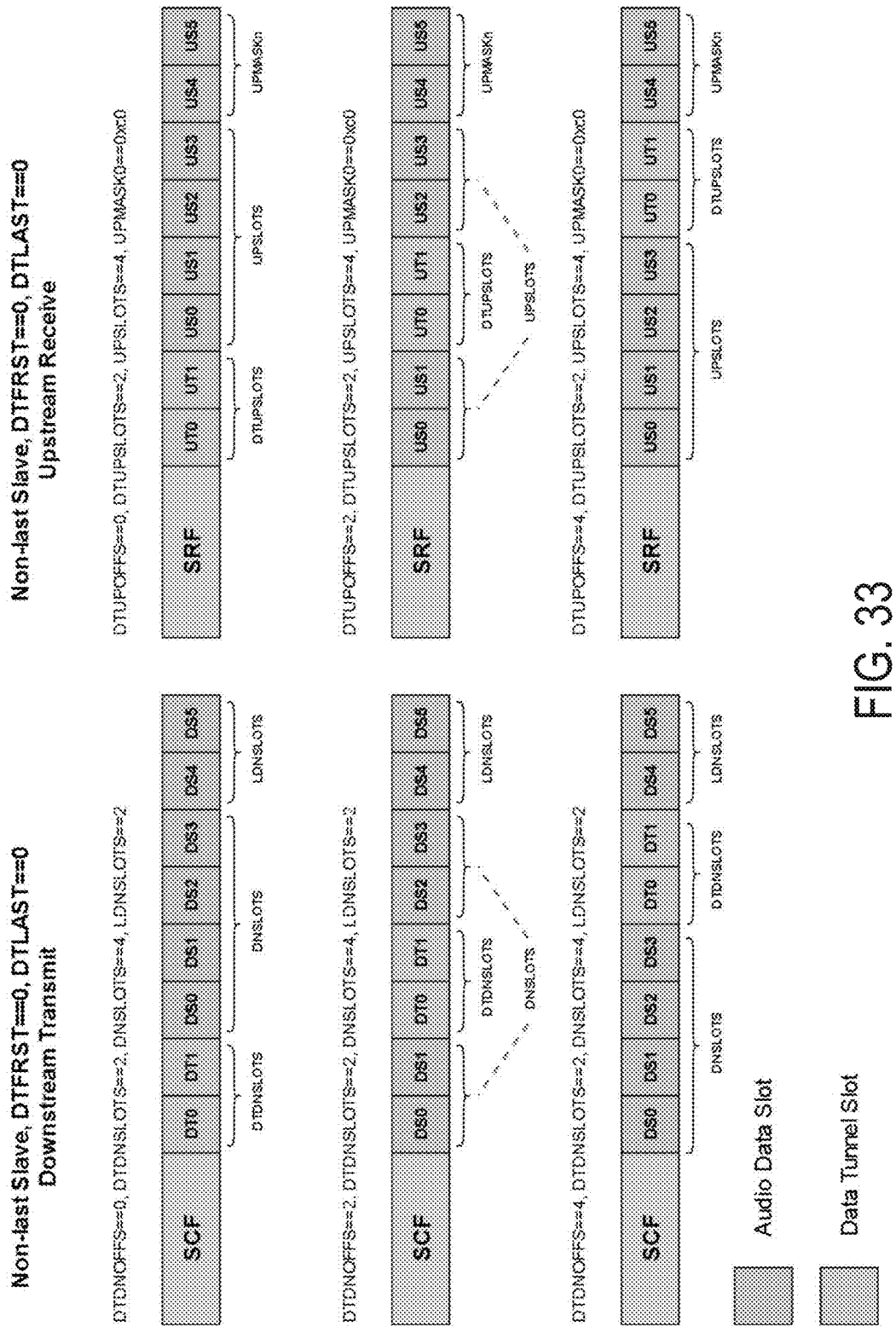

FIGS. 32-33 illustrates examples of configurations of data tunnel slots at a middle node in a tunnel (i.e., not the most upstream nor the most downstream node 102 of a data tunnel), wherein the middle node is a non-last slave node 102-2, in accordance with various embodiments. In particular, FIGS. 32-33 illustrate examples of valid data tunnel slot configurations on a middle node that is a non-last slave node 102-2.

Figure 34:
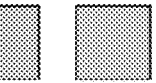
FIG. 34 illustrates examples of configurations of data tunnel slots at a tunnel responder that is a non-last slave node, in accordance with various embodiments.

FIG. 34 illustrates examples of configurations of data tunnel slots at a tunnel responder that is a non-last slave node, in accordance with various embodiments. In particular, FIG. 34 illustrates examples of valid data tunnel slot configurations of a non-last slave node 102-2 that is the most downstream node 102 of a data tunnel.

In some embodiments, a system 100 may support data tunnels having more than one format. For example, in some embodiments, a data tunnel may have one of two formats based on the number of bytes in the tunnel. For example, tunnels that are less than 17 bytes in length may use a standard tunnel protocol with a 12 bit CRC and a 4 bit length field. Tunnels that are more than 17 bytes in length may use a jumbo tunnel protocol with a 16-bit CRC and an 8-bit length field. The number of bytes in a tunnel may be based on the number of slots in the tunnel (DTSLOTS) and the slot size (SLOTFMT.UPSIZE and SLOTFMT.DNSIZE). For example, FIG. 35 illustrates an example of the number of bytes in a data tunnel as a function of data slot size and the number of slots, in accordance with various embodiments. Both standard and jumbo protocols may achieve a Hamming distance of four for all tunnel sizes.

Figures 38, 39:
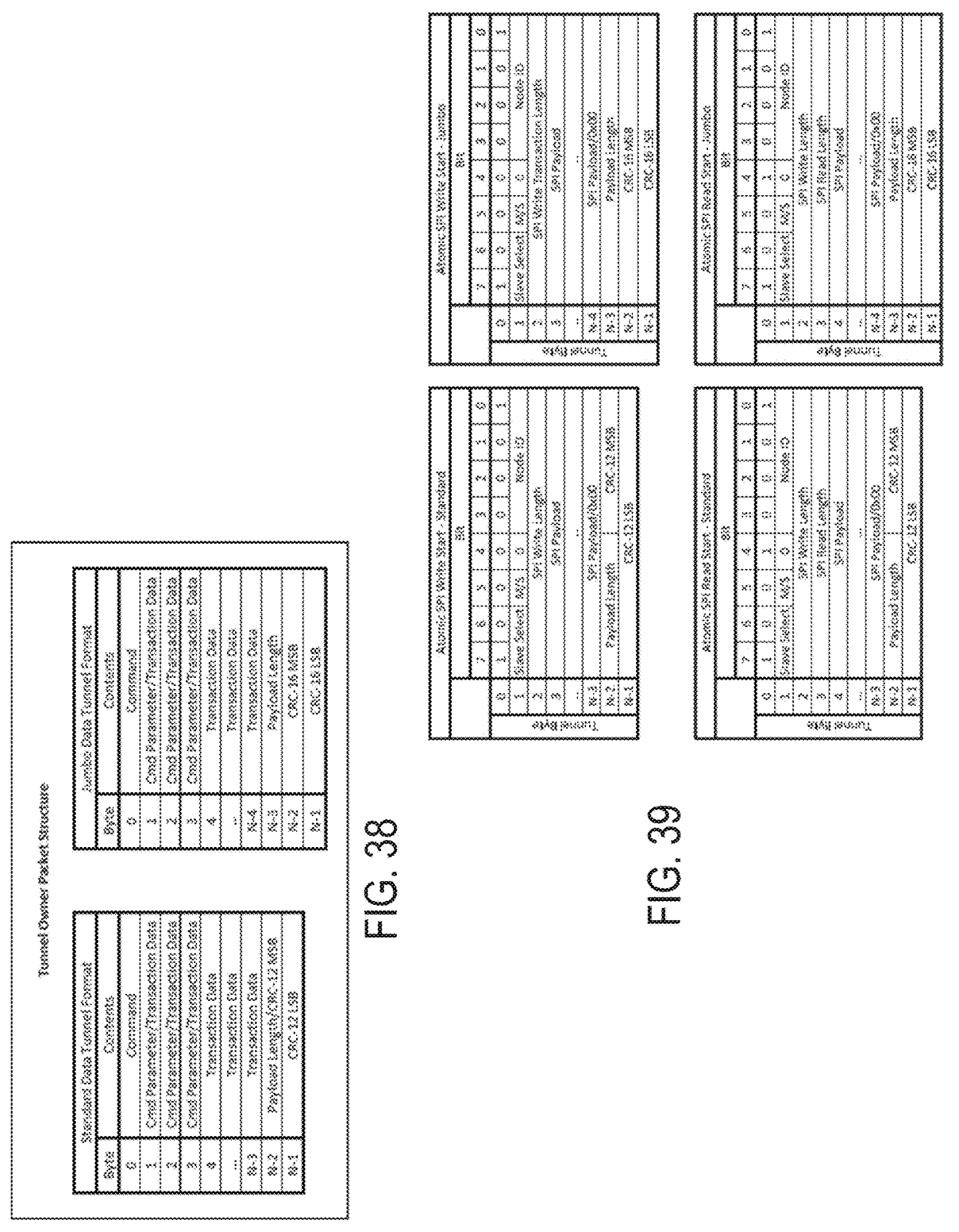
Figure 40:
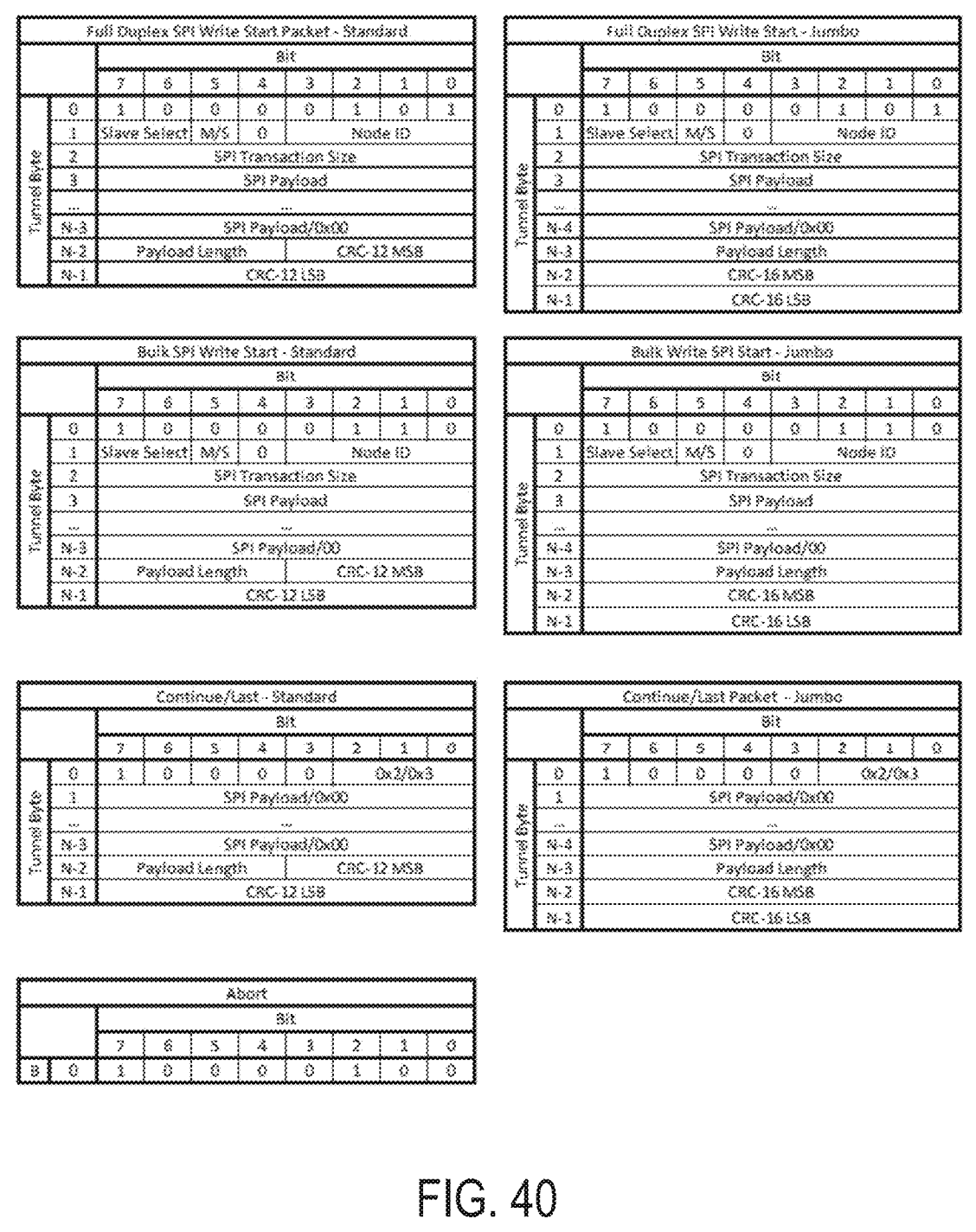

In some embodiments, tunnel owner packets may include a command byte, a given number of command parameter bytes (e.g., between 0 and 3 command parameter bytes), transaction data, a payload length, and a CRC. Unused bytes may be populated with all zeros. FIG. 36 illustrates an example SPI packet command byte for a data tunnel owner, while FIG. 37 illustrates an example SPI slave select/node byte for a data tunnel owner, in accordance with various embodiments. FIG. 38 illustrates an example tunnel owner packet structure, in accordance with various embodiments. FIG. 38 includes example packet structures for standard and jumbo tunnel packets. The payload length field may be equal to the number of bytes consumed by the command, command parameters, and transaction data, and may not include unused bytes, the length field, or the CRC field. The order of bytes in the example structures of FIG. 38 is simply illustrative, and any suitable order may be used; the same is true for the order of bits/bytes in any of the data structures disclosed herein. FIGS. 39 and 40 illustrate example tunnel owner packets, in accordance with various embodiments.

Figures 41, 42:
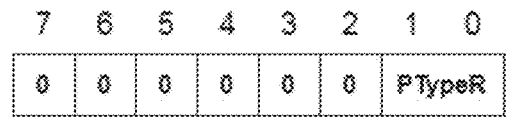
FIG. 41 illustrates an example tunnel responder protocol byte, in accordance with various embodiments.
FIG. 42 illustrates an example tunnel responder packet structure, in accordance with various embodiments.
Figure 43:
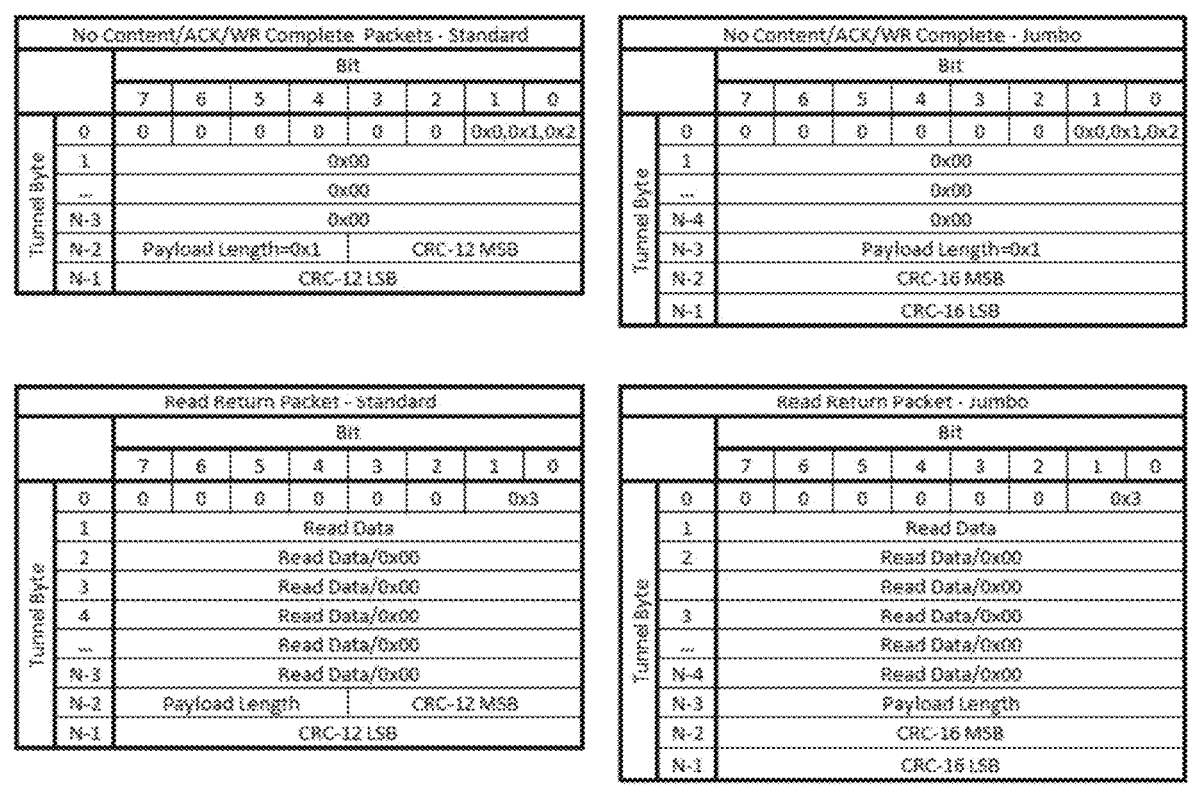

In some embodiments, tunnel responder packets may include a response byte, read data, a payload length, and a CRC. Unused bytes may be populated with all zeros. FIG. 41 illustrates an example tunnel responder protocol byte, in accordance with various embodiments. FIG. 42 illustrates an example tunnel responder packet structure, in accordance with various embodiments. FIG. 42 includes example packet structures for standard and jumbo tunnel packets. The payload length field may be equal to the number of bytes consumed by the command, command parameters, and transaction data, and may not include unused bytes, the length field, or the CRC field. FIG. 43 illustrates example tunnel responder packets, in accordance with various embodiments.

As noted above, a data tunnel may include the most upstream node 102 (the node 102 having DTFRST=1), the most downstream node 102 (the node 102 having DTLAST=1), and all nodes 102 in between along the bus 106. Nodes 102 in the tunnel may have tunnel capability enabled (DTEN=1), disabled (DTEN=0), or may not have tunnel capability. The most upstream node 102 may populate the downstream tunnel slots with either a "no content" packet if the most upstream node 102 is idle or with the appropriate protocol packet if the most upstream node 102 is active. The most downstream node 102 may populate the upstream tunnel slots with a "no content" packet if the most downstream node 102 is idle or with the appropriate protocol packet if the most downstream node 102 is active. Nodes 102 that are not aware of the tunnel, or cannot be aware of the tunnel, past tunnel packets downstream from their a-ports to their B-ports, and upstream packets from there be-ports to their a-ports, unmodified, as they would for other bus slots that are not locally consumed. Tunnel owners may initiate collectivity by substituting an active protocol packet for the "no content" packet. A targeted tunnel responder may substitute a response packet for the "no content" packet.

On the part of the tunnel owner, in some embodiments, all packets associated with a single transaction may be sent contiguously. A transaction may abort if an inappropriate or missed response packet occurs during a transaction. A transaction abort may be signaled to tunnel responders with a "no content" packet, in such an abort may be required before starting a new transaction.

On the part of the tunnel responder, in some embodiments, continuous response packets may be sent while the tunnel responder is active. During write operations, "acknowledge" or "read return" packets may be sent until all read data is returned. During read operations, "acknowledge" or "write complete" packets may be sent until the remote transfer completes. Transactions may abort if an inappropriate or corrupt packet is received during a transaction, and the transaction status may be determined by reading the value of the SPISTAT bit. FIG. 44 illustrates example tunnel packet flows, in accordance with various embodiments.

Figure 45:
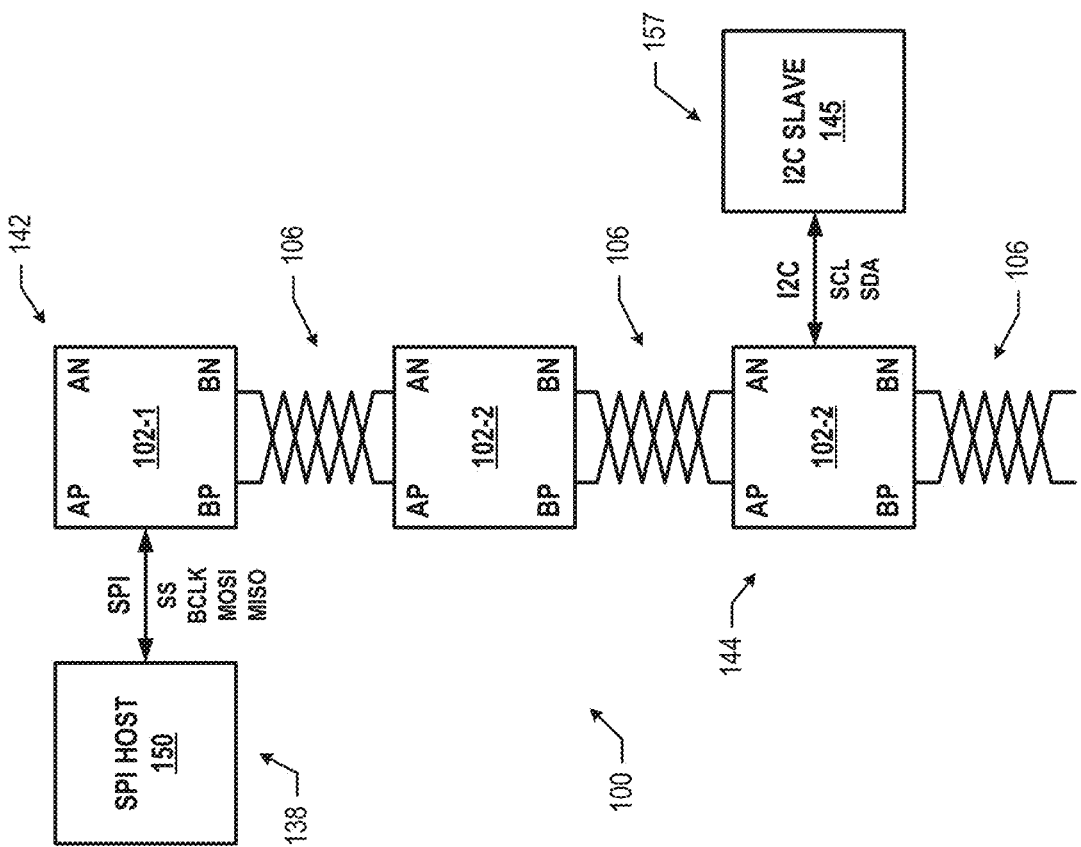
FIG. 45 is a block diagram of a portion of an illustrative two-wire communication system including SPI-to-Inter-Integrated Circuit (I2C) functionality, in accordance with various embodiments.

FIG. 45 is a block diagram of a portion of an illustrative two-wire communication system 100 including SPI-to-I2C functionality, in accordance with various embodiments. FIG. 20 includes an external device 138 coupled to a master node 102-1 via an SPI interface, and an external device 157 coupled to a slave node 102-2 via an I2C interface. The master node 102-1 is also in communication with one or more slave nodes 102-2 via the bus 106. The external device 138 coupled to the master node 102-1 may serve as the SPI host 150 (with the associated master node 102-1 serving as the local node 142), and the external device 157 coupled to the slave node 102-2 may serve as an I2C slave 145 (with the associated slave node 102-2 serving as the remote node 144). Although a particular number of slave nodes 102-2 is depicted in FIG. 45, this is simply illustrative, and more or fewer slave nodes 102-2 may be included. The SPI host 150 may communicate with the local node 142 via the SPI transceiver 136 included in the node transceiver 120 (not shown) of the local node 142, the local node 142 may communicate with the remote node 144 via the bus 106 (including any slave nodes 102-2 in between, if present), and the remote node 144 may communicate with the I2C slave 145 via the I2C transceiver 129 included in the node transceiver 120 (not shown) of the remote node 144. Although FIG. 45 illustrates the local node 142 as being a master node 102-1, in other embodiments of SPI-to-I2C functionality, the local node 142 may be a slave node 102-2. Further, although FIG. 45 illustrates the remote node 144 as being downstream of the local node 142, in other embodiments SPI-to-I2C functionality, the remote node 144 may be upstream of the local node 142. In some such embodiments, for example, the remote node 144 may be a master node 102-1.

In some embodiments, SPI-to-I2C functionality allows the SPI port on a master node 102-1 to read from and write to external devices 157 coupled to slave nodes 102-2 using the remote I2C protocol hooks described above to move the data through the system. More generally, during operation of a system 100 including SPI-to-I2C functionality, the SPI host 150 may transmit commands to the local node 142 via the SPI interface between the two, the local node 142 may relay these commands to the remote node 144 via the bus 106, and the remote node 144 may provide these commands to the I2C slave 145 via the I2C interface between the two. The I2C slave 145 may respond to the remote node 144 via the I2C interface between the two, the remote node 144 may respond to the local node 142 via the bus 106, and the local node 142 may relay this response to the SPI host 150 via the SPI interface between the two. Although only a single SPI host 150 and a single I2C slave 145 are illustrated in FIG. 45, any of the communication systems 100 disclosed herein may include multiple nodes 102 with SPI-to-I2C functionality (e.g., multiple peripheral devices 108 serving as I2C slaves 145 and communicating with SPI hosts 150 at least partially along the bus 106).

Figure 46:
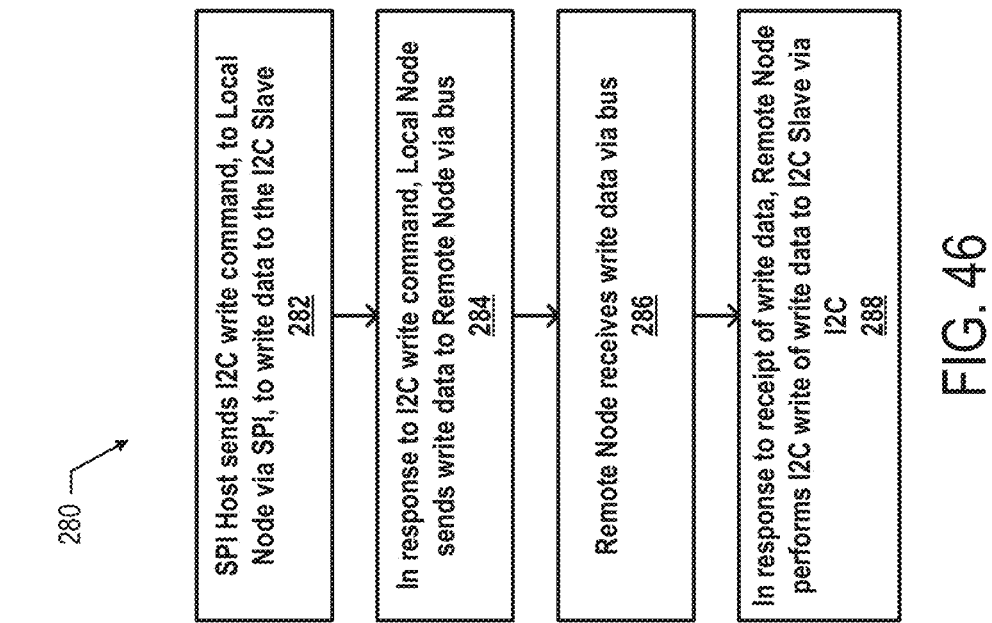
FIG. 46 is a flow diagram of an example SPI-to-I2C write procedure, in accordance with various embodiments.

FIG. 46 is a flow diagram of an example SPI-to-I2C write procedure 280, in accordance with various embodiments. Although the operations of the SPI-to-I2C write procedure 280 may be illustrated with reference to the system 100 of FIG. 45, any suitable system 100 may perform the SPI-to-I2C write procedure 200.

At 282, an SPI host may send an I2C write command, to a local node via SPI, to write data to an I2C slave. For example, the SPI host 150 may send an I2C write command (e.g., the remote I2C write command discussed below with reference to FIG. 48A) to the local node 142 (e.g., a master node 102-1) via SPI (e.g., via the SPI transceiver 136 included in the local node 142). The I2C write command may include an indicator of the remote node 144 (e.g., a slave node 102-2) to which the I2C slave 145 is coupled, the address to be written, and the data to be written.

At 284, in response to the I2C write command of 282, the local node may send the write data to the remote node via the bus. For example, the local node 142 may send the write data to the remote node 144 via the bus 106.

At 286, the remote node may receive the write data via the bus. For example, the remote node 144 may receive the write data via the bus 106.

At 288, in response to receipt of the write data, the remote node may perform an I2C write of the write data to the I2C slave (via I2C). For example, the remote node 144 may use conventional I2C protocols to write the write data to the I2C slave 145 (e.g., to write the data to the specified address of the I2C slave 145).

Figure 47:
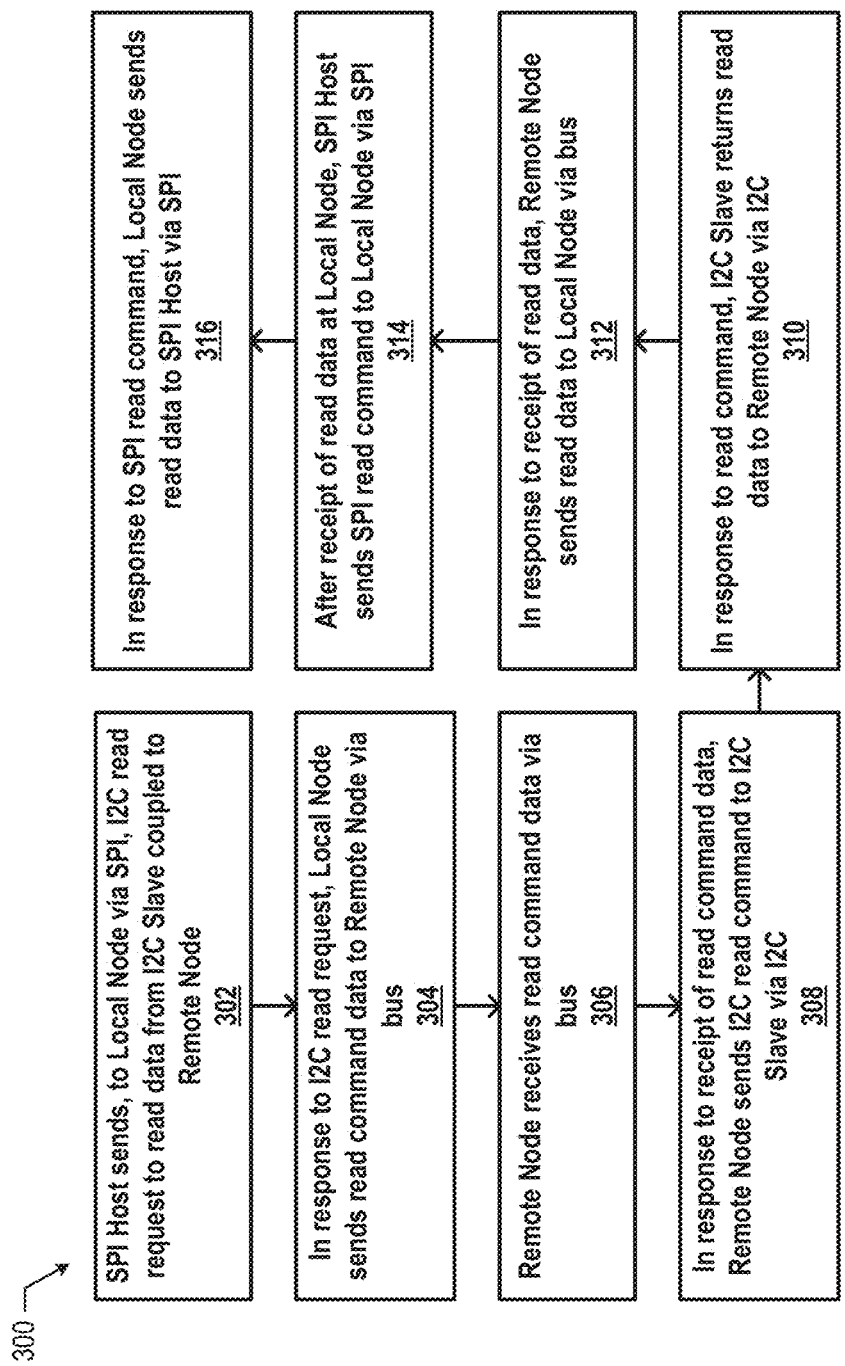
FIG. 47 is a flow diagram of an example SPI-to-I2C read procedure, in accordance with various embodiments.

FIG. 47 is a flow diagram of an example SPI-to-I2C read procedure 300, in accordance with various embodiments. Although the operations of the SPI-to-I2C read procedure 300 may be illustrated with reference to the system 100 of FIG. 45, any suitable system 100 may perform the SPI-to-I2C read procedure 300.

At 302, an SPI host may send an I2C read request, to a local node via SPI, to read data from an I2C slave coupled to a remote node. For example, the SPI host 150 may send an I2C read request command (e.g., the remote I2C read request command discussed below with reference to FIG. 48B) to the local node 142 (e.g., a master node 102-1) via SPI (e.g., via the SPI transceiver 136 included in the local node 142). The SPI read request may include an indicator of the remote node 144 (e.g., a slave node 102-2) and a particular I2C slave 145 as the destination of the read command, and a register address to be read.

At 304, in response to the I2C read request command of 302, the local node may send a read command to the remote node via the bus. For example, the local node 142 may send a read command to the remote node 144 via the bus 106.

At 306, the remote node may receive the read command via the bus. For example, the remote node 144 may receive the read command via the bus 106.

At 308, in response to receipt of the read command, the remote node may send an I2C read command to the I2C slave via I2C. For example, the remote node 144 may send a read command to read the specified address from the I2C slave 145 via the local I2C connection between the remote node 144 and the I2C slave 145.

At 310, in response to receipt of the read command, the I2C slave may return read data to the remote node via I2C. For example, the I2C slave 145 may access the data stored at the specified address, and may provide that data to the remote node 144 via the local I2C connection between the remote node 144 and the I2C slave 145.

At 312, in response to receipt of the read data, the remote node may send the read data to the local node via the bus. For example, the remote node 144 may transmit the read data to the local node 142 via the bus 106.

At 314, after receipt of the read data at the remote node, the SPI host may send an SPI read command to the local node via SPI. For example, the SPI host 150 may send an SPI read command (e.g., the SPI data read command discussed above with reference to FIG. 19D) to the local node 142 via SPI.

At 316, in response to the SPI read command of 314, the local node may send the read data to the SPI host via SPI. For example, the local node 142 may send the read data (received from the I2C slave 145 via the remote node 144) to the SPI host 150 via SPI.

Figure 48A:
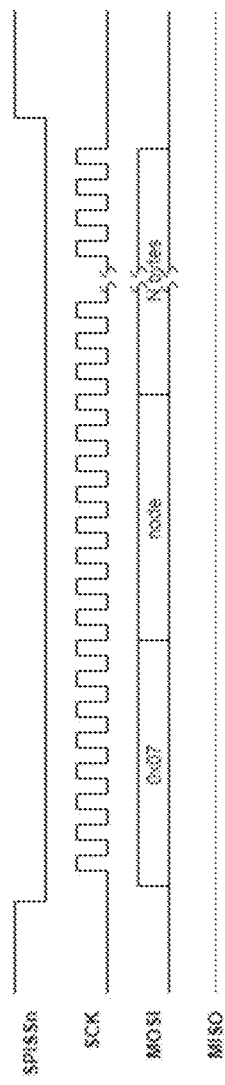
FIGS. 48A-48B are timing diagrams of commands that may be used in an implementation of SPI-to-I2C functionality, in accordance with various embodiments.
Figure 48B:
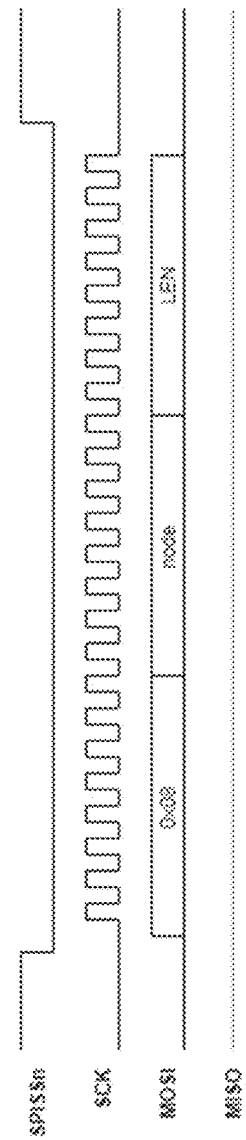

FIGS. 48A-48B are timing diagrams of commands that may be used in an implementation of SPI-to-I2C functionality, in accordance with various embodiments. In particular, FIG. 48A is a timing diagram for a remote I2C write, while FIG. 48B is a timing diagram for a remote I2C read request. In FIG. 48A, the first byte (0x07 in FIG. 48A) indicates the command type (i.e., a remote I2C write), the second byte (node in FIG. 48A) indicates the remote node 144, and the last bytes (N bytes in FIG. 48A) represent the data to be written. In some embodiments, burst writes of up to 256 bytes (N=256) may be supported.

In FIG. 48B, the first byte (0x08 in FIG. 48B) indicates the command type (i.e., a remote I2C read request), the second byte (node in FIG. 48B) indicates the remote node 144, and the last byte indicates the number of bytes to be read. In some embodiments, burst reads of up to 256 bytes (N=256) may be supported.

The following paragraphs provide examples of various ones of the embodiments disclosed herein.

Example 1 is an apparatus with serial peripheral interface (SPI) functionality, including: a first node transceiver, wherein the first node transceiver includes transceiver circuitry to receive a signal transmitted over two wires of a two-wire bus from a second node transceiver; wherein the first node transceiver further includes SPI circuitry to allow the first node transceiver to act as an SPI slave when the SPI circuitry is coupled to an SPI host.

Example 2 includes the subject matter of Example 1, and further specifies that the SPI circuitry is to receive a local read command from the SPI host, and in response to the local read command, provide data stored in a memory device of the first node transceiver to the SPI host.

Example 3 includes the subject matter of any of Examples 1-2, and further specifies that the SPI circuitry is to receive a local write command from the SPI host, and in response to the local write command, cause data to be written to a memory device of the first node transceiver.

Example 4 includes the subject matter of Example 1, and further specifies that the SPI circuitry is further to receive a SPI command from the SPI host and, in response to receipt of the SPI command, transmit a two-wire bus command to the second node transceiver over the two wires.

Example 5 includes the subject matter of Example 4, and further specifies that the SPI command includes a slave read request command and the two-wire bus command includes a read command.

Example 6 includes the subject matter of Example 5, and further specifies that the SPI circuitry is to receive, from the second node transceiver via the transceiver circuitry, read data in response to the read command.

Example 7 includes the subject matter of Example 6, and further specifies that the second node transceiver is to provide the read data from a memory device of the second node transceiver.

Example 8 includes the subject matter of any of Examples 6-7, and further specifies that the SPI circuitry is to set an indicator when receipt of the read data, by the first node transceiver, is complete.

Example 9 includes the subject matter of Example 8, and further specifies that the SPI circuitry is to receive, from the SPI host, a status read command, and in response to receipt of the status read command, provide a value of the indicator to the SPI host.

Example 10 includes the subject matter of any of Examples 6-9, and further specifies that the SPI circuitry is to receive, from the SPI host, a first-in-first-out (FIFO) read command, and in response to receipt of the FIFO read command, provide the read data to the SPI host.

Example 11 includes the subject matter of Example 4, and further specifies that the SPI command includes a slave write command and the two-wire bus command includes a write command.

Example 12 includes the subject matter of any of Examples 4-11, and further specifies that the SPI command includes an indicator of the second node transceiver.

Example 13 includes the subject matter of Example 1, and further specifies that the SPI circuitry is further to receive a first SPI command from the SPI host and, in response to receipt of the first SPI command, transmit a two-wire bus command to the second node transceiver over the two wires; and in response to receipt of the two-wire bus command, the second node transceiver is to transmit a second SPI command to an SPI slave device coupled to SPI circuitry of the second node transceiver.

Example 14 includes the subject matter of Example 13, and further specifies that the first SPI command includes a slave read request command, the two-wire bus command includes a read command, and the second SPI command includes a read command.

Example 15 includes the subject matter of Example 14, and further specifies that the SPI circuitry is to receive, from the second node transceiver via the transceiver circuitry, read data in response to the read command transmitted to the second node transceiver.

Example 16 includes the subject matter of Example 15, and further specifies that the read data is provided to SPI circuitry of the second node transceiver by the SPI slave device.

Example 17 includes the subject matter of any of Examples 15-16, and further specifies that the SPI circuitry is to transmit an interrupt to the SPI host when receipt of the read data, by the first node transceiver, is complete.

Example 18 includes the subject matter of any of Examples 15-17, and further specifies that the SPI circuitry is to receive, from the SPI host, a first-in-first-out (FIFO) read command, and in response to receipt of the FIFO read command, provide the read data to the SPI host.

Example 19 includes the subject matter of any of Examples 15-18, and further specifies that the second node transceiver is to commence transmission of the second SPI command to the SPI slave device after receipt of the two-wire bus command is complete.

Example 20 includes the subject matter of any of Examples 15-18, and further specifies that the second node transceiver is to commence transmission of the second SPI command to the SPI slave device before receipt of the two-wire bus command is complete.

Example 21 includes the subject matter of Example 13, and further specifies that the first SPI command includes a slave write command, the two-wire bus command includes a write command, and the second SPI command includes a write command.

Example 22 includes the subject matter of Example SPI command to the SPI slave device after receipt of the two-wire bus command is complete.

Example 23 includes the subject matter of Example 21, and further specifies that the second node transceiver is to commence transmission of the second SPI command to the SPI slave device before receipt of the two-wire bus command is complete.

Example 24 includes the subject matter of any of Examples 13-23, and further specifies that the first SPI command includes an indicator of the second node transceiver and an indicator of the SPI slave device.

Example 25 includes the subject matter of Example 1, and further specifies that the SPI circuitry is further to receive a first SPI command from the SPI host and, in response to receipt of the first SPI command, cause transmission of a first Inter-Integrated Circuit (I2C) command to the second node transceiver over the two wires; and in response to receipt of the first I2C command, the second node transceiver is to transmit a second I2C command to an I2C slave device coupled to I2C circuitry of the second node transceiver.

Example 26 includes the subject matter of Example 25, and further specifies that the first SPI command includes an I2C read request command, the first I2C command includes an I2C read command, and the second I2C command includes an I2C read command.

Example 27 includes the subject matter of Example 26, and further specifies that the SPI circuitry is to receive, from the second node transceiver via the transceiver circuitry, read data in response to the read command transmitted to the second node transceiver.

Example 28 includes the subject matter of Example 27, and further specifies that the read data is provided to I2C circuitry of the second node transceiver by the I2C slave device.

Example 29 includes the subject matter of any of Examples 27-28, and further specifies that the SPI circuitry is to receive, from the SPI host, a first-in-first-out (FIFO) read command, and in response to receipt of the FIFO read command, provide the read data to the SPI host.

Example 30 includes the subject matter of Example 25, and further specifies that the first SPI command includes an I2C write command, the first I2C command includes a write command, and the second I2C command includes a write command.

Example 31 includes the subject matter of any of Examples 25-30, and further specifies that the first SPI command includes an indicator of the second node transceiver and an indicator of the I2C slave device.

Example 32 includes the subject matter of any of Examples 1-31, and further specifies that the SPI circuitry includes a slave select port, a bit clock port, a master-out-slave-in port, and a slave-out-master-in port.

Example 33 includes the subject matter of any of Examples 1-32, and further specifies that the transceiver circuitry is first transceiver circuitry, the two wires are a first two wires, the first node transceiver further includes second transceiver circuitry to receive a signal transmitted over a second two wires of the two-wire bus from a third node transceiver, and (a) the first transceiver circuitry is upstream transceiver circuitry and the second transceiver circuitry is downstream transceiver circuitry, or (b) the first transceiver circuitry is downstream transceiver circuitry and the second transceiver circuitry is upstream transceiver circuitry.

Example 34 includes the subject matter of Example 33, and further specifies that the first node transceiver is a slave node transceiver.

Example 35 includes the subject matter of any of Examples 33-34, and further specifies that the first node transceiver further includes: clock circuitry to generate a clock signal at the first node transceiver based on a preamble of a synchronization control frame in a first signal received via two upstream wires of the two-wire bus, wherein timing of the receipt and provision of signals over the two-wire bus by the first node transceiver is based on the clock signal; and power circuitry to receive a voltage bias over between the two upstream wires of the two-wire bus from the third node transceiver.

Example 36 includes the subject matter of any of Examples 1-32, and further specifies that the first node transceiver is a master node transceiver.

Example 37 includes the subject matter of Example 36, and further specifies that the first node transceiver further includes: clock circuitry to generate a clock signal; wherein transceiver circuitry is to provide a first signal over two downstream wires of the two-wire bus, a preamble of a synchronization control frame of the first signal is based on the clock signal, the second node transceiver is to generate its own clock signal based on the preamble, and the first node transceiver is to provide a voltage bias between the two downstream wires of the two-wire bus.

Example 38 includes the subject matter of any of Examples 1-37, and further includes: the SPI host.

Example 39 includes the subject matter of any of Examples 1-38, and further includes: the second node transceiver.

Example 40 includes the subject matter of any of Examples 1-39, and further specifies that the two-wire bus includes an unshielded twisted pair.

Example 41 includes the subject matter of any of Examples 1-40, and further specifies that the apparatus is at least partially included in a vehicle.

Example 42 is an apparatus with serial peripheral interface (SPI) functionality, including: a first node transceiver, wherein the first node transceiver includes transceiver circuitry to receive a signal transmitted over two wires of a two-wire bus from a second node transceiver; wherein the second node transceiver includes SPI circuitry to allow the second node transceiver to interface with an SPI host, and the first node transceiver is to act as an SPI slave in response to SPI commands transmitted from the SPI host and over the two-wire bus.

Example 43 includes the subject matter of Example 42, and further specifies that the SPI circuitry is to receive a SPI command from the SPI host and, in response to receipt of the SPI command, transmit a two-wire bus command to the first node transceiver over the two wires.

Example 44 includes the subject matter of Example 43, and further specifies that the SPI command includes a slave read request command and the two-wire bus command includes a read command.

Example 45 includes the subject matter of Example 44, and further specifies that the first node transceiver is to provide, to the second node transceiver via the transceiver circuitry, read data in response to the read command.

Example 46 includes the subject matter of Example 45, and further specifies that the first node transceiver is to provide the read data from a memory device of the first node transceiver.

Example 47 includes the subject matter of any of Examples 45-46, and further specifies that the SPI circuitry is to set an indicator when receipt of the read data, by the second node transceiver, is complete.

Example 48 includes the subject matter of Example 47, and further specifies that the SPI circuitry is to receive, from the SPI host, a status read command, and in response to receipt of the status read command, provide a value of the indicator to the SPI host.

Example 49 includes the subject matter of any of Examples 45-48, and further specifies that the SPI circuitry is to receive, from the SPI host, a first-in-first-out (FIFO) read command, and in response to receipt of the FIFO read command, provide the read data to the SPI host.

Example 50 includes the subject matter of Example 43, and further specifies that the SPI command includes a slave write command and the two-wire bus command includes a write command.

Example 51 includes the subject matter of any of Examples 43-50, and further specifies that the SPI command includes an indicator of the first node transceiver.

Example 52 includes the subject matter of any of Examples 42-51, and further specifies that the SPI circuitry includes a slave select port, a bit clock port, a master-out-slave-in port, and a slave-out-master-in port.

Example 53 includes the subject matter of any of Examples 42-52, and further specifies that the transceiver circuitry is first transceiver circuitry, the two wires are a first two wires, the first node transceiver further includes second transceiver circuitry to receive a signal transmitted over a second two wires of the two-wire bus from a third node transceiver, and (a) the first transceiver circuitry is upstream transceiver circuitry and the second transceiver circuitry is downstream transceiver circuitry, or (b) the first transceiver circuitry is downstream transceiver circuitry and the second transceiver circuitry is upstream transceiver circuitry.

Example 54 includes the subject matter of any of Examples 42-53, and further specifies that the first node transceiver is a slave node transceiver.

Example 55 includes the subject matter of any of Examples 42-54, and further specifies that the first node transceiver further includes: clock circuitry to generate a clock signal at the first node transceiver based on a preamble of a synchronization control frame in a first signal received via two upstream wires of the two-wire bus, wherein timing of the receipt and provision of signals over the two-wire bus by the first node transceiver is based on the clock signal; and power circuitry to receive a voltage bias over between the two upstream wires of the two-wire bus from the third node transceiver.

Example 56 includes the subject matter of any of Examples 42-55, and further includes: the second node transceiver.

Example 57 includes the subject matter of any of Examples 42-56, and further includes: the SPI host.

Example 58 includes the subject matter of any of Examples 42-57, and further specifies that the two-wire bus includes an unshielded twisted pair.

Example 59 includes the subject matter of any of Examples 42-58, and further specifies that the apparatus is at least partially included in a vehicle headend.

Example 60 is an apparatus with serial peripheral interface (SPI) functionality, including: a first node transceiver, wherein the first node transceiver includes transceiver circuitry to receive a signal transmitted over two wires of a two-wire bus from a second node transceiver; wherein the first node transceiver includes first SPI circuitry to allow the first node transceiver to interface with an SPI slave, the second node transceiver includes second SPI circuitry to allow the second node transceiver to interface with an SPI host, and the SPI slave is to respond to SPI commands transmitted from the SPI host and over the two-wire bus.

Example 61 includes the subject matter of Example 60, and further specifies that: the second SPI circuitry is to receive a first SPI command from the SPI host and, in response to receipt of the first SPI command, transmit a two-wire bus command to the first node transceiver over the two wires; and in response to receipt of the two-wire bus command, the first SPI circuitry of the first node transceiver is to transmit a second SPI command to the SPI slave.

Example 62 includes the subject matter of Example 61, and further specifies that the first SPI command includes a slave read request command, the two-wire bus command includes a read command, and the second SPI command includes a read command.

Example 63 includes the subject matter of Example 62, and further specifies that the second SPI circuitry is to receive, from the first node transceiver via the transceiver circuitry, read data in response to the read command transmitted to the first node transceiver.

Example 64 includes the subject matter of Example 63, and further specifies that the read data is provided to the first SPI circuitry of the first node transceiver by the SPI slave.

Example 65 includes the subject matter of any of Examples 63-64, and further specifies that the second SPI circuitry is to transmit an interrupt to the SPI host when receipt of the read data, by the second node transceiver, is complete.

Example 66 includes the subject matter of any of Examples 63-65, and further specifies that the second SPI circuitry is to receive, from the SPI host, a first-in-first-out (FIFO) read command, and in response to receipt of the FIFO read command, provide the read data to the SPI host.

Example 67 includes the subject matter of any of Examples 63-66, and further specifies that the first node transceiver is to commence transmission of the second SPI command to the SPI slave after receipt of the two-wire bus command is complete.

Example 68 includes the subject matter of any of Examples 63-66, and further specifies that the first node transceiver is to commence transmission of the second SPI command to the SPI slave before receipt of the two-wire bus command is complete.

Example 69 includes the subject matter of Example 61, and further specifies that the first SPI command includes a slave write command, the two-wire bus command includes a write command, and the second SPI command includes a write command.

Example 70 includes the subject matter of Example 69, and further specifies that the first node transceiver is to commence transmission of the second SPI command to the SPI slave after receipt of the two-wire bus command is complete.

Example 71 includes the subject matter of Example 69, and further specifies that the first node transceiver is to commence transmission of the second SPI command to the SPI slave before receipt of the two-wire bus command is complete.

Example 72 includes the subject matter of any of Examples 61-71, and further specifies that the first SPI command includes an indicator of the first node transceiver and an indicator of the SPI slave.

Example 73 includes the subject matter of any of Examples 60-72, and further specifies that the first SPI circuitry includes a slave select port, a bit clock port, a master-out-slave-in port, and a slave-out-master-in port.

Example 74 includes the subject matter of any of Examples 60-73, and further specifies that the transceiver circuitry is first transceiver circuitry, the two wires are a first two wires, the first node transceiver further includes second transceiver circuitry to receive a signal transmitted over a second two wires of the two-wire bus from a third node transceiver, and (a) the first transceiver circuitry is upstream transceiver circuitry and the second transceiver circuitry is downstream transceiver circuitry, or (b) the first transceiver circuitry is downstream transceiver circuitry and the second transceiver circuitry is upstream transceiver circuitry.

Example 75 includes the subject matter of Example 74, and further specifies that the first node transceiver further includes: clock circuitry to generate a clock signal at the first node transceiver based on a preamble of a synchronization control frame in a first signal received via two upstream wires of the two-wire bus, wherein timing of the receipt and provision of signals over the two-wire bus by the first node transceiver is based on the clock signal; and power circuitry to receive a voltage bias over between the two upstream wires of the two-wire bus from the third node transceiver.

Example 76 includes the subject matter of any of Examples 60-75, and further specifies that the first node transceiver is a slave node transceiver.

Example 77 includes the subject matter of any of Examples 60-76, and further includes: the second node transceiver.

Example 78 includes the subject matter of any of Examples 60-77, and further includes: the SPI host.

Example 79 includes the subject matter of any of Examples 60-78, and further includes: the SPI slave.

Example 80 includes the subject matter of any of Examples 60-79, and further specifies that the two-wire bus includes an unshielded twisted pair.

Example 81 includes the subject matter of any of Examples 60-80, and further specifies that the apparatus is at least partially included in a vehicle headend.

Example 82 is an apparatus with serial peripheral interface (SPI) functionality, including: a first node transceiver, wherein the first node transceiver includes transceiver circuitry to receive a signal transmitted over two wires of a two-wire bus from a second node transceiver; wherein the first node transceiver includes Inter-Integrated Circuit (I2C) circuitry to allow the first node transceiver to interface with an I2C slave, the second node transceiver includes SPI circuitry to allow the second node transceiver to interface with an SPI host, and the I2C slave is to respond to commands transmitted from the SPI host and over the two-wire bus.

Example 83 includes the subject matter of Example 82, and further specifies that: the SPI circuitry is further to receive a first SPI command from the SPI host and, in response to receipt of the first SPI command, transmit a first I2C command to the first node transceiver over the two wires; and in response to receipt of the first I2C command, the first node transceiver is to transmit a second I2C command to the I2C slave.

Example 84 includes the subject matter of Example 83, and further specifies that the first SPI command includes an I2C read request command, the first I2C command includes an I2C read command, and the second I2C command includes an I2C read command.

Example 85 includes the subject matter of Example 84, and further specifies that the SPI circuitry is to receive, from the first node transceiver via the transceiver circuitry, read data in response to the read command transmitted to the first node transceiver.

Example 86 includes the subject matter of Example 85, and further specifies that the read data is provided to the I2C circuitry of the second node transceiver by the I2C slave.

Example 87 includes the subject matter of any of Examples 85-86, and further specifies that the SPI circuitry is to receive, from the SPI host, a first-in-first-out (FIFO) read command, and in response to receipt of the FIFO read command, provide the read data to the SPI host.

Example 88 includes the subject matter of Example 83, and further specifies that the first SPI command includes an I2C write command, the first I2C command includes a write command, and the second I2C command includes a write command.

Example 89 includes the subject matter of any of Examples 83-88, and further specifies that the first SPI command includes an indicator of the first node transceiver and an indicator of the I2C slave.

Example 90 includes the subject matter of any of Examples 82-89, and further specifies that the SPI circuitry includes a slave select port, a bit clock port, a master-out-slave-in port, and a slave-out-master-in port.

Example 91 includes the subject matter of any of Examples 82-90, and further specifies that the transceiver circuitry is first transceiver circuitry, the two wires are a first two wires, the first node transceiver further includes second transceiver circuitry to receive a signal transmitted over a second two wires of the two-wire bus from a third node transceiver, and (a) the first transceiver circuitry is upstream transceiver circuitry and the second transceiver circuitry is downstream transceiver circuitry, or (b) the first transceiver circuitry is downstream transceiver circuitry and the second transceiver circuitry is upstream transceiver circuitry.

Example 92 includes the subject matter of Example 91, and further specifies that the first node transceiver further includes: clock circuitry to generate a clock signal at the first node transceiver based on a preamble of a synchronization control frame in a first signal received via two upstream wires of the two-wire bus, wherein timing of the receipt and provision of signals over the two-wire bus by the first node transceiver is based on the clock signal; and power circuitry to receive a voltage bias over between the two upstream wires of the two-wire bus from the third node transceiver.

Example 93 includes the subject matter of any of Examples 82-92, and further specifies that the first node transceiver is a slave node transceiver.

Example 94 includes the subject matter of any of Examples 82-93, and further includes: the SPI host.

Example 95 includes the subject matter of any of Examples 82-94, and further includes: the second node transceiver.

Example 96 includes the subject matter of any of Examples 82-95, and further includes: the I2C slave.

Example 97 includes the subject matter of any of Examples 82-96, and further specifies that the two-wire bus includes an unshielded twisted pair.

Example 98 includes the subject matter of any of Examples 82-97, and further specifies that the apparatus is at least partially included in a vehicle.

Example 99 is a communication system with SPI functionality, in accordance with any of the embodiments disclosed herein.

Example 100 is a method of providing SPI functionality for a node in a communication system, in accordance with any of the embodiments disclosed herein.

Example 101 is a communication system including means for SPI functionality, in accordance with any of the embodiments disclosed herein.

Example 102 is a communication system including means for performing any of the methods disclosed herein.

Example 103 is a method for providing SPI functionality in accordance with any of the embodiments disclosed herein.

The invention claimed is:

1. An apparatus with serial peripheral interface (SPI) functionality, comprising: a first node transceiver, wherein the first node transceiver includes transceiver circuitry to receive a signal transmitted over two wires of a two-wire bus from a second node transceiver; wherein the first node transceiver includes Inter-Integrated Circuit (I2C) circuitry to allow the first node transceiver to interface with an I2C slave, the second node transceiver includes SPI circuitry to allow the second node transceiver to interface with an SPI host, and the I2C slave is to respond to commands transmitted from the SPI host and over the two-wire bus.

2. The apparatus of claim 1, wherein:
the SPI circuitry is further to receive a first SPI command from the SPI host and, in response to receipt of the first SPI command, transmit a first I2C command to the first node transceiver over the two wires; and
in response to receipt of the first I2C command, the first node transceiver is to transmit a second I2C command to the I2C slave.

3. The apparatus of claim 2, wherein the first SPI command includes an I2C read request command, the first I2C command includes an I2C read command, and the second I2C command includes an I2C read command.

4. The apparatus of claim 3, wherein the SPI circuitry is to receive, from the first node transceiver via the transceiver circuitry, read data in response to the read command transmitted to the first node transceiver.

5. The apparatus of claim 4, wherein the read data is provided to the I2C circuitry of the first node transceiver by the I2C slave.

6. The apparatus of claim 4, wherein the SPI circuitry is to receive, from the SPI host, a first-in-first-out (FIFO) read command, and in response to receipt of the FIFO read command, provide the read data to the SPI host.

7. The apparatus of claim 2, wherein the first SPI command includes an I2C write command, the first I2C command includes a write command, and the second I2C command includes a write command.

8. The apparatus of claim 2, wherein the first SPI command includes an indicator of the first node transceiver and an indicator of the I2C slave.

9. The apparatus of claim 1, wherein the SPI circuitry includes a slave select port, a bit clock port, a master-out-slave-in port, and a master-in-slave-out port, wherein the I2C circuitry includes a data port and a clock port.

10. The apparatus of claim 1, wherein the transceiver circuitry is first transceiver circuitry, the two wires are a first two wires, the first node transceiver further includes second transceiver circuitry to receive a signal transmitted over a second two wires of the two-wire bus from a third node transceiver, and (a) the first transceiver circuitry is upstream transceiver circuitry and the second transceiver circuitry is downstream transceiver circuitry, or (b) the first transceiver circuitry is downstream transceiver circuitry and the second transceiver circuitry is upstream transceiver circuitry.

11. The apparatus of claim 10, wherein the first node transceiver further includes: clock circuitry to generate a clock signal at the first node transceiver based on a preamble of a synchronization control frame in a first signal received via two upstream wires of the two-wire bus, wherein timing of the receipt and provision of signals over the two-wire bus by the first node transceiver is based on the clock signal; and
power circuitry to receive a voltage bias over between the two upstream wires of the two-wire bus from the third node transceiver.

12. The apparatus of claim 1, wherein the first node transceiver is a slave node transceiver.

13. The apparatus of claim 1, further comprising: the SPI host.

14. The apparatus of claim 1, further comprising: the second node transceiver.

15. The apparatus of claim 1, further comprising: the I2C slave.

16. The apparatus of claim 1, wherein the two-wire bus includes an unshielded twisted pair.

17. The apparatus of claim 1, wherein the apparatus is at least partially included in a vehicle.

18. A method of providing serial peripheral interface (SPI) functionality for a node in a communication system, comprising:
transmitting a signal from a second node transceiver over two wires of a two-wire bus, wherein the second node transceiver includes SPI circuitry to allow the second node transceiver to interface with an SPI host;
receiving the signal at transceiver circuitry in a first node, wherein the first node transceiver includes Inter-Integrated Circuit (I2C) circuitry to allow the first node transceiver to interface with an I2C slave;
responding, from the I2C slave, to commands transmitted from the SPI host over the two-wire bus.

19. The method of claim 18, further comprising:
receiving, at the SPI circuitry, a first SPI command from the SPI host;
transmitting, from the SPI circuitry in response to receipt of the first SPI command, a first I2C command to the first node transceiver over the two wires; and
transmitting, from the first node transceiver, a second I2C command to the I2C slave in response to receipt of the first I2C command.

20. A communication system for providing serial peripheral interface SPI functionality, comprising
an SPI host;
an I2C slave;
a first node transceiver, wherein the first node transceiver includes transceiver circuitry and Inter-Integrated Circuit (I2C) circuitry to allow the first node transceiver to interface with the I2C slave;
a second node transceiver, wherein the second node transceiver includes SPI circuitry to allow the second node transceiver to interface with the SPI host;
wherein the first node transceiver is to receive a signal transmitted over two wires of a two wire bus from the second node transceiver, and
wherein the I2C slave is to respond to commands transmitted from the SPI host and over the two-wire bus.

* * * * *